(12) United States Patent
Morishita et al.

(10) Patent No.: US 6,335,727 B1
(45) Date of Patent: *Jan. 1, 2002

(54) INFORMATION INPUT DEVICE, POSITION INFORMATION HOLDING DEVICE, AND POSITION RECOGNIZING SYSTEM INCLUDING THEM

(75) Inventors: Akira Morishita, Kawasaki; Hiroshi Mizoguchi, Tokyo, both of (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/990,809

(22) Filed: Dec. 15, 1997

Related U.S. Application Data

(60) Continuation of application No. 08/475,099, filed on Jun. 7, 1995, now abandoned, which is a division of application No. 08/208,720, filed on Mar. 11, 1994, now abandoned.

(30) Foreign Application Priority Data

Mar. 12, 1993 (JP) .............................. 5-077360

(51) Int. Cl.[7] .............................. G06K 11/06
(52) U.S. Cl. .................................. 345/179; 178/18.03
(58) Field of Search ................................. 345/166, 179, 345/174; 178/18.03, 18.09, 19.01, 18.01, 18.04, 18.07, 19.03; 341/15, 32, 33

(56) References Cited

U.S. PATENT DOCUMENTS

| 4,238,843 A | | 12/1980 | Carasso et al. | |
| 4,293,734 A | * | 10/1981 | Pepper, Jr. | 345/174 |
| 4,418,242 A | * | 11/1983 | Kouno | 178/18.07 |
| 4,471,162 A | * | 9/1984 | Aono et al. | 178/18.07 |
| 5,477,012 A | * | 12/1995 | Sekundur | 345/179 |

FOREIGN PATENT DOCUMENTS

| EP | 0 362 970 | 4/1990 |
| WO | WO 94/01834 | 1/1994 |

* cited by examiner

*Primary Examiner*—Jeffery Brier
(74) *Attorney, Agent, or Firm*—Oblon, Spivak, McClelland, Maier & Neustadt, P.C.

(57) ABSTRACT

An information input device including an information writing section for writing information on a writing medium, a position recognizing section for recognizing a position of the information writing section on the writing medium, and an information storing section for storing information obtained from the position recognizing section.

4 Claims, 45 Drawing Sheets

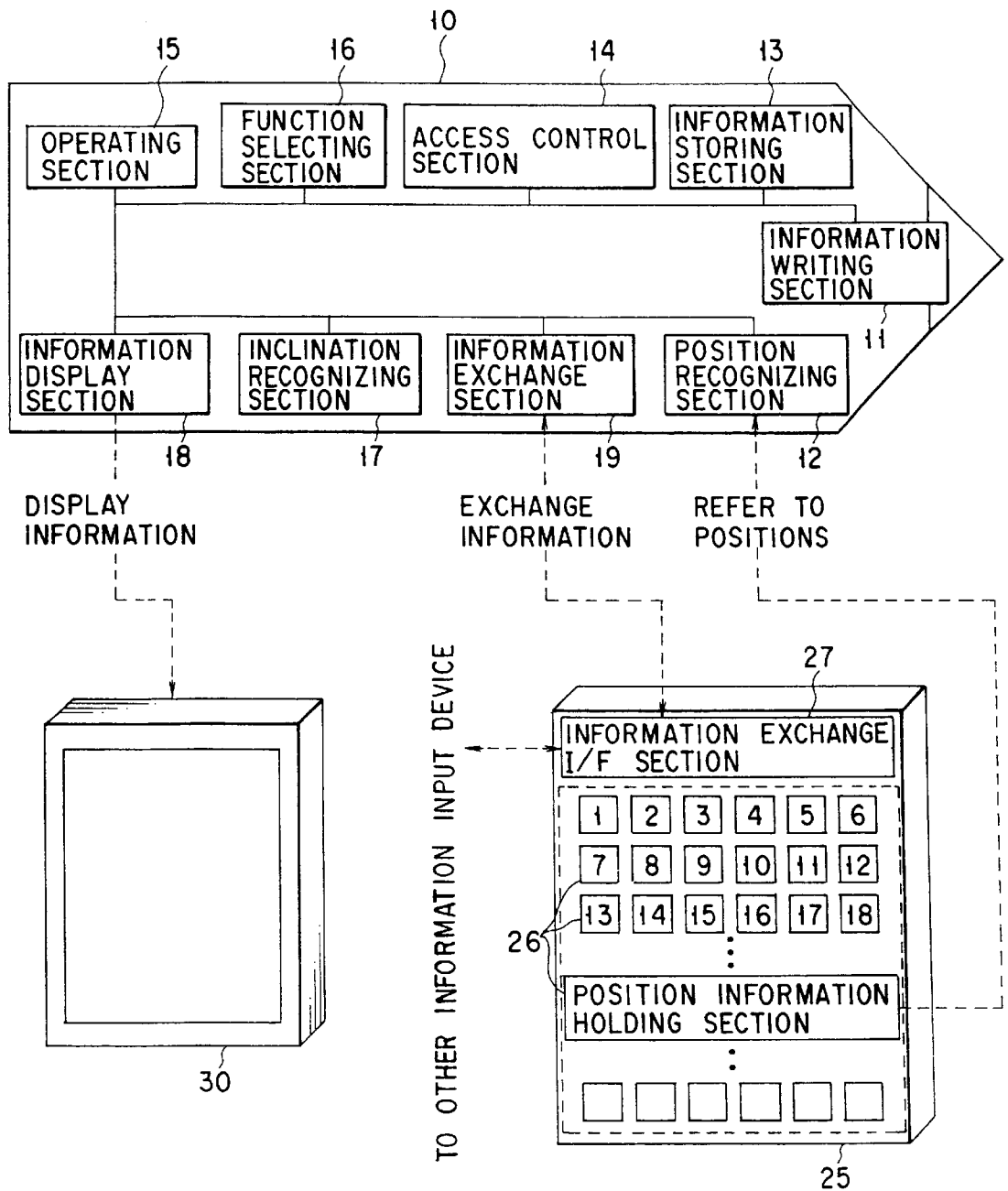
F I G. 6

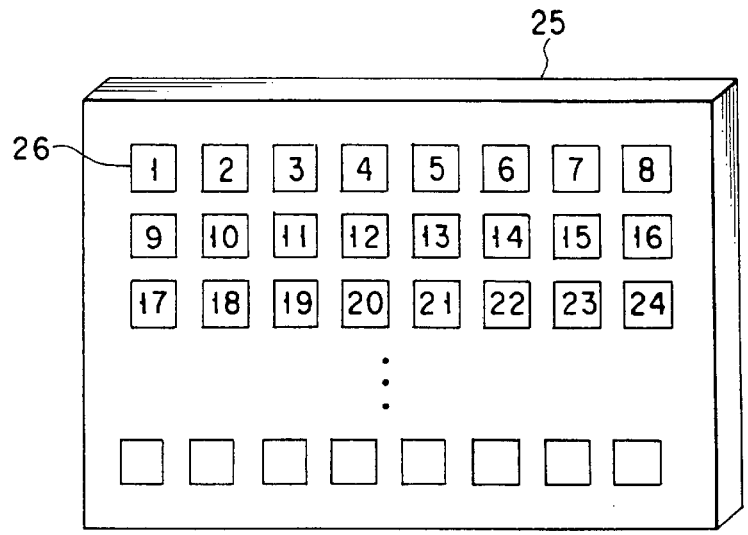
F I G. 7A
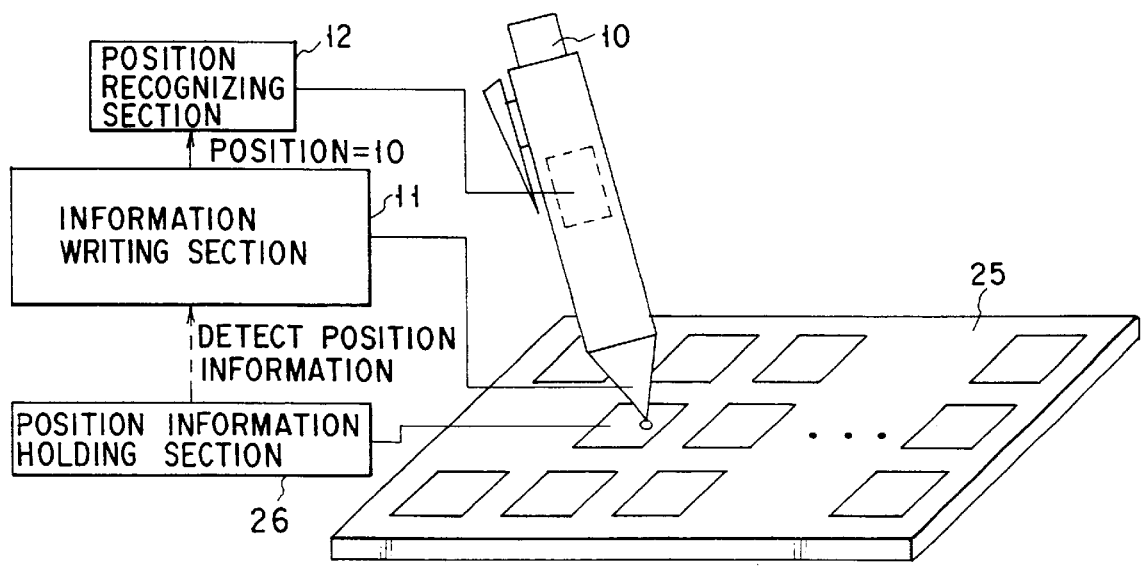
F I G. 7B

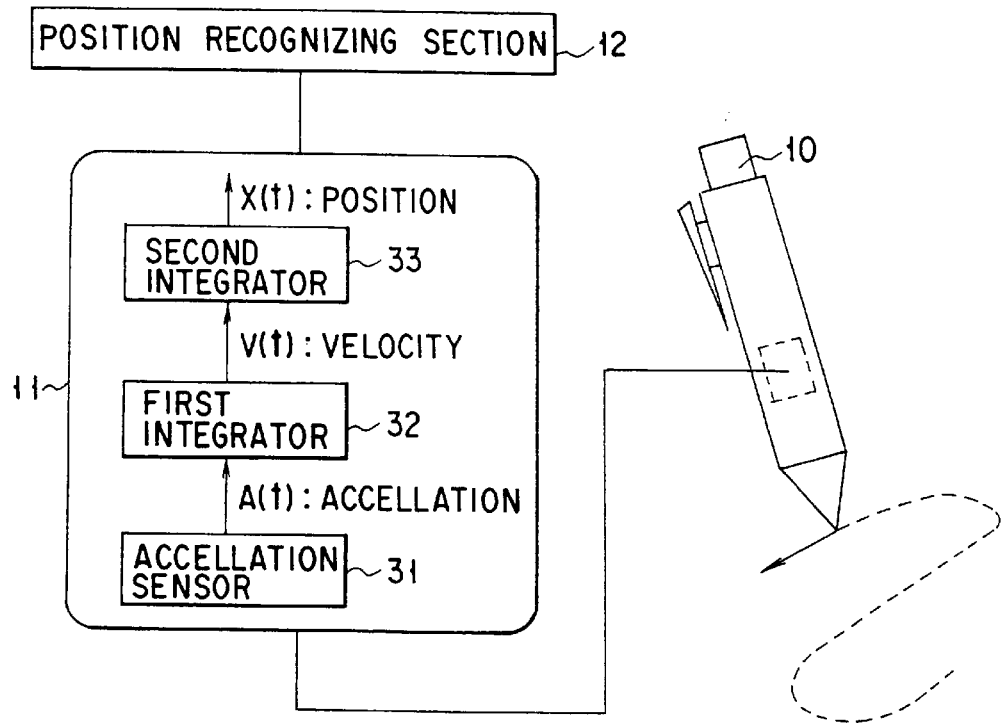
F I G. 8
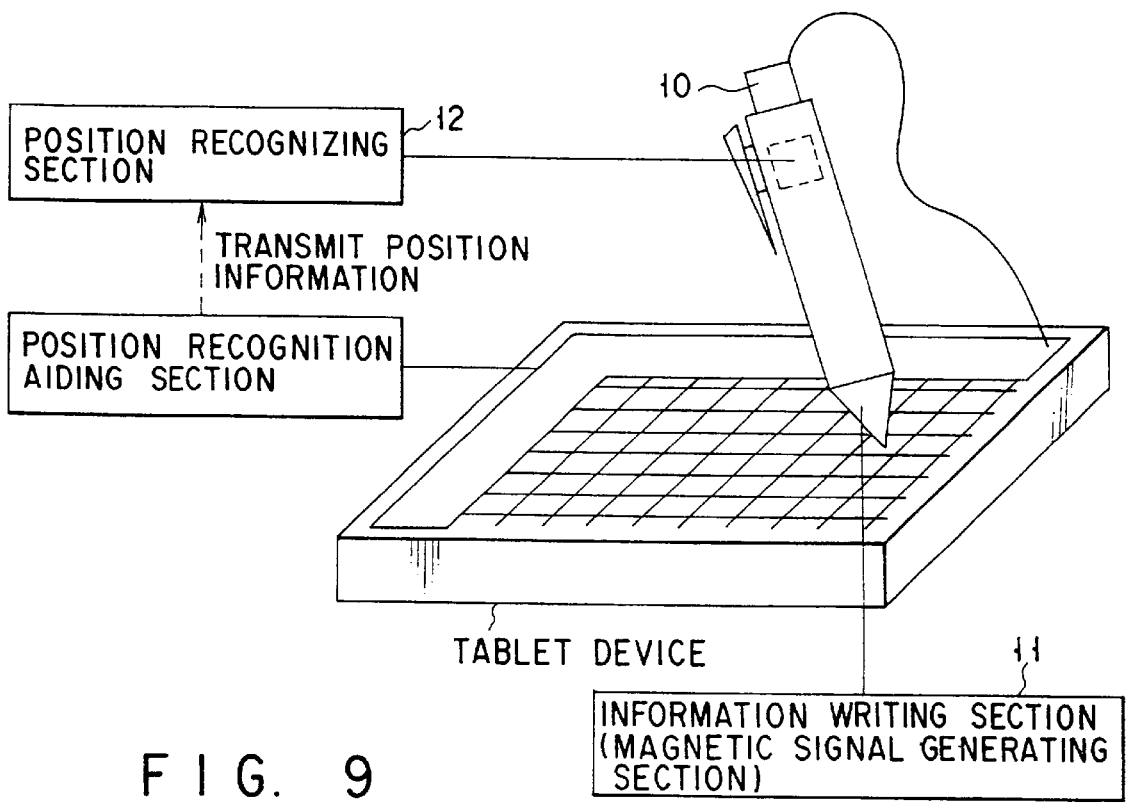
F I G. 9

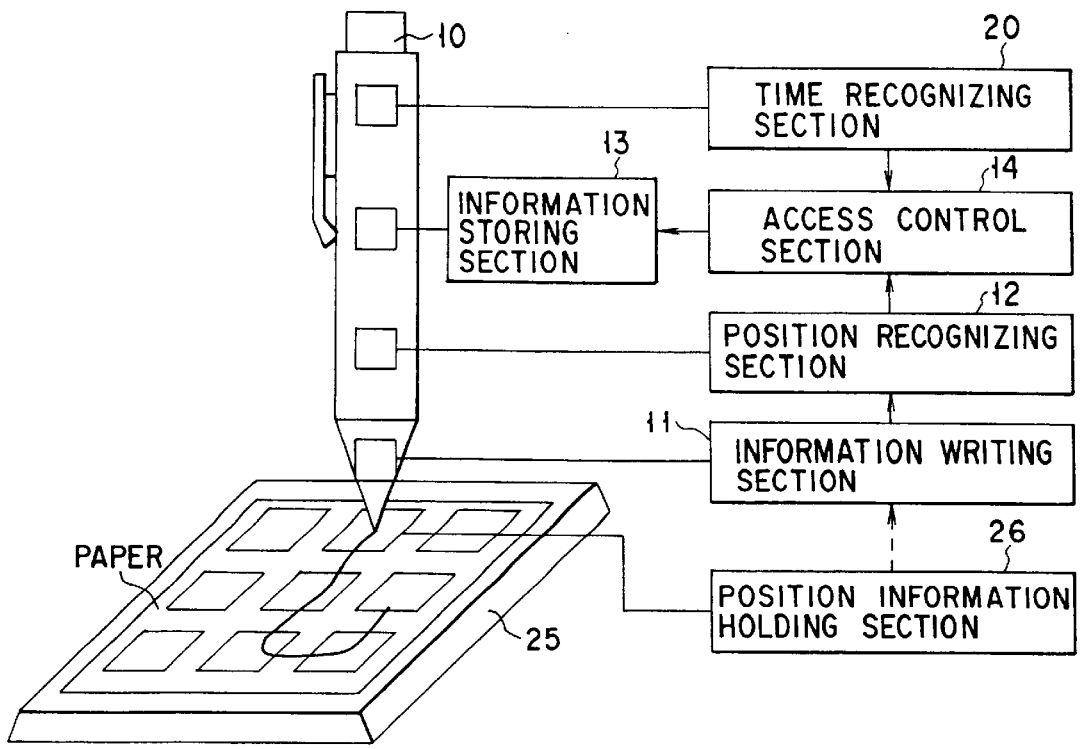
F I G. 10
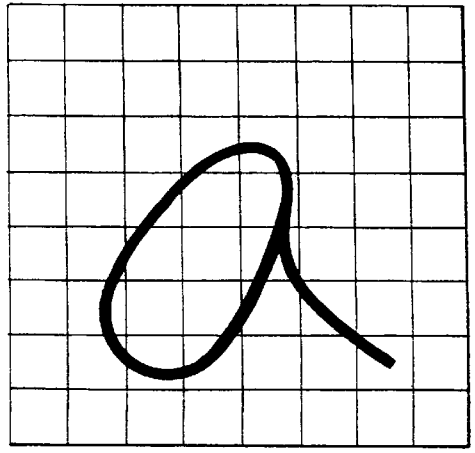
F I G. 11B      F I G. 11A

| | |
|---|---|
| (ADRS, TIME) | ---- WRITING INFORMATION CODE |
| ( −1 , −1 ) | ---- END CODE OF ONE STROKE WRITING ETC. |
| ( −2 , −2 ) | ---- WRITING SUBJECT CHANGING CODE |

FIG. 12

| | |
|---|---|
| WRITING SUBJECT CODE | ( −2 , −2 )<br>( LINE WIDTH CODE : 3 )<br>( LINE DENSITY CODE : COLOR CODE, DITHER CODE )<br>( −1 , −1 ) |
| WRITE INFORMATION CODE | ( 21 , 0000 )<br>( 20 , 0001 )<br>⋮<br>( −1 , −1 )  } STROKE INFORMATION OF "a"<br>( 10 , 0023 )<br>⋮ |
| WRITING SUBJECT CODE | ( −2 , −2 )<br>( LINE WIDTH CODE : 1 )<br>( LINE DENSITY CODE : COLOR CODE, DITHER CODE )<br>⋮ |
| WRITE INFORMATION CODE | ( 23 , 0000 )<br>( 31 , 0001 )<br>⋮ |

FIG. 13

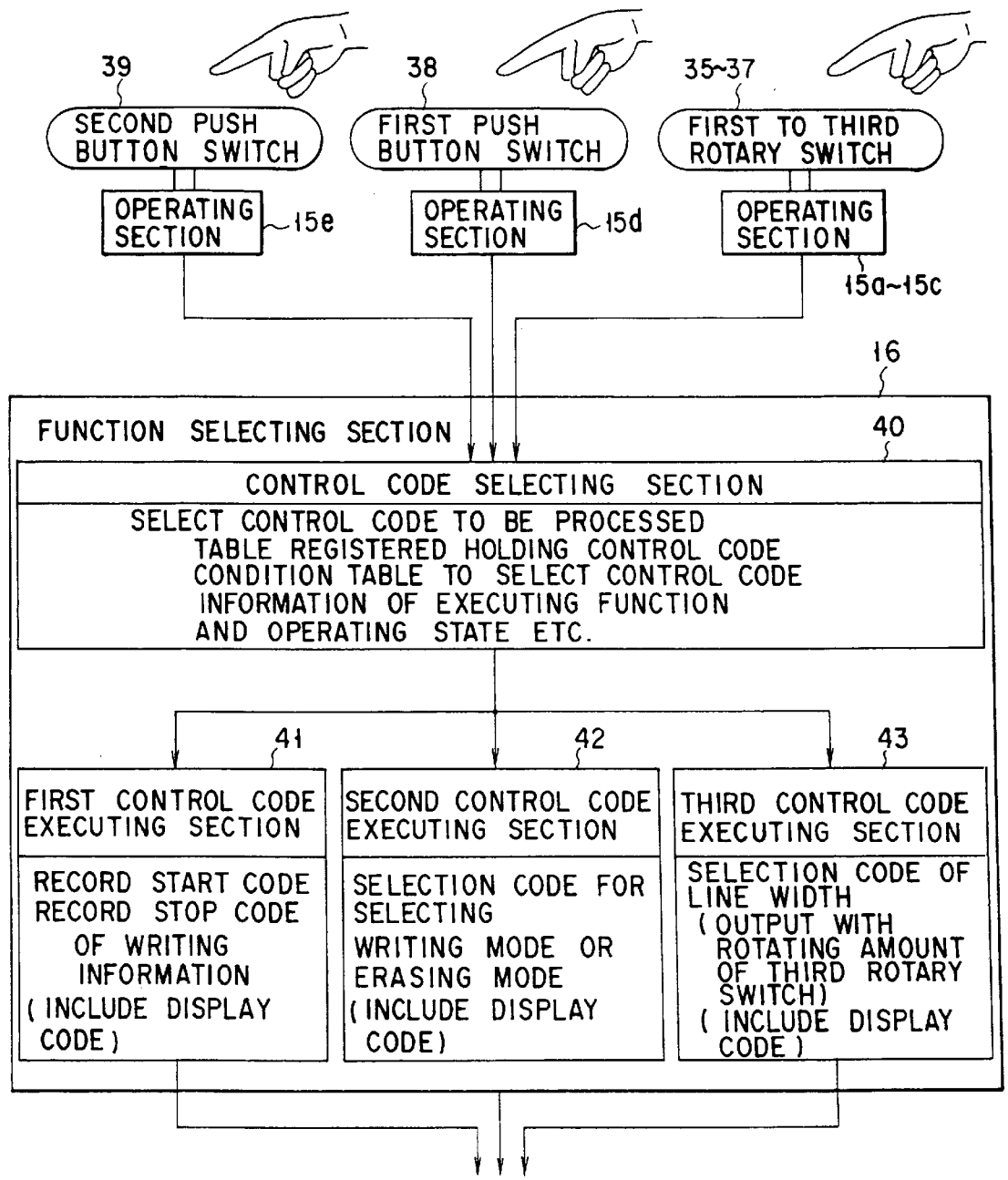
F I G. 18

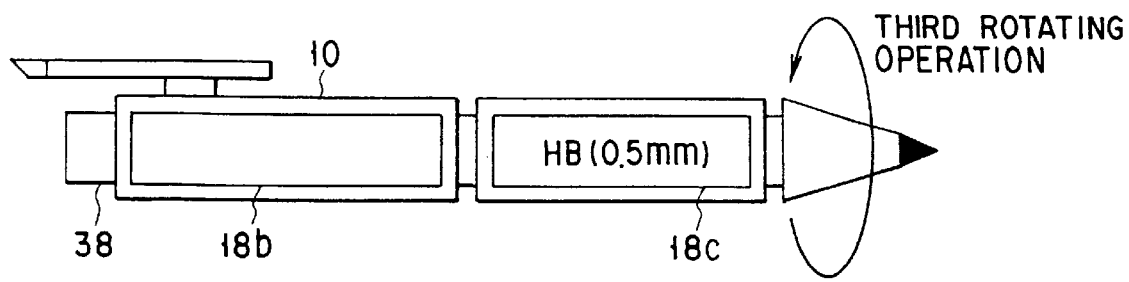
F I G. 21A
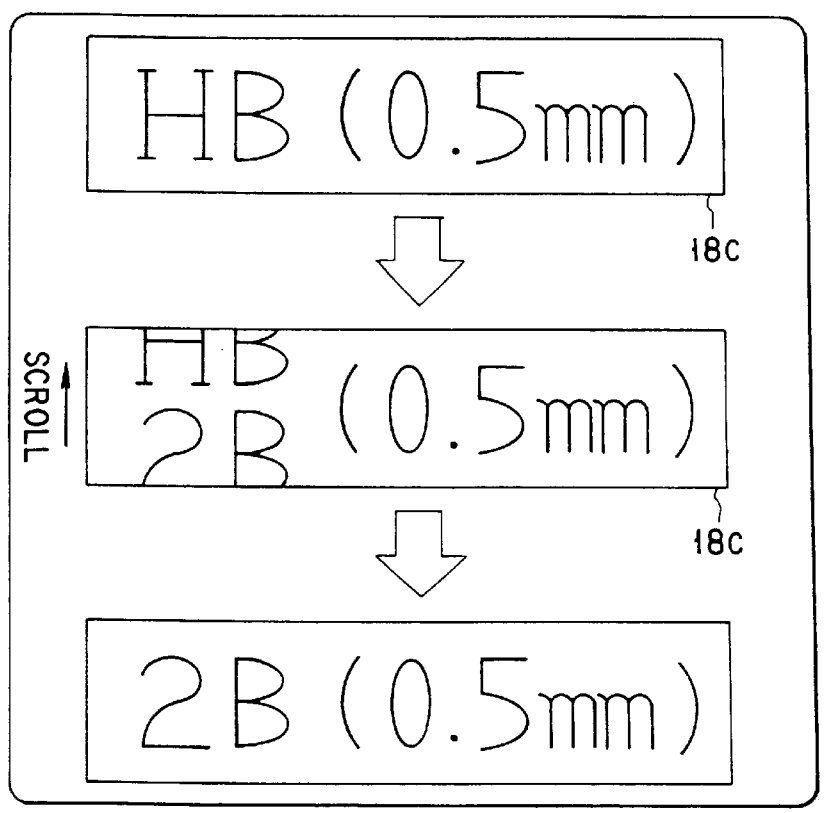
F I G. 21B

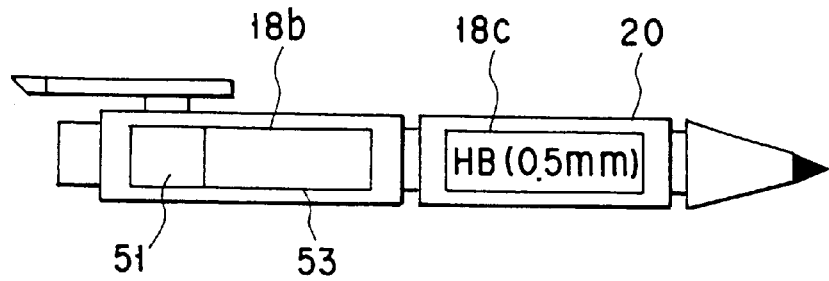
F I G. 23A
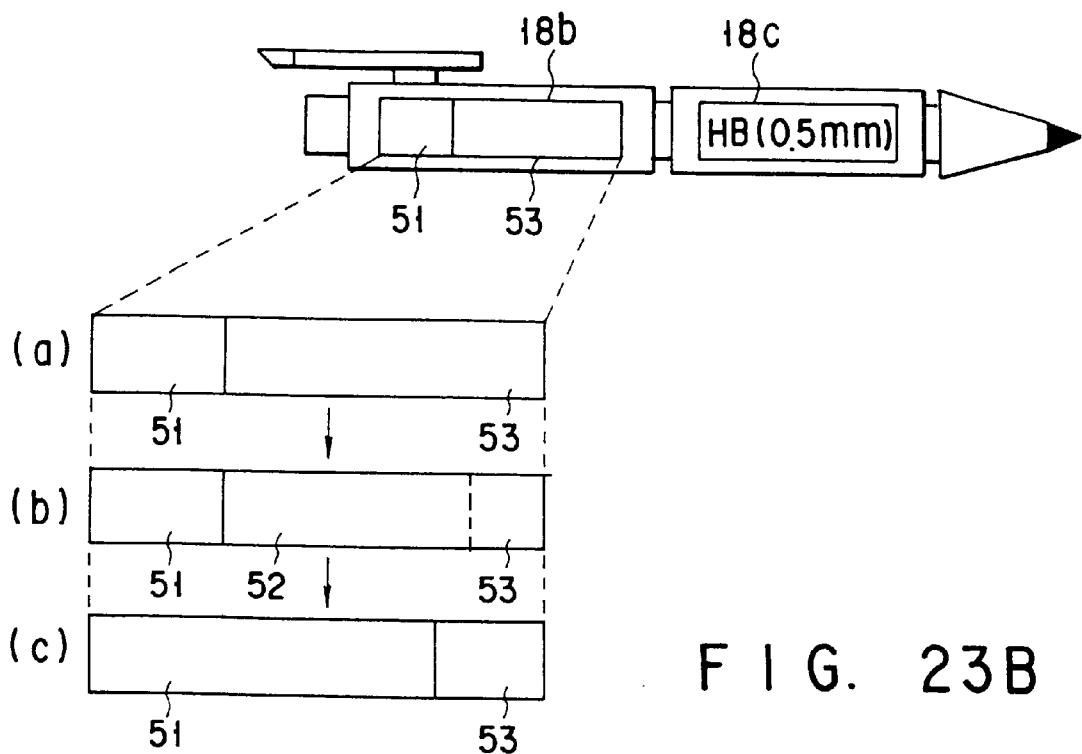
F I G. 23B
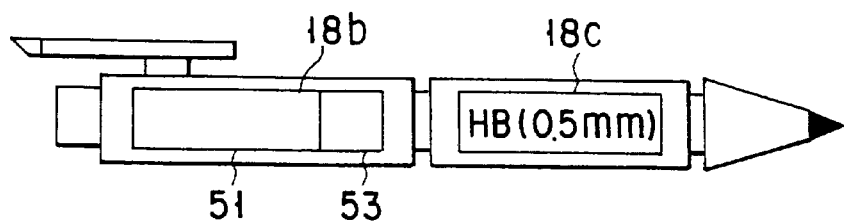
F I G. 23C

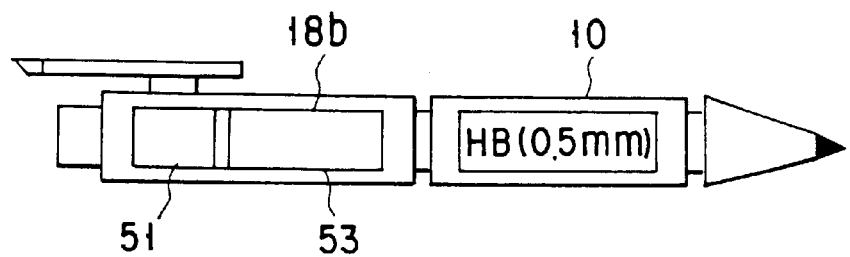
F I G. 24A
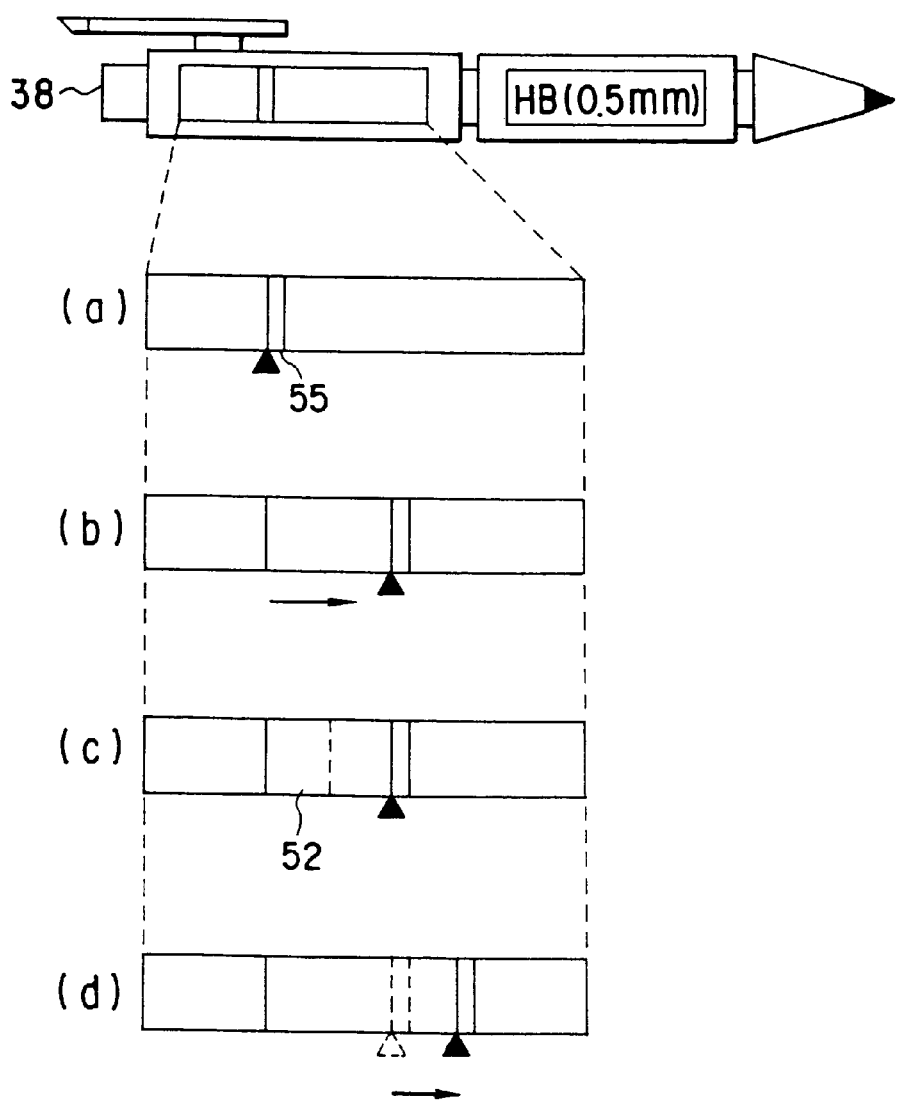
F I G. 24B

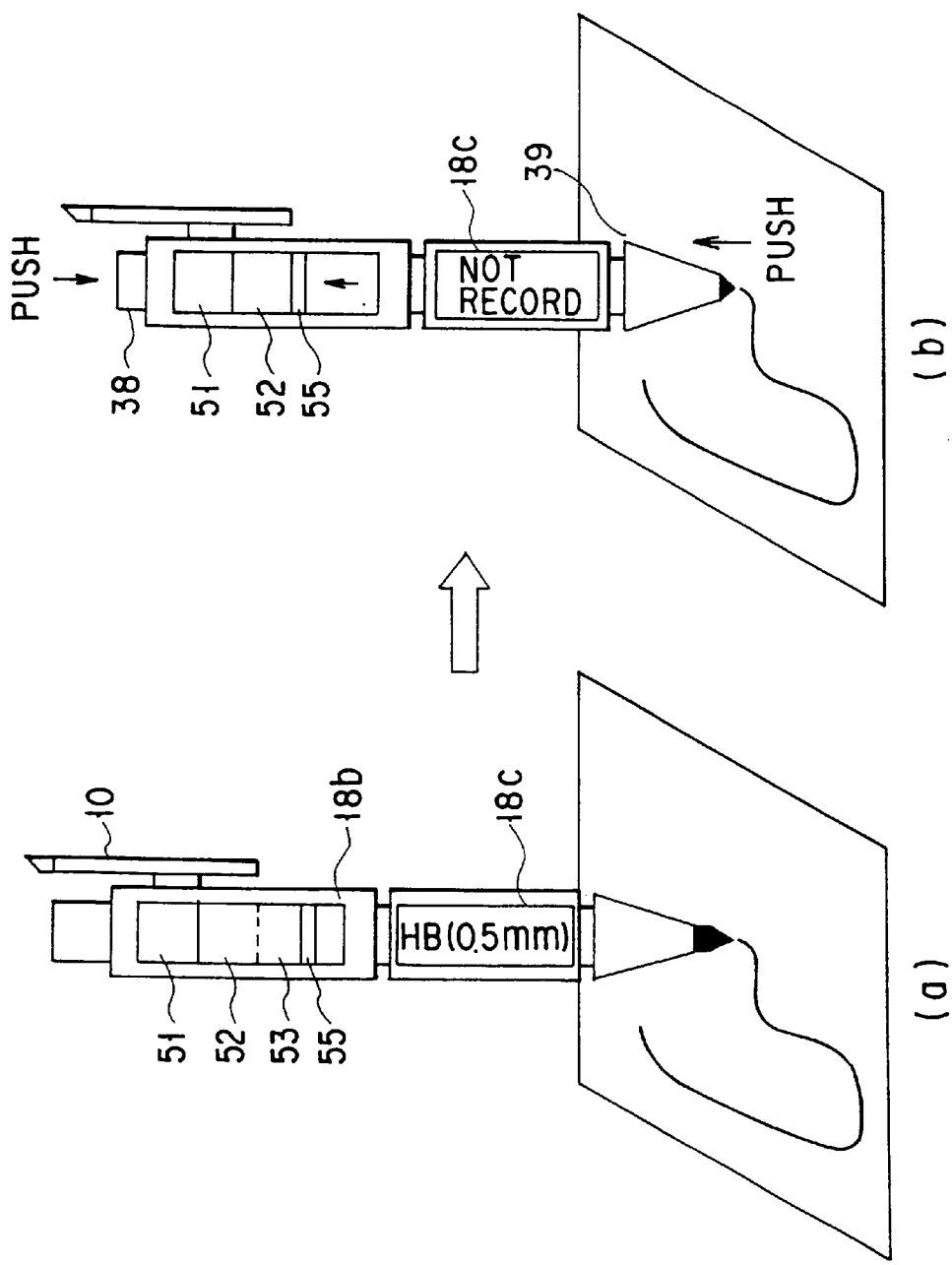
F I G. 25

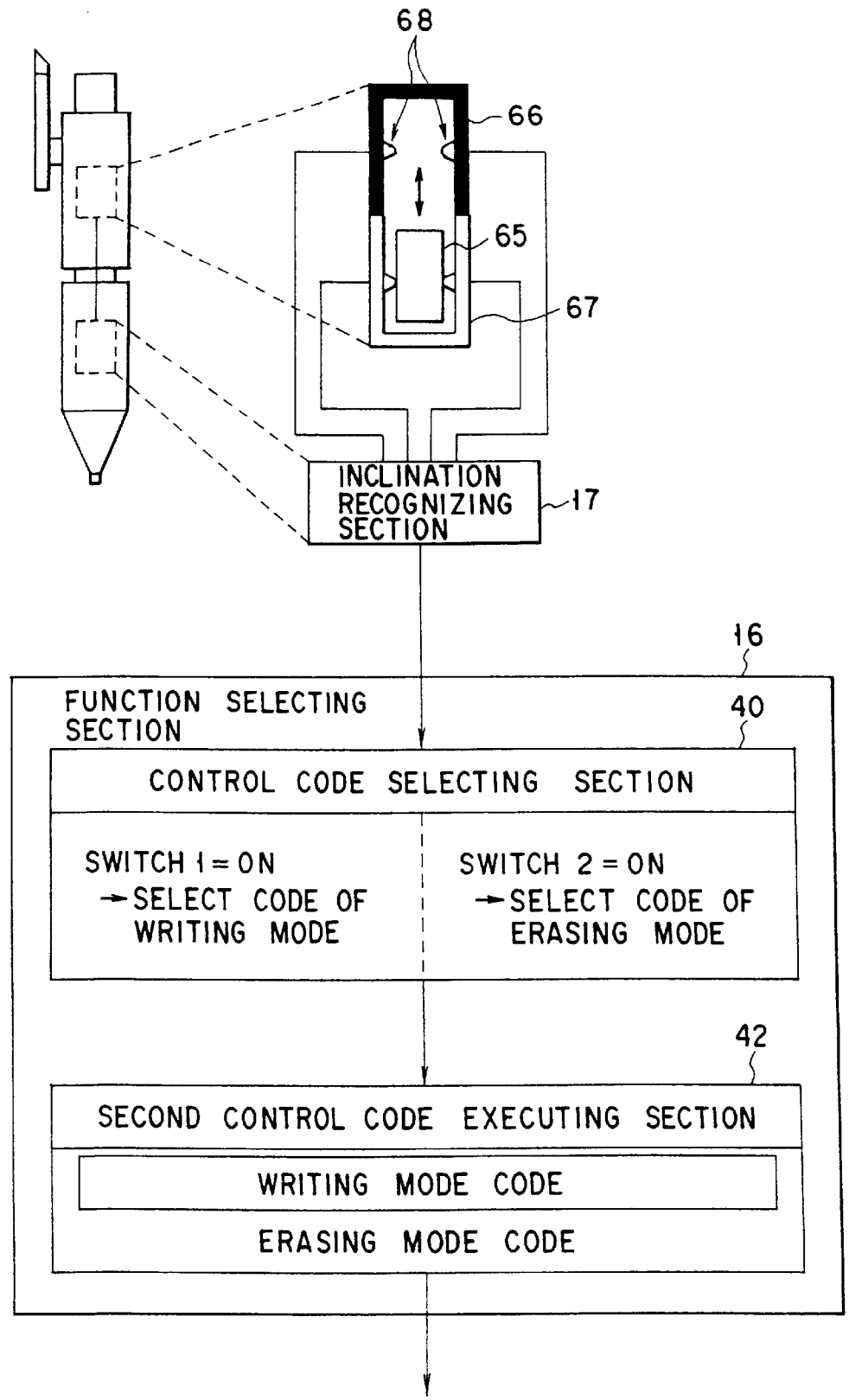
F I G. 30

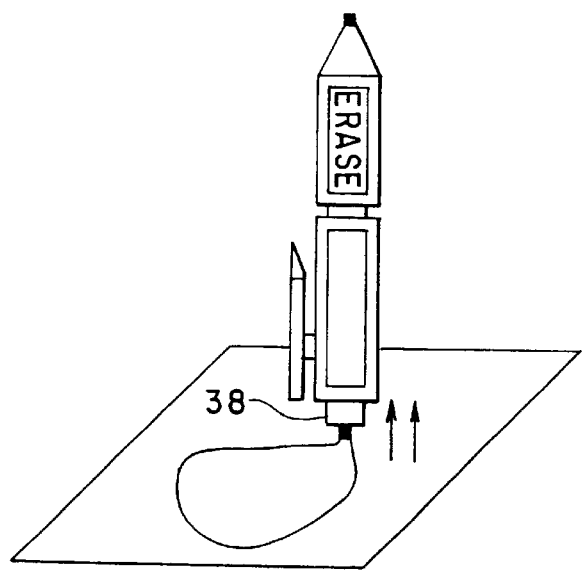
F I G. 31 A
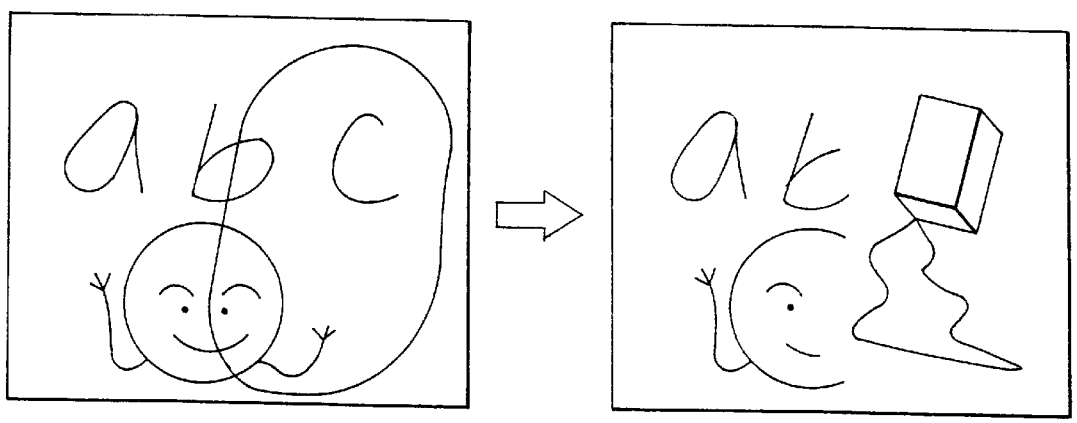
F I G. 31 B      F I G. 31 C

| | |
|---|---|
| (ADRS, TIME) | ---- WRITING INFORMATION CODE |
| ( -1 , -1 ) | ---- END CODE OF ONE STROKE WRITING ETC. |
| ( -2 , -2 ) | ---- WRITING SUBJECT CHANGING CODE |
| ( -3 , -3 ) | ---- WRITING INFORMATION CODE OF ERASING AREA |

FIG. 32

| | |
|---|---|
| WRITING SUBJECT CODE | ( -2 , -2 )<br>( LINE WIDTH : 3 )<br>( LINE DENSITY CODE : COLOR CODE, DITHER CODE )<br>( -1 , -1 ) |
| WRITE INFORMATION CODE | ( 21 , 0000 )<br>( 20 , 0001 )<br>⋮<br>( -1 , -1 )<br>( 10 , 0023 )<br>⋮ |
| WRITING INFORMATION CODE OF ERASING AREA | ( -3 , -3 )<br>( 25 , 0145 )<br>( 26 , 0147 )<br>( 59 , 0150 )<br>⋮<br>( -1 , -1 ) ←— END CODE OF ERASING AREA |
| ⋮ | ⋮ |

FIG. 33

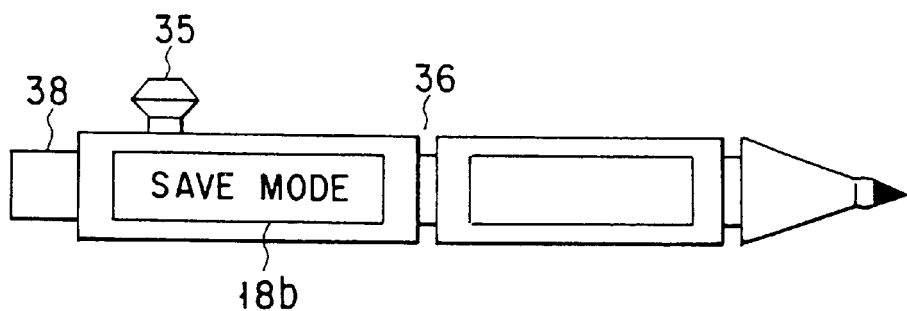
F I G. 35A
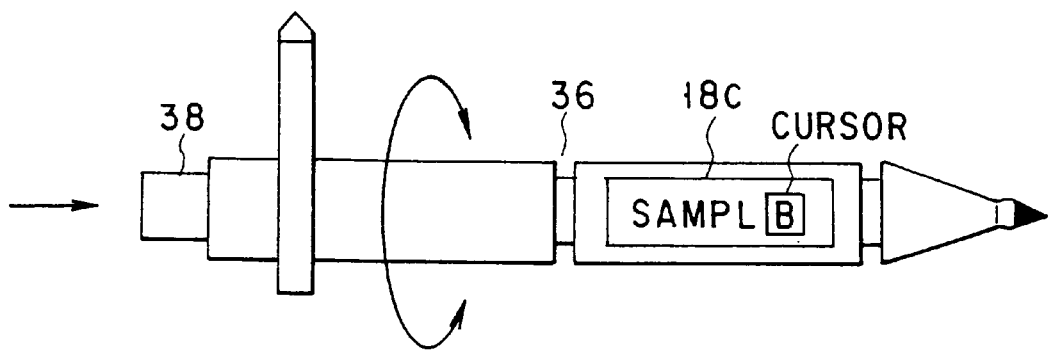
F I G. 35B
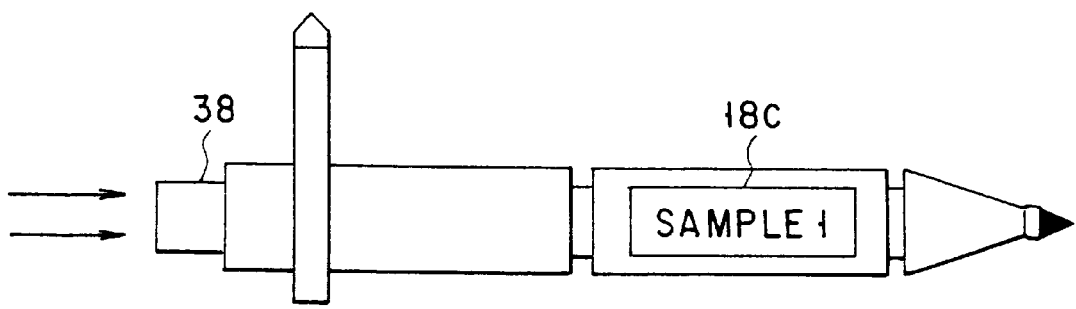
F I G. 35C

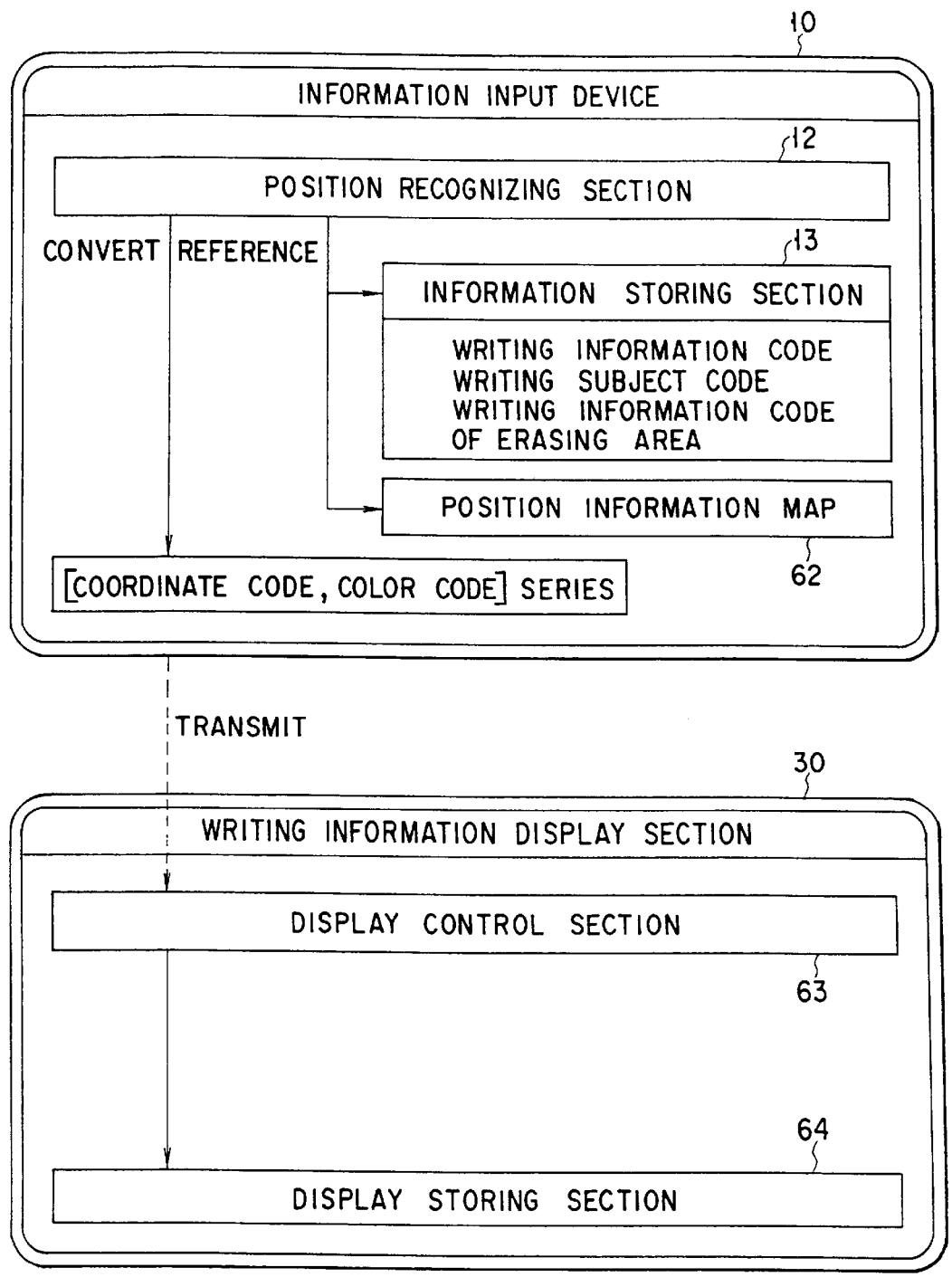
F I G. 41

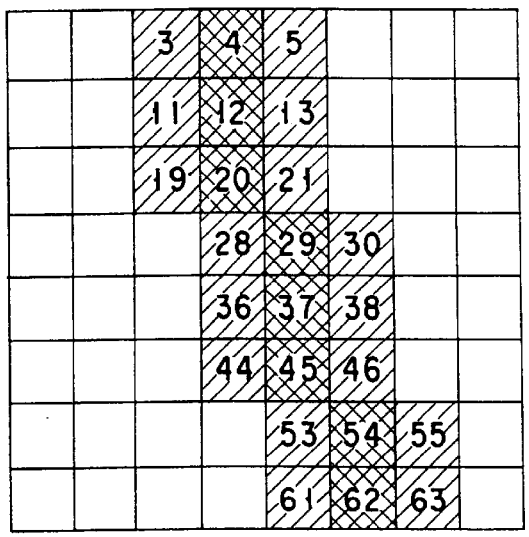
WRITING PATTERN OF WIDE LINE ON POSITION INFORMATION HOLDING DEVICE (WIDTH : 3)
RECORDED WRITING PATTERN
DISPLAYED WRITING PATTERN
RECORDING INFORMATION OF WRITING PATTERN
(WIDTH): 3
⋮
( 4, 0000)
(12, 0002)
⋮
(-1, 0019)
FIG. 42A     FIG. 42B
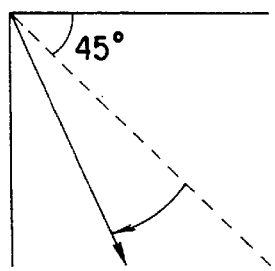
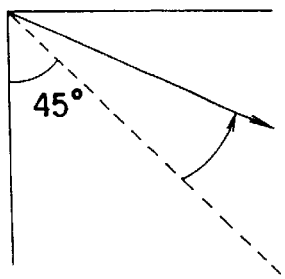
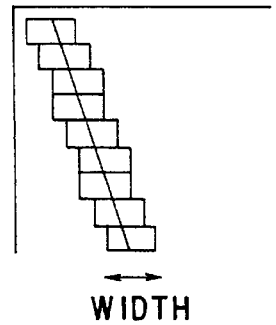
WIDTH
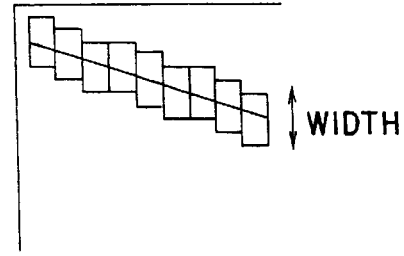
WIDTH
FIG. 42C     FIG. 42D

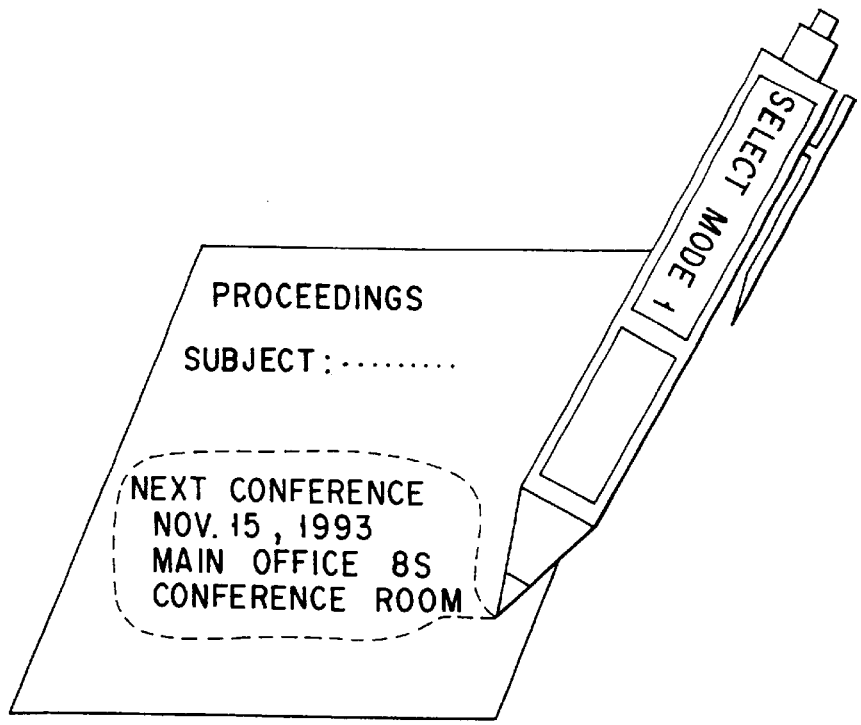
F I G. 44A
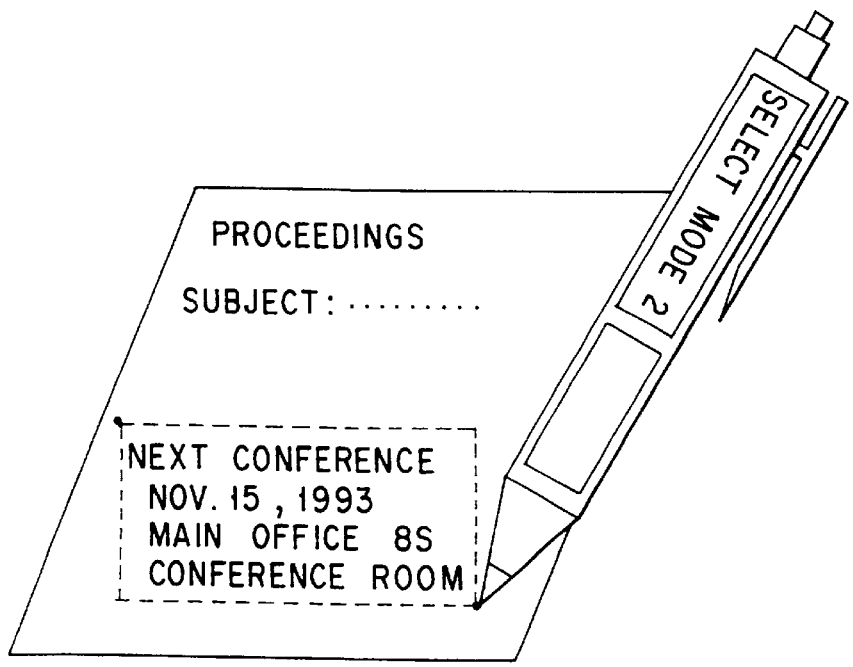
F I G. 44B

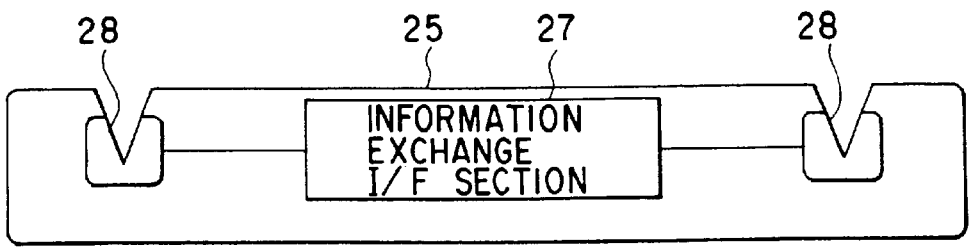
F I G. 45
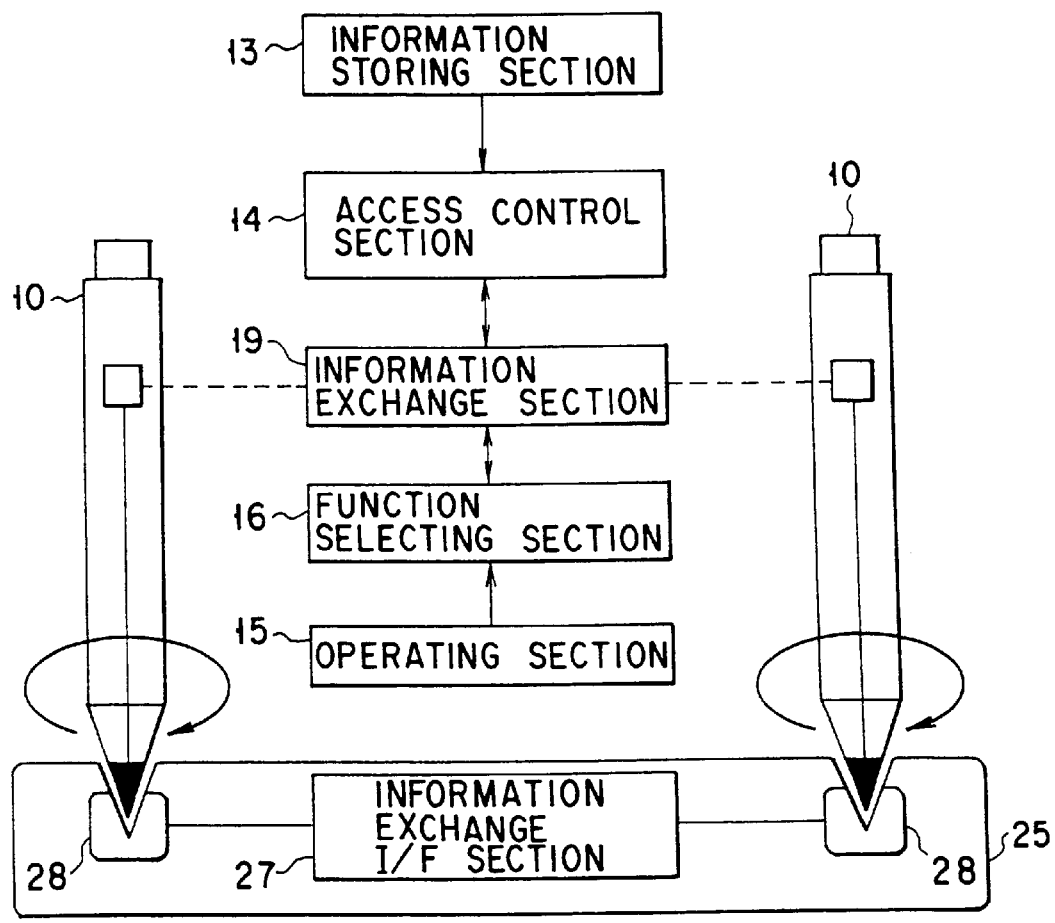
F I G. 46

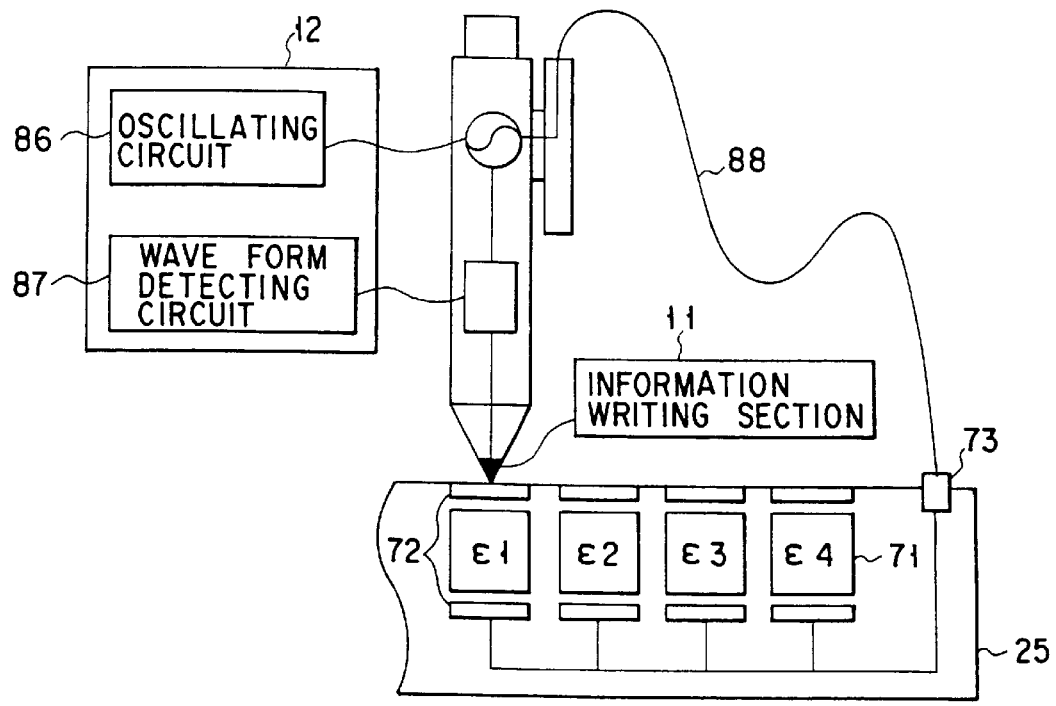
F I G. 47
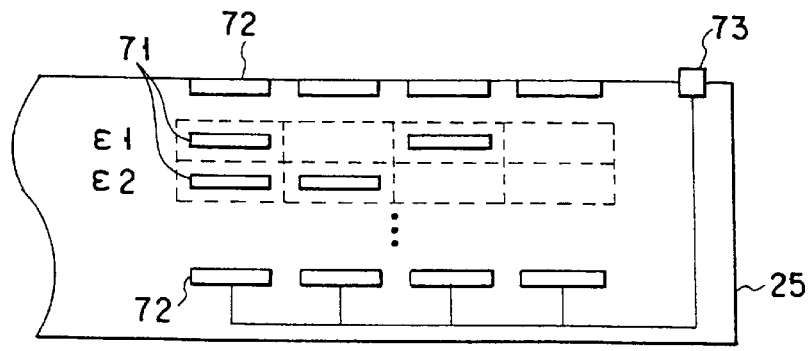
F I G. 48

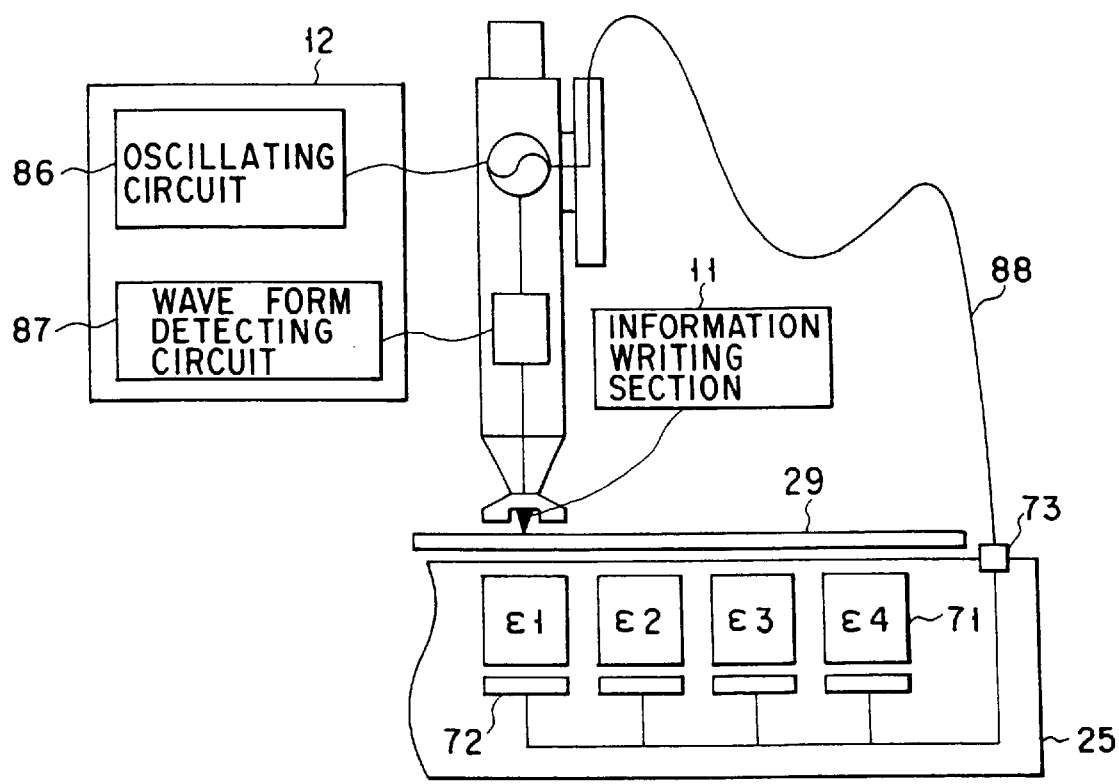
F I G. 49

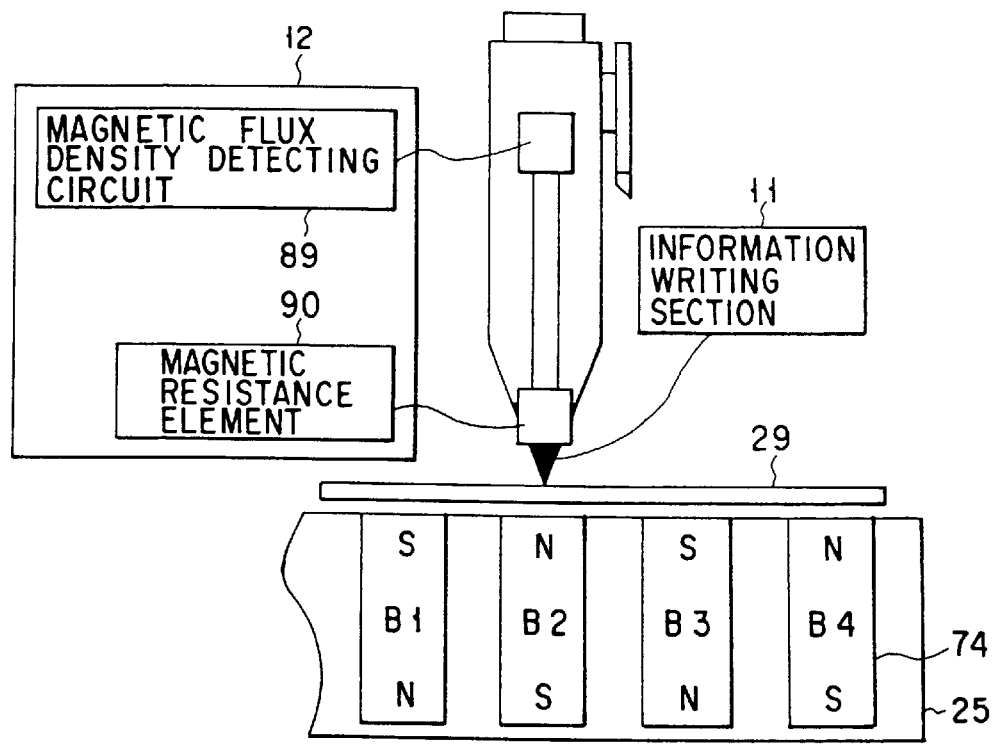
F I G. 50A
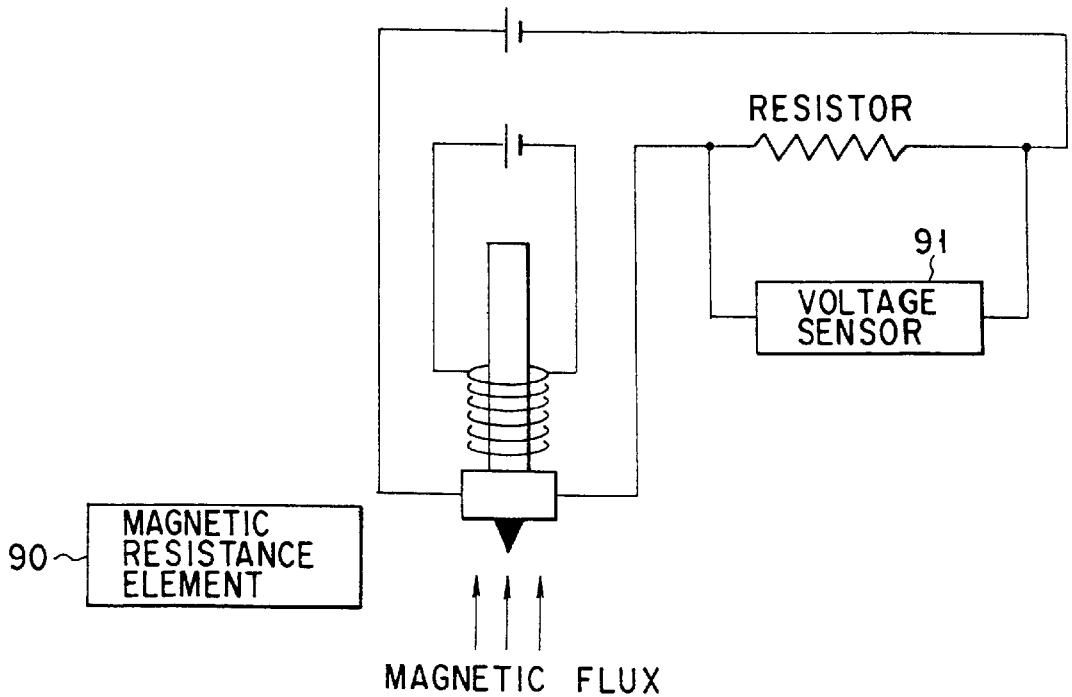
F I G. 50B

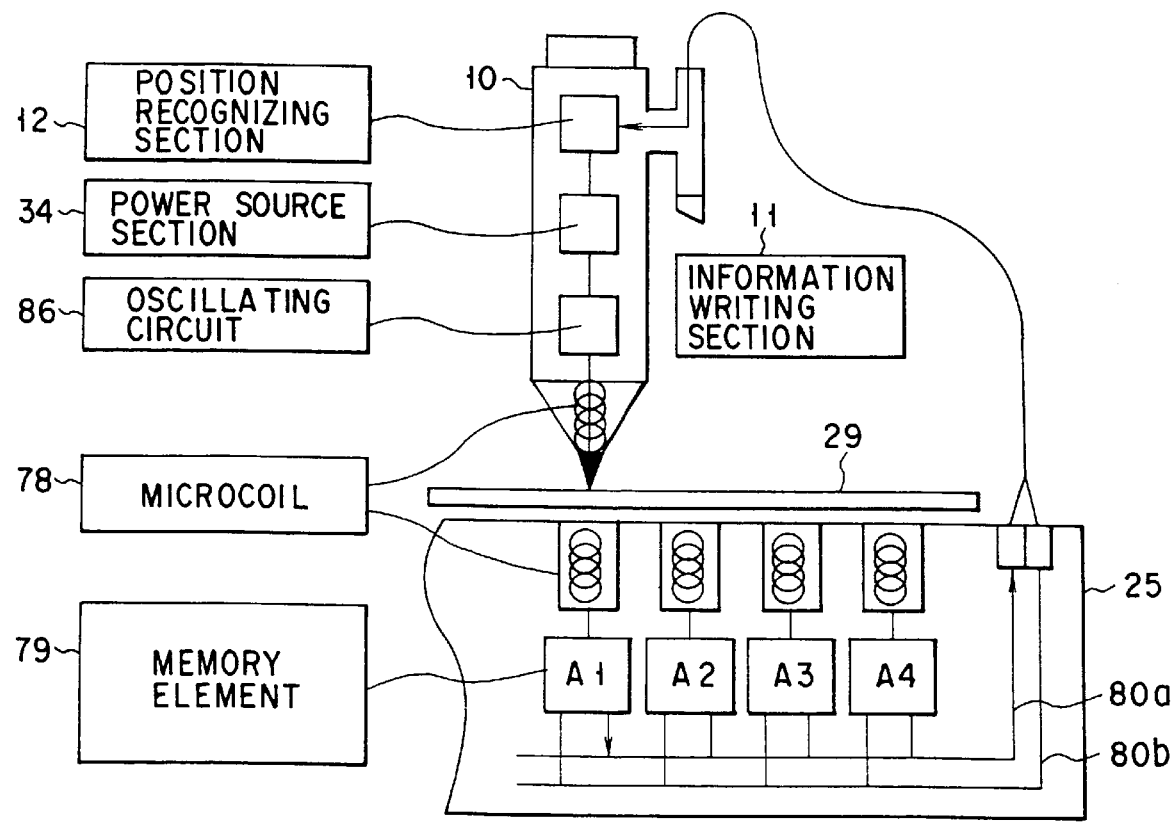
F I G. 53

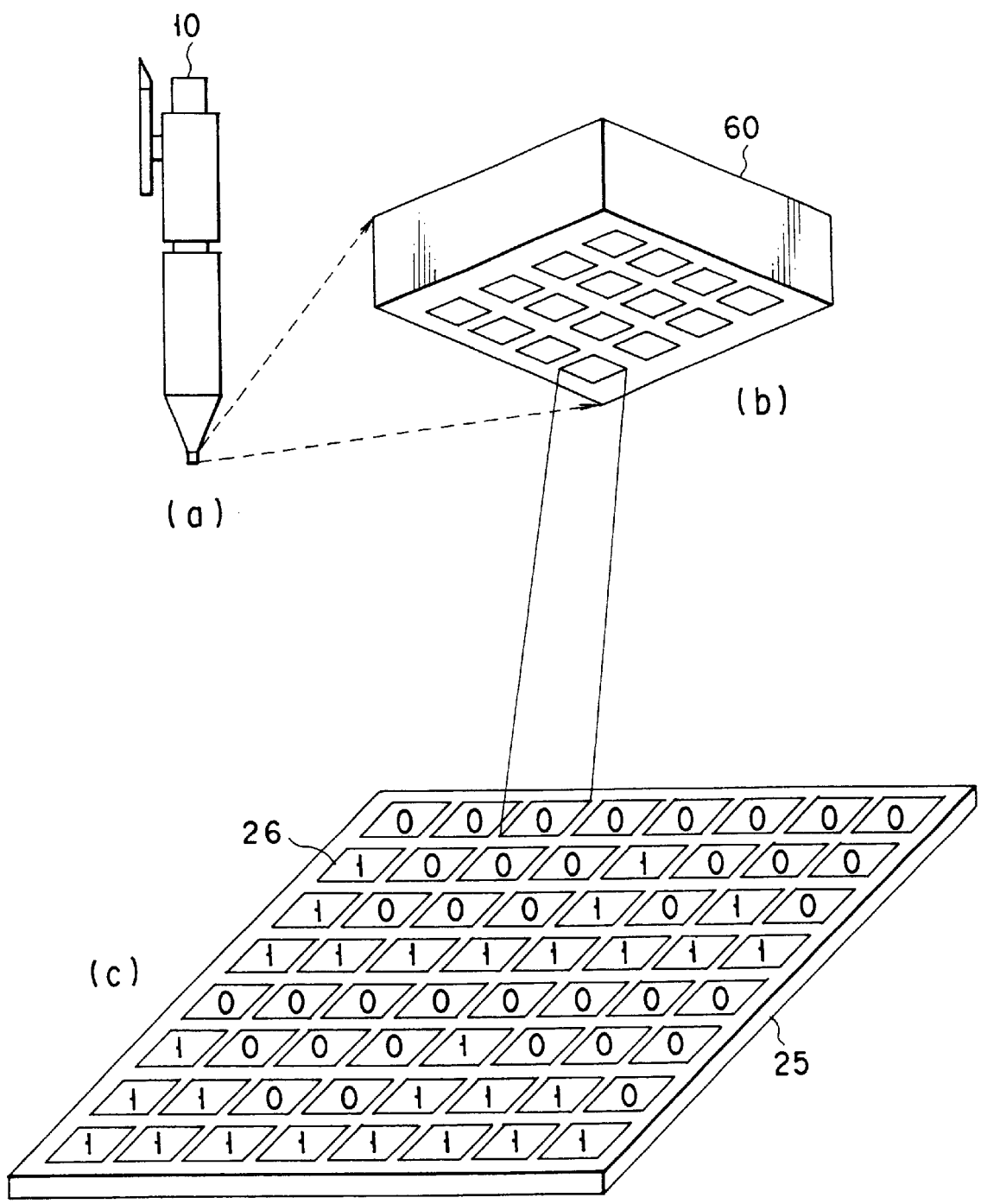
F I G. 54

FIG. 55A

```
0 0 0 0   — FRAME IDENTIFYING
1 0 0 0     INFORMATION
1 0 1 0   — 4 BIT ADDRESS
1 1 1 1     INFORMATION
```

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |

F I G. 56A

| 1.1 | 2.1 | 3.1 | 4.1 | 5.1 |
|---|---|---|---|---|
| 1.2 | 2.2 | 3.2 | 4.2 | 5.2 |
| 1.3 | 2.3 | 3.3 | 4.3 | 5.3 |
| 1.4 | 2.4 | 3.4 | 4.4 | 5.4 |
| 1.5 | 2.5 | 3.5 | 4.5 | 5.5 |

F I G. 56B

| 1 | 2 | 3 | 4 | 5 |
|---|---|---|---|---|
| 6 | 7 | 8 | | |
| 11 | 12 | 13 | | |
| | | | | |
| | | | | 14 |

F I G. 56C

| 1 | 2 | 3 | 4 | 5 |
|---|---|---|---|---|
| 2 | 1 | 5 | 4 | 3 |
| 3 | 5 | 1 | 1 | 3 |
| 4 | 2 | 2 | 4 | 4 |
| 5 | 3 | 3 | 2 | 1 |

F I G. 56D

INFORMATION INPUT DEVICE, POSITION INFORMATION HOLDING DEVICE, AND POSITION RECOGNIZING SYSTEM INCLUDING THEM

This application is a continuation of application Ser. No. 08/475,099, filed on Jun. 07, 1995 now abandoned which is a divisional of application Ser. No. 08/208,720 filed on Mar. 11, 1994 now abandoned.

BACKGROUND OF THE INVENTION

1. Field of the Invention

The present invention relates to an information input device, a position information holding device, and a position recognizing system, including these devices, for recognizing a position upon information input.

2. Description of the Related Art

Conventional computers are normally used as information processing devices. However, recent downsizing techniques for computers have remarkably advanced, and with the advent of lap-top computers, pen-input type computers, or palm-top computers, a person always carries and uses a computer nowadays. In such a situation, a computer is expected to be used as an information input (storing) device and an information output (reproducing) device.

Information input/output processing in a lap-top computer shown in FIG. 1 is realized by a set of a display device, a character input device, and a mouse-type pointing device. Referring to FIG. 1, the display device is used as input/output information display means, the character input device is used as character input means, and the mouse-type pointing device is used as means for designating an item in a menu displayed on the display device or image information input means.

In order to realize high portability in a computer, downsizing of a character input device is necessary. However, when the character input device is downsized, it becomes difficult to naturally input characters. For this reason, the portability of a computer is limited by the size of the character input device.

Thus, a pen-input type computer shown in FIG. 2 has been developed. Referring to FIG. 2, information input/output processing is realized by a set of an information input device obtained by integrating a display device and a position recognizing device, and a pen-type pointing device. In this case, since the pen-type pointing device is also used as character input means, no character input device is required, thus increasing the portability of a computer.

In the pen-input type computer, since the size of the display device must coincide with that of the position recognizing device, and the pen-input type computer must comprise both the display device and the position recognizing device, the portability of the computer is limited by the sizes of the display device and the position recognizing device. Furthermore, the display device and the position recognizing device having a large area and a high resolution require higher cost than that of other devices. In this case, the power consumption increases, and a battery becomes large, resulting in an increase in total weight of the computer, and a decrease in continuous operating time using the battery.

A palm-top computer comprising a compact display device and position recognizing device has been developed. However, since the palm-top computer has a small information input screen, it is difficult to naturally input information. Furthermore, since the palm-top computer has a small information input screen, displayed information is not easy to see if the display resolution is low. Even when the display resolution is high in the palm-top computer, if an A4-size document is displayed, characters are displayed in small size and not easy to see. These problems are directly associated with handiness of an information input device.

Therefore, the use of the palm-top computer is limited to an application for personal address information, schedule information, and the like.

The computer has two different output modes. The first output mode is an output mode for displaying already input information, and the second output mode is an output mode for confirming an input state upon input of information.

In the first output mode, when an importance is placed on the display area, an output device having a certain size is required, and a computer having such an output device is normally used in a specific place. Furthermore, when an importance is placed on portability, limitations on the output due to a compact size of the computer are easily compromised. This is because, in this case, fine output information which is more easy to recognize can be obtained by a large-scale output device, as needed.

In order to attain a flexible, natural information input operation in the second output mode, an information display screen and an information input screen having certain sizes are necessary. In addition, since information to be input may become at hand at any unspecified place, high portability is required. In order to accurately record input information, high display and input resolutions are required. This is because, in this case, information to be input is often transitory, and it is required to accurately record information at that instance. Therefore, in this case, in order to obtain an environment equivalent to that using an A4-size paper sheet, an A4-size output device is required, thus limiting portability.

As a conventional input device, a device called a tablet shown in FIGS. 3 and 4 is used.

In a tablet shown in FIG. 3, conductive lines are arranged in the x-y directions on the tablet. When a magnetic field is applied from a pen-type pointing device onto the tablet, an inducted voltage is generated in a conductive line at the position indicated by the pointing device, and x- and y-coordinate detecting circuits detect the x- and y-coordinates of that point based on the generated voltage, thus obtaining the absolute coordinates of the indicated position.

In a tablet shown in FIG. 4, pulse detecting circuits are arranged at least three out of four corners of the tablet. A pulse is applied to a predetermined position on the tablet using a pen-type pointing device, and a coordinate detecting circuit can detect the absolute coordinates of the predetermined position on the basis of a phase difference of signals from the pulse detecting circuits.

In order to allow a flexible, natural information input operation for a user, tablets having required information input areas and input resolutions must be selectively used in correspondence with situations. For this reason, it is preferable that various tablets be present everywhere, or a user carry various tablets. In this case, a reduction in cost of tablets and downsizing of tablets pose a problem.

As described above, in the conventional information input device, the information input device and the tablet must be integrated, and it is hard to realize an information input device having various input areas. Furthermore, when information is input using the pen-type pointing device, the input information must be displayed at the input position of the pointing device. Therefore, in the conventional information input device, since the input device, the display device, and the tablet must be integrated, it is difficult to realize an information input device having various input areas.

Therefore, paper and pens are used as normal portable information input media. An information input method using a paper sheet and a pen is natural to a user. On the other hand, an information input operation using a conventional computer makes a user conscious of the use of an electronic device, and handiness equivalent to that of an information input operation using a paper sheet and a pen is hardly realized.

In an information input operation using a paper sheet, a pen, an eraser, and the like, various operations are attained by using tools themselves, and such an operation is natural to a user in terms of explicitness of an operation. However, since various input operations and function selecting operations in an information input operation of a conventional computer are attained in accordance with a menu displayed on the display device, they have poor explicitness of an operation.

When a paper sheet and a pen are frequently used as information input media, it is required to input information written on the paper sheet to a computer. At this time, it is preferable that an information input operation to a computer be easily performed.

Conventionally, in order to input information recorded on a paper sheet to a computer, a scanning input device such as an image scanner must be used. The image scanner is large in size, requires cumbersome input operations, and is normally shared by a plurality of users. Therefore, it is hard to say that satisfactory conventional information input means is realized.

As described above, in the conventional information input device, the portability is limited by the sizes of the display device and the position recognizing device. When the display device and the position recognizing device are rendered compact, an inputtable information size is reduced, or a cumbersome input operation is required. In addition, when a high-resolution information input operation is to be realized, a high-resolution display device is required, resulting in high cost of the device itself. Furthermore, since various input operations and function selecting operations in the information input device are performed in accordance with a menu on the display device, the information input device has poor explicitness of an operation.

When information recorded on a paper sheet is input to a computer, an image scanner or the like must be used. However, since the image scanner is large in size, requires cumbersome operations, and is normally shared by a plurality of users, it is difficult to achieve an easy input operation.

As described above, since the conventional information input device makes a user conscious of the use of an electronic device, a satisfactory information input method can hardly be provided.

SUMMARY OF THE INVENTION

It is an object of the present invention to provide an information input device which has high portability and a wide information display screen and information input surface, allows an input operation and a function selecting operation having explicitness, and allows a natural information input operation by naturally coupling a paper sheet and the information input device.

More specifically, it is an object of the present invention to provide an information input device with high portability, in which information is input at an instance when information is written on a paper sheet as a display device with high portability.

The arrangement of the overall information input device according to the present invention will be briefly described below. That is, as shown in FIG. 5, an information input device 10 comprises an information writing section 11 for writing information on a writing medium, a position recognizing section 12 for obtaining the absolute position of the information writing section 11 on the writing medium, an information storing section 13 for storing information from the position recognizing section 12, the state of the information input device 10, and the like, a function selecting section 16 for selecting a function to be executed in accordance with an operation to the device or the inclination state of the device, and executing the selected function, and an access control section 14 for controlling accesses to the information storing section in accordance with the selected function.

The information input device also comprises an operating section 15, including buttons, switches, and the like, for detecting a mechanical operation, and supplying a detection signal to the function selecting section, or an inclination recognizing section 17 for recognizing the inclination state of the device itself, and supplying a recognition signal to the function selecting section 16. The device may also comprise an information display section 18 for displaying a selected function or a written image, and an information exchange section 19 for exchanging writing information with an external information device. Furthermore, when the information writing section 11 is used for the position recognizing section 12, position recognition with high precision can be attained.

It is effective to use the information input device 10 as a set with a position information holding device 25 or an information display device for displaying the operating state of the device or written image information. The position information holding device 25 includes a position information holding sections 26 (constituting a position recognizing system according to the present invention) each of which holds unique position information corresponding to its point on the device having a flat surface, and allows the position recognizing section 12 to read the position of a pen tip 60 by bringing the information writing section 11 to be close to (or into contact with) each position information holding section.

Alternatively, the position information holding device 25 may comprise an interface section for coupling information exchange sections 19 of a plurality of information input devices 10 and be used as a set with the information input device 10, thus allowing easy information transfer.

An information input device according to the invention includes an information writing section for writing information on a writing medium; position recognizing section for recognizing a position of the information writing section on the writing medium; and an information storing section for storing information obtained from the position recognizing section.

The information writing section includes: an acceleration sensor for detecting acceleration of the information writing section during writing; a first integrator for integrating the acceleration and calculating a velocity of the information writing section; and a second integrator for integrating the velocity and calculating a position of the information writing section. The information writing section further includes character recognizing section for recognizing a character written on the writing medium. The information writing section includes section for detecting a position of the information input device.

The position recognizing section includes section for determining a position which the acceleration sensor is activated is an origin.

The information storing section includes section for storing an information attribute code including width and density of a line and a writing information code which writing information is represented by code.

An information input device according to the present invention is characterized by further comprising: instruction section for giving instruction to perform a predetermined control; and control section for controlling the information storing section on the basis of an instruction of the instruction section.

An information input device according to the present invention is characterized by further comprising function selecting section for selecting predetermined functions on the basis of the instruction of the instruction section.

The instruction section includes at least one operating section and the control section has a plurality of access modes and includes section for controlling the information storing section according to the access modes.

The operating section includes section for turning on or off of the power source of the information input device. The operating section further includes section for changing at least one of width of line and density thereof. The operating section includes memory use amount setting section for informing to a user when an use amount of the information storing section is equal to or more than a predetermined value. The operating section includes UNDO pointer setting section for canceling information stored before a UNDO pointer is set. The operating section includes section for storing a desired writing information as one file. The operating section further includes section for adding identification information to the file. The operating section includes section for canceling all writing information.

An information input device according to the present invention is characterized by further comprising display section for displaying at least one of an access mode of the control section and an operating content thereof.

The instruction section includes inclination detecting section for detecting an inclination state of a body of the information input device.

The control section includes section for selecting one of a writing mode and an erasing mode on the basis of a detecting result of the inclination detecting section. The control section further includes section retrieving writing informants indicated by the information writing section on the basis of information obtained from the position recognizing section, stored in the information storing section.

An information input device according to the present invention is characterized by further comprising information exchange section for transmitting/receiving the writing information stored in the information storing section.

A position information holding device is characterized by comprising a plurality of position information holding section each having a position information which is different from each other. The position information holding device is formed into a sheet-like shape and is capable of dividing a plurality of the position information holding devices each including a plurality of the position information holding sections and using each divided position information holding device.

A position recognizing system including a pen-like shape information input device and a planar position information holding device, is characterized in that the position information holding device includes position information holding section for holding a plurality of position information, and the information input device includes: section for detecting a position information, which is held by the information holding device, specified by a pen tip of the information input device; section for obtaining an absolute position of the pen tip on the planar position information holding device according to a detected position information; and section for storing the obtained absolute position as a trace information of the pen tip.

The plurality of position information include different position information from each other. The plurality of position information further include a plurality set position information, which includes a predetermined number of the position information and is different from each other.

An information input device is characterized by further comprising display device for displaying motion state of the information input device and writing information.

The information input device further includes information exchange section for transmitting/receiving writing information among a plurality of the information input devices, and the position information holding device further includes interface section for connecting a plurality of the information exchange section of the information input devices.

The position information holding device includes section for differentiating combinations of adjacent position information in entire position information holding device.

According to the present invention, since the information writing section 11 allows a writing medium such as a paper sheet to be used as an information display screen, it can provide an information display screen which is not limited by the size of the information input device 10 to a user. At the same time, the position recognizing section 12 can realize an information input region which is not limited by the size of the information input device 10. Thus, the information input device 10 which has a wide information display screen and information input region, and high portability can be provided. When the information input device 10 is used together with the tablet-type position information holding device 25 as an external device, the size and cost of the position information holding device 25 can be reduced. Thus, a portable information input system having various information input regions can be provided.

Information written on a writing medium can be input to the information input device 10 by the information storing section for storing information from the position recognizing section 12, and the access control section for controlling the information storing section.

An information input operation with explicitness can be attained by the function selecting section for selecting a function to be executed in accordance with an operation to the information input device or the inclination state of the information input device, and executing the selected information, the operating section 15 for detecting a mechanical operation, and supplying a detection signal to the function selecting section, the inclination recognizing section for recognizing the inclination state of the device itself, and supplying a recognition signal to the function selecting section, and the information display section for explicitly displaying the selected function or the operating state of the device. Therefore, according to the present invention, the information input device 10, which can perform an information input operation with explicitness, can be provided.

According to the present invention, the information input device which can automatically store information normally written on a paper sheet, and has high operability and portability, and the position information holding device can be provided, and the position recognizing system which can easily and effectively recognize the position upon input of information can also be provided.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 6 is a schematic diagram showing the arrangement of a position recognizing system including an information input device and a position information holding device according to an embodiment of the present invention;

FIGS. 7A and 7B are perspective views for explaining a first position recognizing method using the information input device and the position information holding device according to the present invention;

FIG. 8 is a view for explaining a second position recognizing method using the information input device according to the present invention;

FIG. 9 is a view for explaining a third position recognizing method using the information input device according to the present invention, and a conventional tablet;

FIG. 10 is a diagram for explaining the flow of operations in the information input device according to the present invention;

FIGS. 11A and 11B are views showing an example of recording of a written image by the information input device according to the present invention;

FIG. 12 is a table showing the types of stored codes of a written image;

FIG. 13 is a table showing stored information of a written image;

FIG. 18 is a view showing examples of operations of a function selecting section;

FIGS. 21A and 21B are views showing still another example of the function selecting operations, e.g., a menu selecting method;

FIGS. 23A to 23C are views showing display examples of a memory use state;

FIGS. 24A and 24B are views showing operations performed when a memory use state informing pointer is used;

FIG. 25 is a supplementary explanatory view of FIGS. 24A and 24B;

FIG. 30 is a view showing an operation based on an inclination recognizing function of the information input device;

FIGS. 31A to 31C are views showing an operation for erasing writing information;

FIGS. 32 and 33 are tables showing a method of storing erasing information;

FIGS. 35A to 35C are views showing the first method for assigning ID data to writing information;

FIG. 41 is a view showing a method of driving a writing information display section;

FIGS. 42A to 42D are views showing a difference between a writing pattern to be recorded and a displayed writing pattern;

FIGS. 44A to 44C are views showing an example of searching designated writing information from an information storing section;

FIGS. 45 and 46 are views showing an information exchange operation of a written image between a plurality of information input devices using the position information holding device;

FIG. 47 is a view showing the first arrangement of a position recognizing system according to the present invention;

FIG. 48 is a view showing another arrangement of a position recognizing system according to the present invention;

FIG. 49 is a view showing a modification of the first arrangement of the position recognizing system according to the present invention;

FIGS. 50A and 50B are views showing the second arrangement of a position recognizing system according tot he present invention;

FIG. 53 is a view showing the fourth arrangement of a position recognizing system according to the present invention;

FIG. 54 is a view showing the arrangement adopted when the position of an information writing section of the present invention is digitally recognized;

FIGS. 55A to 55C are views showing other arrangements of FIG. 54; and

FIGS. 56A to 56D are views showing other arrangements of FIG. 54.

DETAILED DESCRIPTION OF THE PREFERRED EMBODIMENTS

Figure 1:
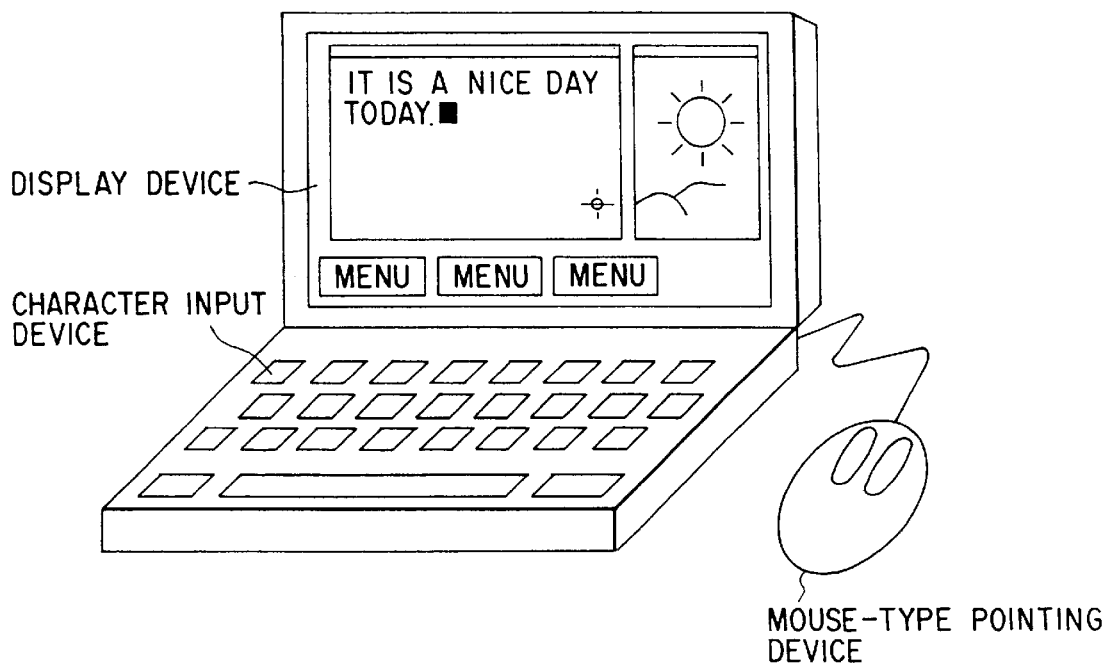
FIG. 1 is a perspective view showing a conventional lap-top computer.
Figure 2:
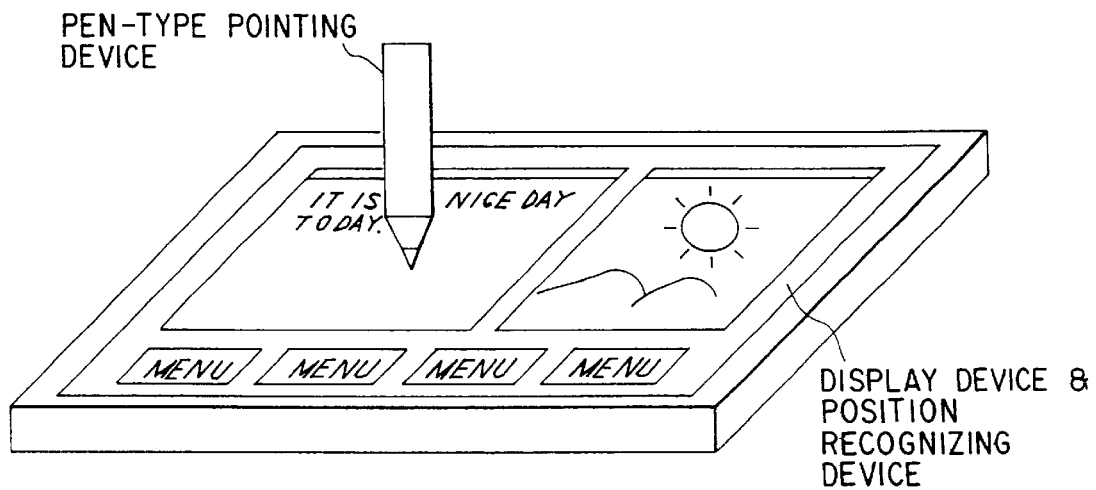
FIG. 2 is a perspective view showing a conventional pen-input type computer.
Figure 3:
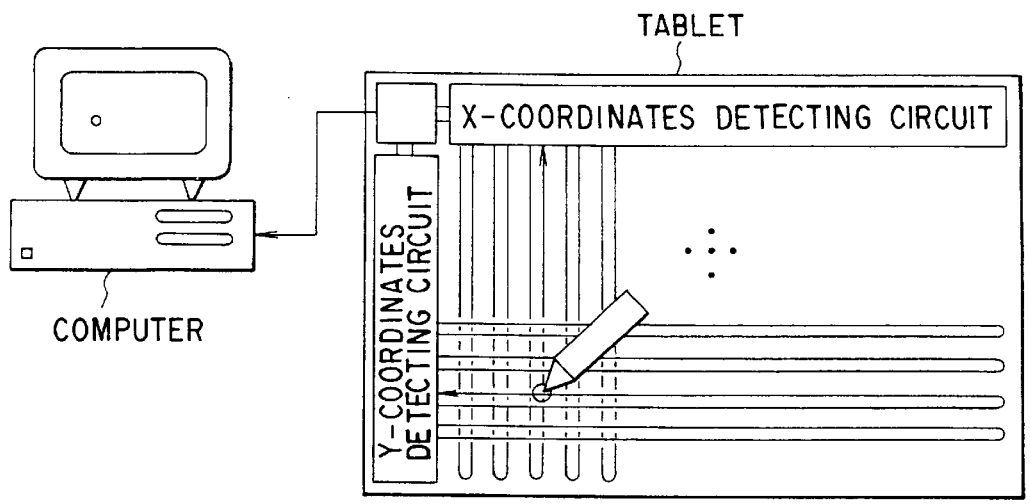
FIGS. 3 and 4 are schematic views showing conventional tablets.
Figure 4:
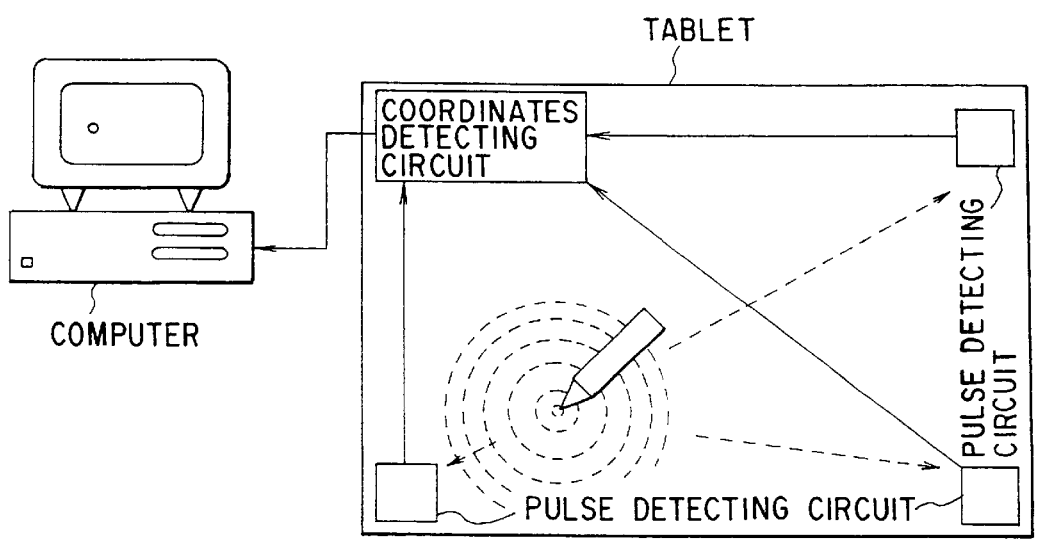
Figure 5:
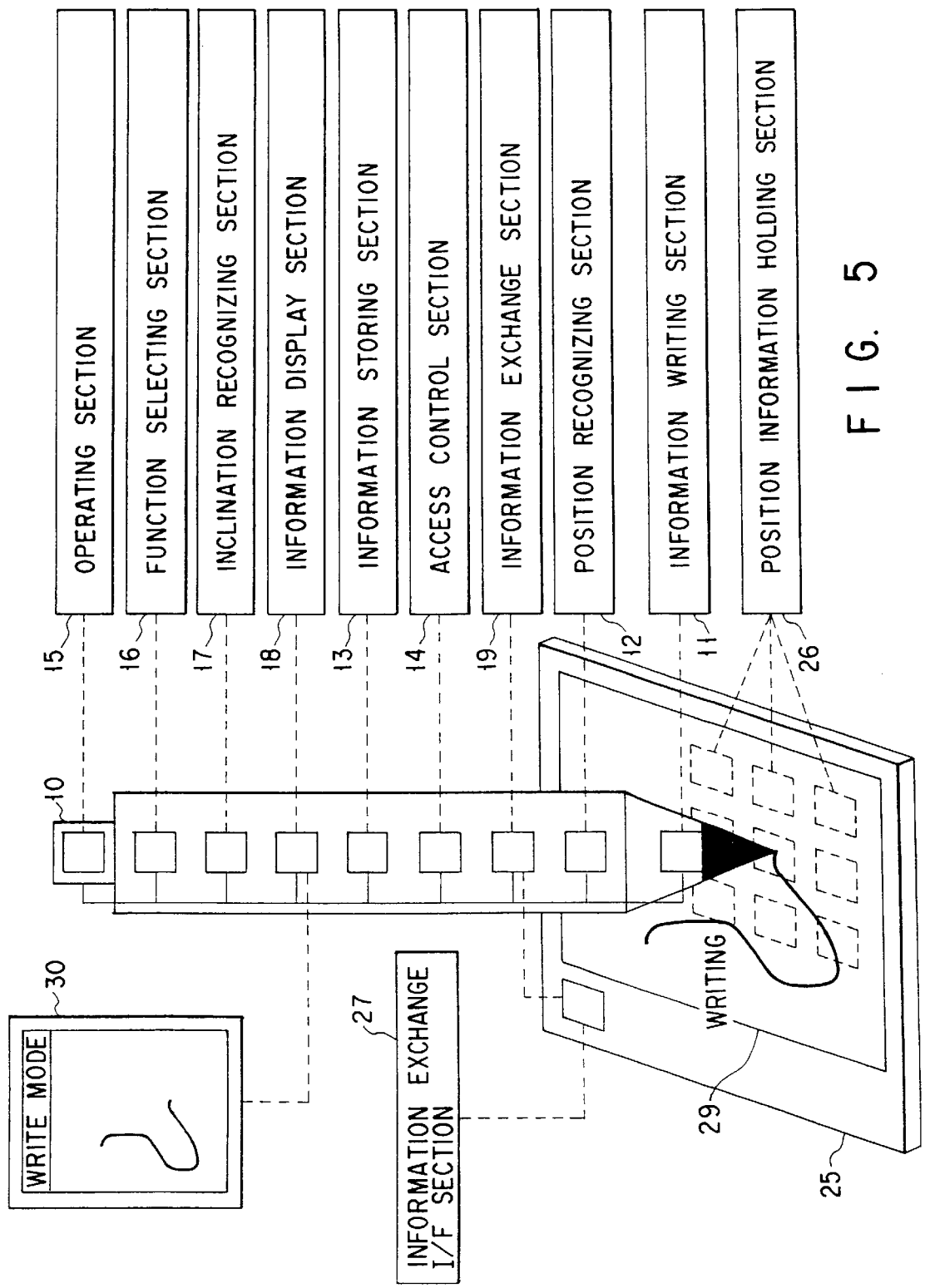
FIG. 5 is a diagram showing the concept of the overall device according to an embodiment of the present invention.

An embodiment of the present invention will be described below with reference to the accompanying drawings.

FIG. 6 shows the schematic arrangement of a position recognizing system including an information input device and a position information holding device according to an embodiment of the present invention. In FIG. 6, dotted arrows indicate the flows of signals.

An information input device 10 for inputting writing information (or position information) comprises an information writing section 11, a position recognizing section 12, an information storing section 13, an access control section 14, at least one operating section 15, a function selecting section 16, an inclination recognizing section 17, an information display section 18, and an information exchange section 19.

A position information holding device 25 is a tablet-type auxiliary device for the information input device 10, and comprises a plurality of position information holding sections 26 and an information exchange I/F section 27 (in the following description, an interface will be abbreviated as I/F). When the position information holding device 25 and the information input device 10 are used together, a position recognizing system with high precision can be realized. A writing medium 29 (e.g., a paper sheet) is placed on the surface of the position information holding device 25. The information input device 10 recognizes a written image (writing position) with high precision by writing information on the writing medium 29. Since the position information holding device 25 comprises the information exchange I/F section 27, connected to the information exchange section of the at least one information input device 10, for exchanging information between the information input device 10 and the position information holding device 25, the device 25 can also be used as an auxiliary device for performing an easy information operation between a plurality of information input devices 10.

A writing information display device 30 is a compact display device capable of performing a high-definition display operation. The writing information display device 30 has a plurality of display points, and has a function of storing display information at each display point, and a function of receiving image information such as new writing information written by the information input device 10, the operating state of the information input device 10, and the like. The writing information display device 30 is an auxiliary device for allowing easy understanding of information input by a user by displaying a high-definition reduction-scale image of an image written on a paper sheet, a function selected by the information input device 10, the operating state of the information input device 10, and the like.

The information writing section 11 constructs a pen tip 60 of the information input device 10 (information writing device is also referred to as a pen tip hereinafter), and has a function of detecting position information of the position information holding sections 26. The information writing section 11 may further have a function of writing information on a writing medium 29. The information writing section 11 also includes a switch (not shown) for starting a reading operation of position information.

The position recognizing section 12 obtains the position of the pen tip 60 (i.e., the information writing section 11) of the information input device 10. When the information input device 10 and the position information holding device 25 are used together, the position recognizing section 12 obtains the absolute position on a writing medium on the basis of position information detected based on each position information holding section 26.

The information storing section 13 stores writing information, information associated with the state of the device, and the like.

The access control section 14 controls the information storing section 13. More specifically, the access control section 14 stores position information obtained (or recognized) by the position recognizing section 12 in the information storing section 13 in accordance with a function in execution or the operating state of the information input device 10, and retrieves and accesses writing information, which is placed on portions of the position information corresponding to obtained (or recognized) information on the basis of position information obtained (or recognized) by the position recognizing section 12, of writing information stored in the information storing section 13.

The operating section 15 detects an operation designated by a user to the information input device 10, and outputs the detected operation information to the function selecting section 16.

The function selecting section 16 executes a predetermined function on the basis of operation information from the operating section 15 and the inclination state of the information input device 10, and manages the function in execution, and information such as the inclination state of the information input device 10.

The inclination recognizing section 17 recognizes the inclination state of the information input device 10, and outputs the inclination information of the information input device 10 to the function selecting section 16.

The information display section 18 displays a function in execution and the operating state of the information input device 10 on a display (not shown). In addition, the information display section 18 performs display control of the writing information display device 30.

The plurality of position information holding sections 26 are arranged on the flat surface of the position information holding device 25. Each position information holding section 26 holds position information indicating its absolute coordinates on the position information holding device 25.

The above-mentioned sections are constituted as modules having high independence like objects, and control of the respective sections is attained by exchanging messages. For example, the information storing section 13 performs a primitive operation such as a write or read access to a physical memory. The access control section 14 holds, e.g., an address table of the memory, and transmits messages to the information storing section 13. The information storing section 13 performs a complicated memory operation in accordance with the received messages. In each of various functions to be executed by the function selecting section 16, a portion associated with the memory operation is similarly executed by transmitting messages from the function selecting section 16 to the access control section 14. In this manner, when devices constituting the respective sections are realized as objects, a new function can be relatively easily added to the information input device 10, thus achieving high expandability of the device of the present invention.

FIGS. 7A and 7B are views for explaining the first position recognizing method using the information input device 10 and the position information holding device 25 according to the present invention. FIG. 7A shows the schematic arrangement of the position information holding device 25, and FIG. 7B is a view for explaining the position recognizing method.

As shown in FIG. 7A, the position information holding section 26 at each position of the position information holding device 25 holds unique position information.

The pen tip 60 of the information input device 10 reads the position information. When the pen tip 60 is pressed against the surface of the position information holding device 25, the switch of the information writing section 11 is turned on, and starts detection (reading) of position information of the corresponding position information holding section 26. The information writing section 11 outputs the detected (read) position information (e.g., position information indicating "position=10") to the position recognizing section 12. The information input device 10 holds map information associated with the arranging state of position information on the position information holding device 25. Conversion from position information to coordinate information is performed using the map information as needed.

As described above, according to the present invention, the absolute position of the pen tip 60 of the information input device 10 can be recognized with high precision, and the position recognizing section 12 can be incorporated in the information input device 10, thus improving portability of the position information holding device 25, and at the same time, reducing cost.

FIG. 8 is a view for explaining the second position recognizing method using the information input device 10 of the present invention. The position recognizing method in this embodiment uses an acceleration sensor.

Referring to FIG. 8, the information writing section 11 comprises an acceleration sensor 31, a first integrator 32, and a second integrator 33. The acceleration sensor 31 detects an acceleration A(t) in the x-, y-, and z-axis directions upon movement of the pen tip 60 of the information input device 10. The first integrator 32 integrates the acceleration A(t) detected by the acceleration sensor 31 to obtain a velocity V(t), and the second integrator 33 integrates the velocity V(t) to obtain the absolute position X(t) of the pen tip 60. In this case, the origin of the absolute coordinates of the pen tip 60 is the start point of the coordinates of the pen tip 60 is the start point of the operation of the acceleration sensor 31.

With this arrangement, the position of the pen tip 60 in the three-dimensional space can be detected by only the information input device 10, and neither a tablet which is required in the conventional device nor the position information holding device 25 shown in FIG. 7A are required. Therefore, the information input device 10 has high portability, and can recognize stroke information of a written image at an arbitrary place.

FIG. 9 is a view for explaining the third position recognizing method using the information input device 10 of the present invention and a conventional tablet.

The information writing section 11 of the information input device 10 incorporates a magnetic signal generating section for causing the tablet to detect the position of the pen tip 60, and a switch (not shown) for transmitting a magnetic signal. When the pen tip 60 is pressed against the tablet, the magnetic signal is transmitted from the pen tip 60. The tablet incorporates a position recognition assisting section for obtaining the absolute position of the pen tip 60 by detecting an inducted electromotive force (i.e., an inducted current) generated in a conductive line below the pen tip 60 by the magnetic signal from the pen tip 60. The information input device 10 incorporates a wired or radio I/F (not shown) for receiving the position information of the pen tip 60 recognized by the tablet, and the position recognizing section 12 recognizes the information received by the I/F as the position information of the pen tip 60.

The position information of the pen tip 60 recognized by the position recognizing section 12 is output to the access control section 14. The function selecting section 16 requests the access control section 14 to process the position information on the basis of a function in execution, and the inclination or motion state of the information input device 10. The access control section 14 requests the information storing section 13 to store the position information.

As described above, when position recognition is performed by the method shown in FIG. 7B or 9, a paper sheet is placed on the position information holding device 25 or the tablet, and the pen tip 60 comprises normal writing means, so that information written on the paper sheet can be automatically stored. When position recognition is performed by the method shown in FIG. 8, the same recognition processing as described above can be attained by only the information input device 10.

FIG. 10 is a view for explaining the flow of the operations in the information input device 10 of the present invention.

The pen tip 60 which can write information on a paper sheet incorporates the information writing section 11, and a switch (not shown) for operating the information writing section 11. When the pen tip 60 is pressed against the position information holding device 25, detection of the position information of each position information holding section 26 is started.

When a paper sheet is fixed to the position information holding device 25, and information is written on the paper sheet with the pen tip 60, the position information of the pen tip 60 detected by the information writing section 11 is output to the access control section 14 via the position recognizing section 12. On the other hand, a time recognizing section 20 outputs the writing time of each point to the access control section 14 in synchronism with the output of the position information from the information writing section 11 to the access control section 14. The access control section 14 stores the position information from the position recognizing unit 12 and the time information from the time recognizing section 20 as one pair of information in the information storing section 13.

FIGS. 11A and 11B are views showing an example of recording of a written image by the information input device 10 of the present invention. FIG. 11A shows character information written on the position information holding sections 26. FIG. 11B shows the positions of the position information holding sections 26 corresponding to the character information shown in FIG. 11A, and hatched portions represent the position information of the position information holding sections 26 corresponding to the character information shown in FIG. 11A.

When a letter "a" is written on a paper sheet fixed on the position information holding sections 26, a position information string corresponding to the position information of the position information holding sections 26 below the written points is recorded in the order of written strokes. For example, when a letter "a" is written, stroke information corresponds to a position information string in the order of (21, 20, 28, 27, . . . , 55).

FIGS. 12 and 13 show an embodiment associated with stored data of a written image by the information input device 10 of the present invention. FIG. 12 shows the types of stored codes of a written image, and FIG. 13 shows stored information of the written image.

Referring to FIG. 12, the position information of each point in the position information string shown in FIG. 11B is paired with the writing time of the corresponding point, and constitutes one writing information code (position information, writing time). For example, for a point written at position "21" at time "0000", a writing information code (21, 0000) is generated. When one writing stroke ends, and the pen tip 60 is released from a paper sheet, a special information code (to be referred to as an "end code" hereinafter) (−1, −1) indicating the end of one writing stroke is added to the end of a stroke information code string. With this end code, each stroke information is stored to be distinguished from other information.

As shown in FIG. 13, a writing attribute code (string) is inserted in a writing information code (string) so as to discriminate a writing attribute such as a writing width, a writing density, and the like. The writing attribute is changed by performing a specific operation to the operating section 15 by a user when the pen tip 60 is separated from a paper sheet. The writing attribute code is distinguished from a normal writing information code since it starts with a special information code (−2, −2). The contents of the writing attribute include attribute information such as a line width, density, and the like, which are required when a written image is reproduced by a display. In this case, for example, attribute information of the density consists of a color conversion code used for reproducing an image on a multicolor display, and a dither conversion code used for reproducing an image on a monochrome display. The end of the writing attribute code is identified by an end code (−1, −1) like in the writing information code.

An image written on a paper sheet is converted into the above-mentioned codes, and these codes are recorded in the information storing section 13.

Figure 14:
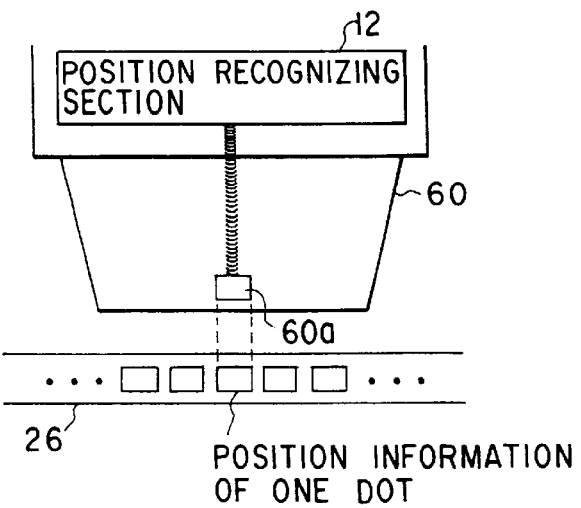
FIG. 14 is a schematic view showing a mechanism for detecting position information of a position information holding section by the information input device according to the present invention.
Figure 15:
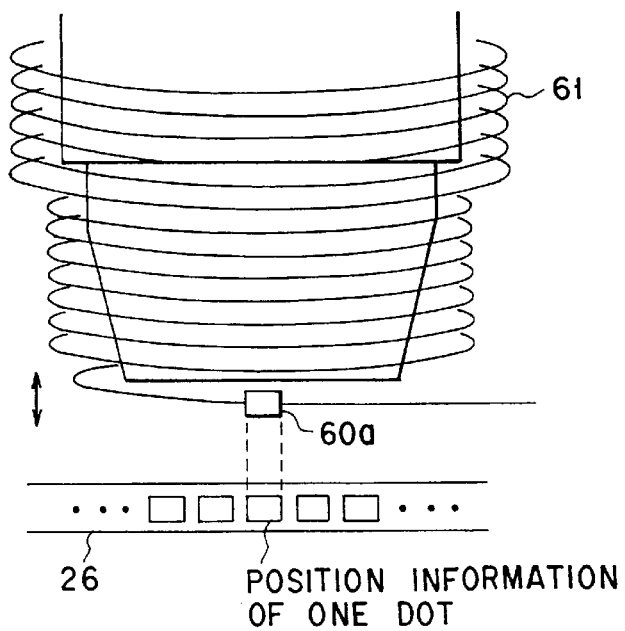
FIG. 15 is a schematic view showing another mechanism for detecting position information of a position information holding section by the information input device according to the present invention.
Figure 16:
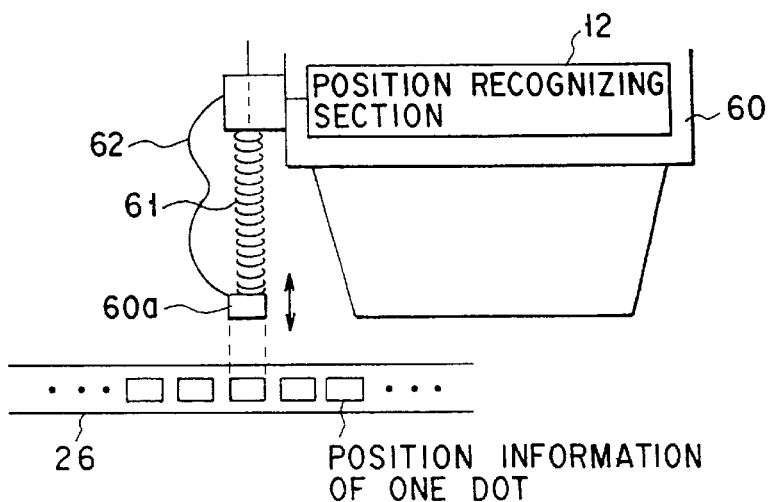
FIG. 16 is a schematic view showing still another mechanism for detecting position information of a position information holding section by the information input device according to the present invention.

FIGS. 14 to 16 show the mechanism for detecting the position information of each position information holding section 26 by the information input device 10 of the present invention.

The size of each point which records position information on the position information holding device 25 is about 0.1 mm if the resolution is 300 dpi. For this reason, the size of a head for detecting position information of one point often becomes smaller than the size of the pen tip 60. In this case, the entire pen tip 60 is not used as a head, but a small head 60a is arranged in the pen tip 60.

FIG. 14 shows the head 60a arrangement method adopted when the pen tip 60 never wears like a felt-tip pen, a ballpoint pen, or the like (felt-tip pen type). In this case, the head 60a is incorporated in a portion slightly recessed from the end tip of the information writing section 11.

FIG. 15 shows the head arrangement method adopted when the pen tip 60 wears like a mechanical pencil (mechanical pencil type/ballpoint pen type). In this case, a spiral spring 61 is arranged to extend downward from a portion including the pen tip 60 along the pen tip 60, and the head 60a is connected to the distal end of the spring. The normal head position is adjusted to be located below the normal projecting position of the pen tip 60. When the pen tip 60 is pressed against a paper sheet, the head 60a contacts the sheet surface upon contraction of the spring 61.

FIG. 16 shows the head arrangement method adopted when the information writing section 11 wears like a mechanical pencil in the same manner as in FIG. 15. In this case, a telescopic rod using a spring 61 is arranged on a portion including the pen tip 60, and the information writing section 11 is connected to the distal end of the rod. The normal position of the information writing section 11 is adjusted to be located below the normal projecting position of the pen tip 60. When the pen tip 60 is pressed against a paper sheet, the head 60a contacts the sheet surface upon contraction of the spring 61.

With the above-mentioned methods, even when the information input device 10 with a bold pen tip 60 is used together with the position information holding device 25 with a high point resolution, the absolute value of the pen tip 60 can be uniquely detected.

Figure 17:
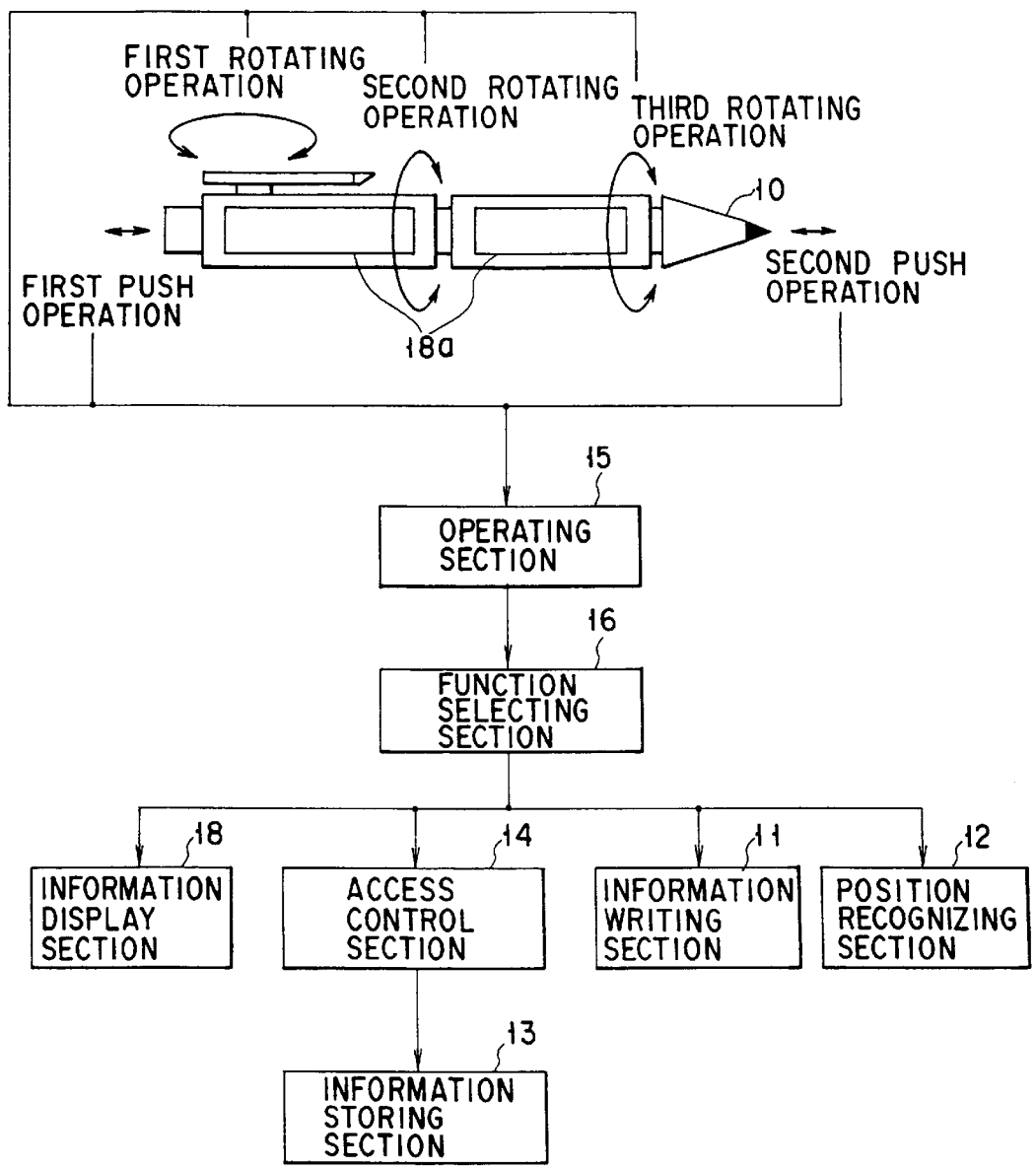
FIG. 17 is a view showing a function selecting operation by the information input device according to the present invention.

FIG. 17 shows the function selecting operation by the information input device 10 of the present invention.

The information input device 10 comprises at least one operating section 15 which can recognize a push operation, a rotation operation, or the like. The information input device 10 shown in FIG. 17 allows first to third rotation operations and first and second push operations. Each of the operating sections 15 for performing these operations outputs predetermined operation information set therein to the function selecting section 16. The function selecting section 16 holds control program codes for executing various functions, a currently executed function, and the operating state, and selects and executes a control program code corresponding to the operation information from the operating section 15, the currently executed function, and the operating state, thereby controlling the information writing section 11, the position recognizing section 12, the access control section 14, and the like. The information display section 18 controls a display 18a to display the current operating state, the currently executed function, and other necessary information.

FIG. 18 shows the operation of the function selecting section 16.

The function selecting section 16 comprises a control code selecting section 40 and first to third control code executing sections 41 to 43.

Each of the first to third control code executing sections 41 to 43 holds control codes corresponding to various functions such as a writing mode, an eraser mode, and the like, and executes a control code selected by output information from the control code selecting section 40, thus controlling the information writing section 11, the position recognizing section 12, the access control section 14, and the like.

The control code selecting section 40 holds a table of control codes held by the control code executing sections, and a condition table which describes conditions under which the respective control codes are to be executed, and also holds information such as a currently executed function, the operating state, and the like. The section 40 selects control codes to be executed on the basis of these pieces of information and the operation information output from operating sections 15a to 15e, and requests the corresponding first to third control code executing sections 41 to 43 to execute the control codes.

Figure 19A:
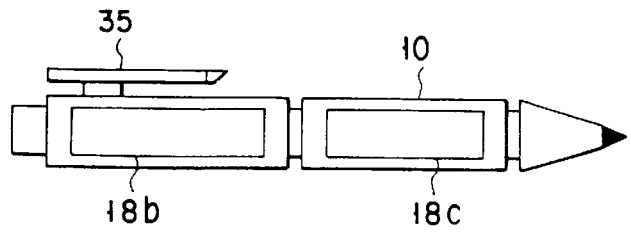
FIGS. 19A and 19B are views showing an example of the function selecting operations, e.g., an ON/OFF operation of a power source.
Figure 19B:
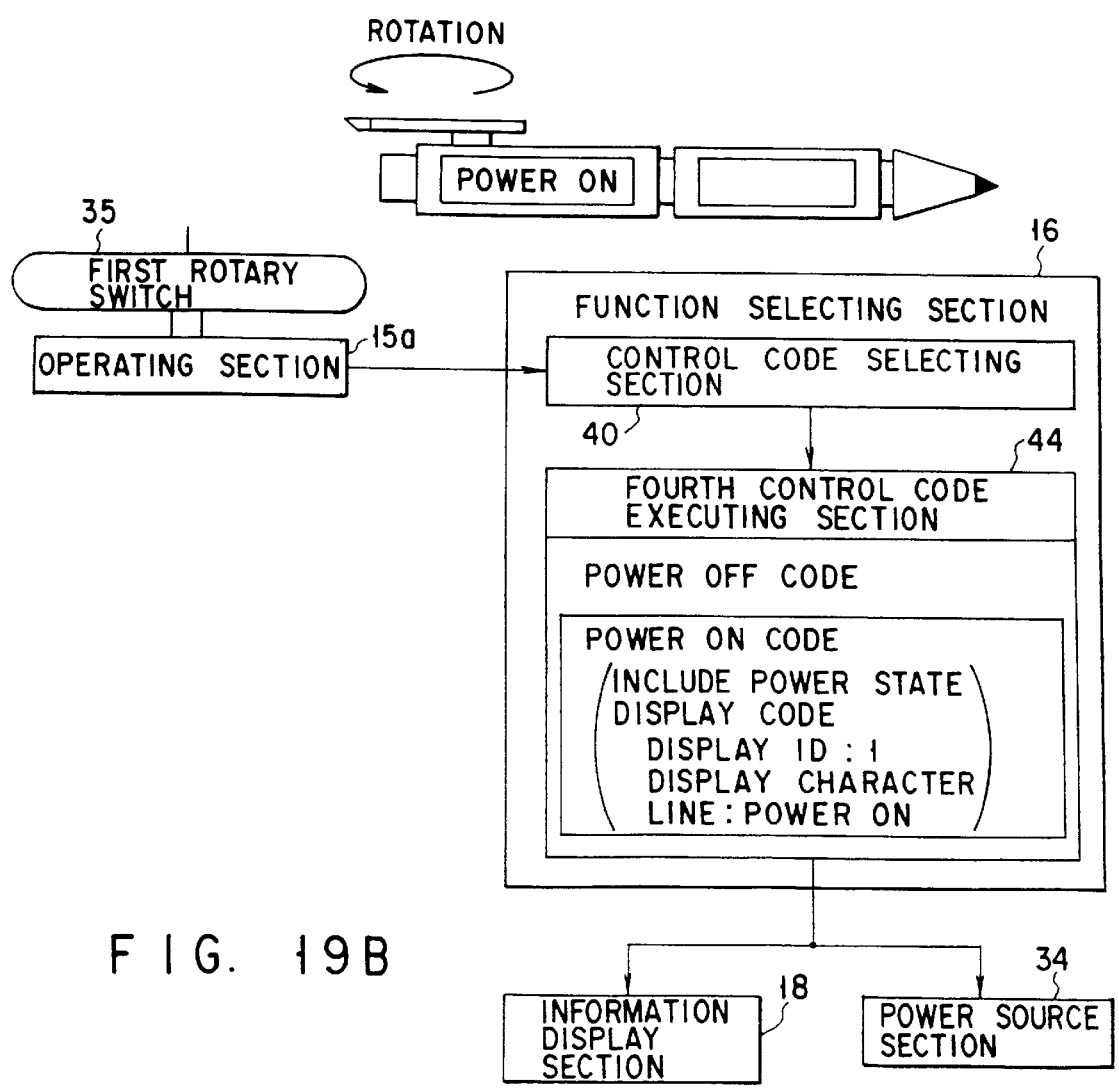

FIGS. 19A and 19B are views showing an example of the function selecting operation, i.e., an ON/OFF operation of a power source. In this embodiment, upon rotation of a first rotary switch 35 for performing the first rotation operation of the information input device 10, the power source of the information input device 10 is turned on/off.

As shown in FIG. 19A, when the power source is OFF, the first rotary switch 35 is located at a predetermined position, and first and second displays 18b and 18c are OFF.

When the first rotary switch 35 for performing the first rotation operation is rotated in the direction of an arrow in FIG. 19B, the operating section 15 outputs operation information of the first rotary switch 35 to the function selecting section 16. The function selecting section 16 selects a power-ON code from operation information of the control code selecting section 40, and requests a fourth control code executing section 44 to execute the selected code. The fourth control code executing section 44 executes the power-ON code to turn on a power source section 28, and executes a startup code (not shown) to cause the first display 18b to display a message "power ON".

Figure 20:
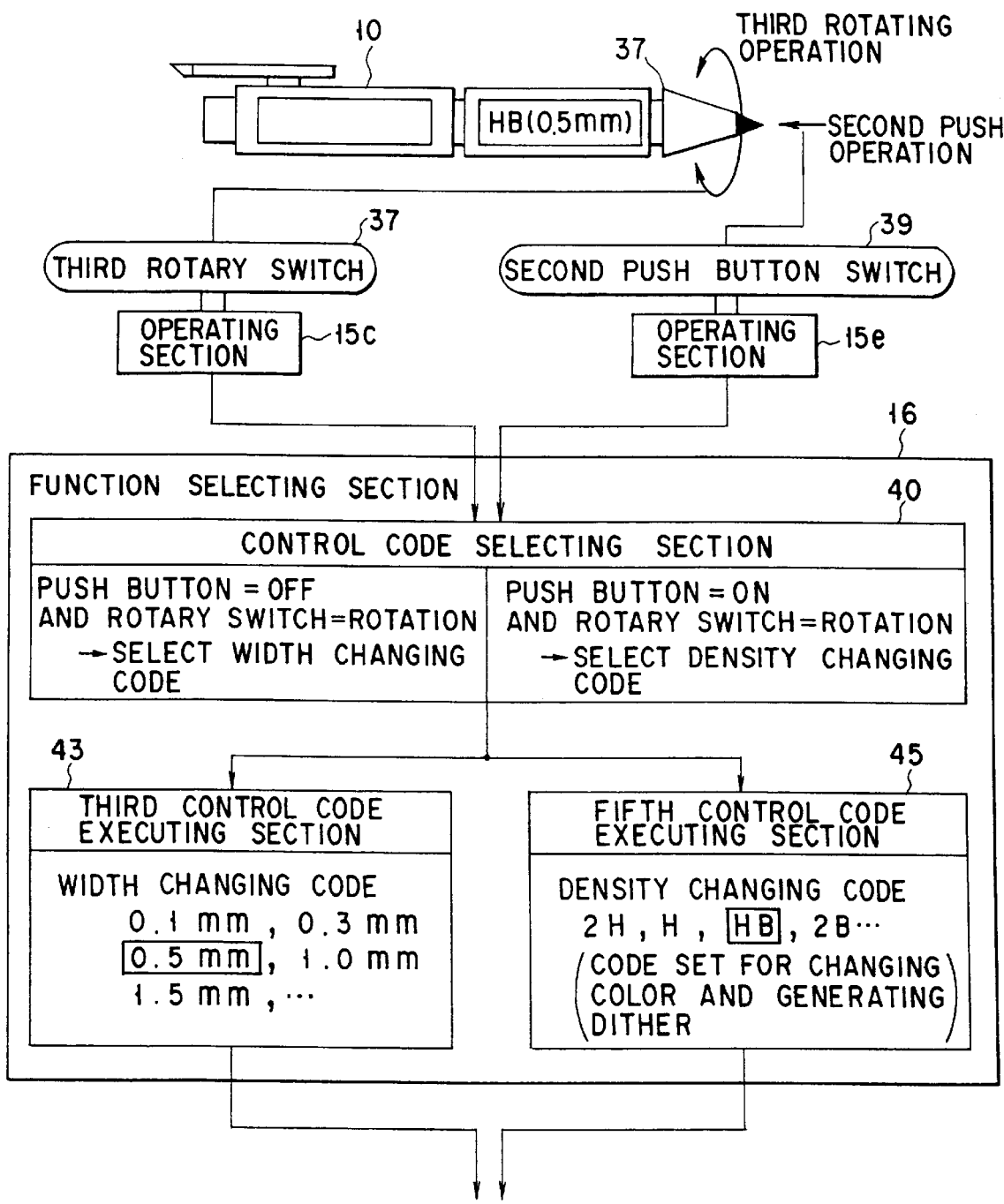
FIG. 20 is a view showing another example of the function selecting operations, e.g., an operation for setting or changing the writing width and the writing density.

FIG. 20 is a view showing an example of the function selecting operation, i.e., an operation for setting or changing the writing width and density. In this case, the writing attribute such as a line width, density, and the like is changed by a push operation to the information writing section 11 of the information input device 10 or a rotation operation to the pen tip 60 thereof.

The information writing section 11 has a second push button switch 39 which allow a push operation and the pen tip 60 has a third rotary switch 37 which allow a rotation operation. When each of the third rotary switch 37 and the second push button switch 39 is operated, the corresponding operation information is output to the function selecting section 16 via the operating section 15c or 15e.

When the third rotary switch 37 is operated (i.e., the pen tip 60 is simply rotated), the control code selecting section 40 selects a control code for changing the line width, and requests the third control code executing section 43 to execute the selected control code. The third control code executing section 43 changes the writing attribute associated with the line width of a subsequently written image to the designated line width code.

When the third rotary switch 37 and the second push button switch 39 are simultaneously operated (i.e., the pen tip 60 is rotated while the information writing section 11 is pushed), the control code selecting section 40 selects a control code for changing the line density, and requests a fifth control code executing section 45 to execute the selected code. The fifth control code executing section 45 changes the writing attribute associated with the density of a subsequently written image to the designated density code.

FIGS. 21A and 21B are views showing an example of the function selecting operation, i.e., a menu selecting method.

In FIG. 20, when the control code for changing the line width is executed, the first display 18b displays a message "lead being changed". When the third rotary switch 37 is rotated in the direction of an arrow in FIG. 21A, line density information displayed on the second display 18 scrolls upon operation of the third rotary switch 37, as shown in FIG. 21B, so that one of various line densities can be selected. When a required line density is displayed on the second display 18c, a new line density is selected by, e.g., double-clicking a first push button switch 38.

Figure 22:
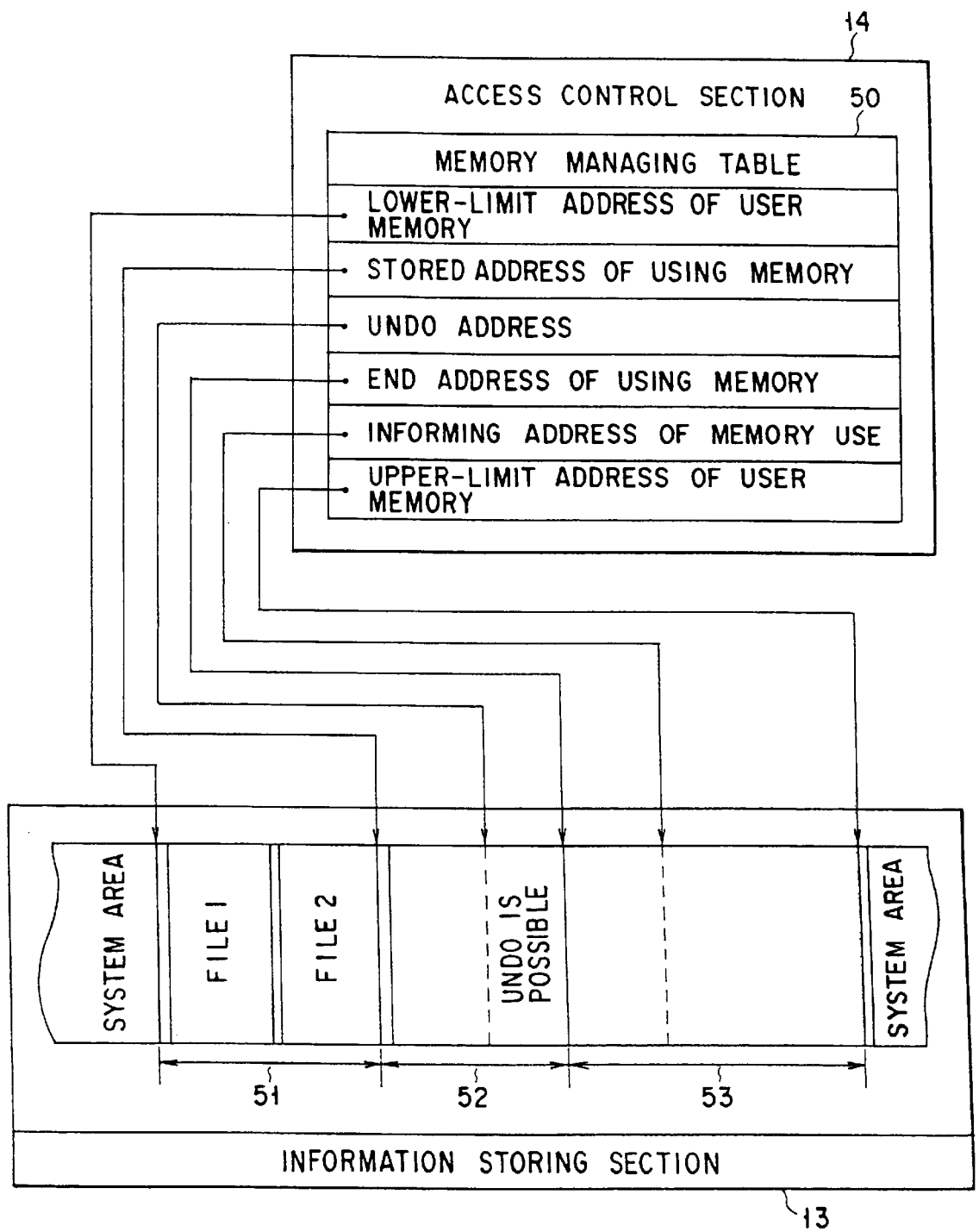
FIG. 22 is a view showing the operations of an access control section and an information storing section.

FIG. 22 shows the operations of the access control section 14 and the information storing section 13. The access control section 14 holds a memory managing table 50 consisting of address information for managing writing information, and performing various memory operations. In this case, a memory corresponds to the information storing section 13. An access to the memory 15. managing table 50 is made when the first control code executing section 41 of the function selecting section 16 requests the access control section 14 to make an access.

The memory managing table 50 has information such as the upper- and lower-limit addresses of a user memory, the start address of a memory 52 in use (to be referred to as a using memory hereinafter), an UNDO address, the end address of the using memory 52, a memory use state informing address, and the like.

The upper- and lower-limit addresses of the user memory define a memory area which can store user's writing information. Each writing information which was recorded in the past is stored in turn from the lower-limit address of the user memory as a file with ID data. The memory area which already stores writing information as a file will be referred to as a used memory 51 hereinafter.

The start address of the using memory 52 indicates a memory address at which recording of new writing information is started, i.e., the end address of the used memory 51. At the subsequent addresses, writing information which is being currently recorded is stored.

The end address of the using memory 52 corresponds to an address from which writing information to be written in future begins to be stored. More specifically, the memory area of writing information recorded so far is defined from the start address to the end address of the using memory 52, and this memory area will be referred to as the "using memory 52" hereinafter. A memory area after the end address of the using memory 52 will be referred to as an "unused memory 53" hereinafter.

The UNDO address is an address for restoring stored writing information to a previous specific state. The UNDO address can be arbitrarily set in the using memory 52. When a writing operation is continued after an UNDO address is set, and then, UNDO processing is executed, writing information after the UNDO address is invalidated to restore a state upon setting of the UNDO address.

A memory use state warning address is an arbitrary address set in the area of the unused memory 53. When the end address of the using memory 52 exceeds the memory use state warning address, a memory use state can be explicitly informed to a user by generating, e.g., a warning tone.

FIGS. 23A to 23C show display examples of the memory use state.

The information input device 10 comprises a display which can graphically display the memory use state. Referring to FIG. 23A, the memory use state is displayed on the first display 18b. On the first display 18b, the left end corresponds to the lower-limit address of the user memory, and the right end corresponds to the upperlimit address of the user memory. The first display 18b displays three memory states ("used memory 51", "using memory 52", and "unused memory 53") shown in FIG. 22 using rectangular regions having different patterns or colors, so that a user can readily understand the memory states.

The display operation on the first display 18b is performed as follows. That is, every time the first control code executing section 41 executes a memory operation, the control code selecting section 40 requests the first control code executing section 41 to execute a memory state display code, the first control code executing section 41 receives information of the memory managing table 50 from the access control section 14, and requests the information display section 18 to perform a display in accordance with the received information.

At the beginning of writing, as shown in (a) of FIG. 23B, only the used memory 51 and the unused memory 53 are displayed, and the start and end addresses of the using memory 52 coincide with the end address of the used memory 51. As writing information is recorded in the information storing section 13, the end address of the using memory 52 increases, and an area from the start address to the end address of the using memory 52 corresponds to the using memory 52, thus recording writing information in the format shown in FIG. 12 ((b) of FIG. 23B). When a series of writing ends, and an operation for ending writing is performed, the using memory 52 is changed to the used memory 51, and the start address of the using memory 52 is changed to the end address of the using memory 52 ((c) of FIG. 23B and FIG. 23C).

FIGS. 24A and 24B show the operation executed when a memory use state informing pointer 55 is used. The memory use state informing pointer 55 indicates a memory use state informing address.

At the beginning of writing shown in FIG. 24A and (a) of FIG. 24B, the memory use state informing pointer 55, the used memory 51, and the unused memory 53 are displayed, the start and end addresses of the using memory 52 coincide with the end address of the used memory 51, and the memory use state informing pointer 55 indicates the end address of the using memory 52. In an initial state wherein the memory use state informing pointer 55 coincides with the end address of the using memory 52, the access control section 14 does not execute any operation associated with storage of writing information. More specifically, when writing is started in this state, the access control section 14 informs a message indicating this to the control code selecting section 40, and the first control code executing section 41 executes a code for generating a warning tone, thus attracting a user's attention.

When the first push button switch 38 is depressed in the initial state, a writing information recording state is set ((b) of FIG. 24B). An operating section (not shown) outputs operation information of the first push button switch 38 to the control code selecting section 40, and the first control code executing section 41 requests the access control section 14 to increase the address of the memory use state informing pointer by a specific amount. when the first push button switch 38 is depressed a plurality of number of times, the address is increased in correspondence with the number of times of depression.

When the start address of the using memory 52 is increased by writing ((c) of FIG. 24B), and is about to exceed the address of the memory use state informing pointer 55, the access control section 14 informs a message indicating this to the control code selecting section 40, and the first control code executing section 41 generates a warning tone, thus informing the memory state to a user ((d) of FIG. 24B). At the same time, the first control code executing section 41 requests the access control section 14 to increase the address of the memory use state informing pointer 55 by a specific amount. Upon repetition of this operation, a user can explicitly recognize the memory use state.

FIG. 25 shows the operation associated with the memory use state informing pointer 55 when the writing operation ends.

During recording of writing information ((a) of FIG. 25), when the first and second push button switches 38 and 39 are simultaneously depressed, the operating section 15 outputs operation information to the control code selecting section 40, and the control code selecting section 40 requests the first control code executing section 41 to execute a code for changing the address of the memory use state informing pointer 55 to the end address of the using memory 52. The first control code executing section 41 requests the access control section 14 to change the address.

As described above, when the memory use state informing pointer 55 coincides with the end address of the using memory 52, since the access control section 14 does not perform any operation associated with storage of a written image, the writing operation ends at that time ((b) of FIG. 25).

Figure 26A:
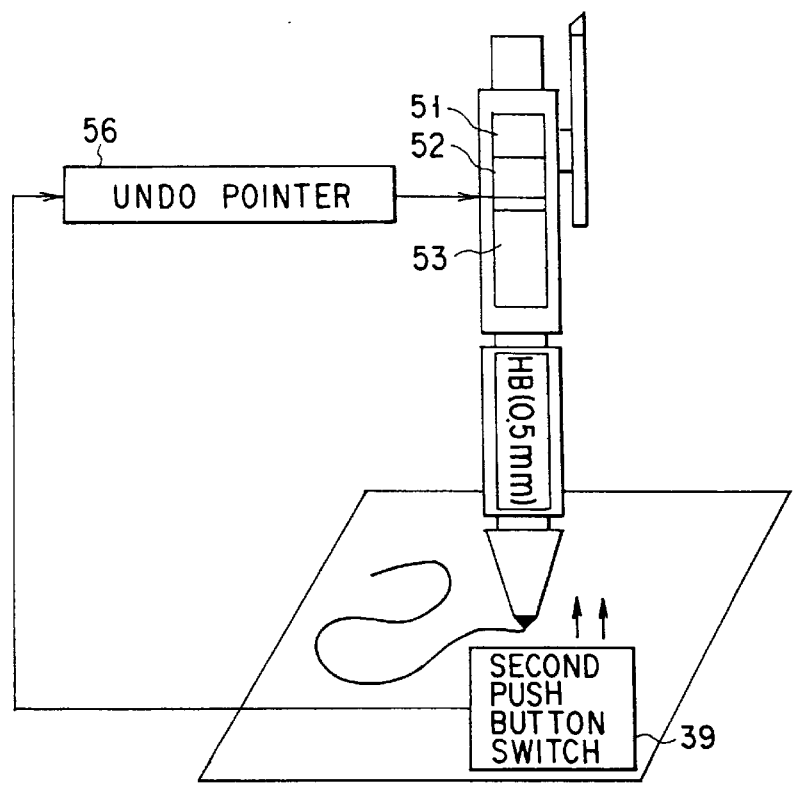
FIGS. 26A and 26B are views showing operations performed when an UNDO pointer is used.
Figure 26B:
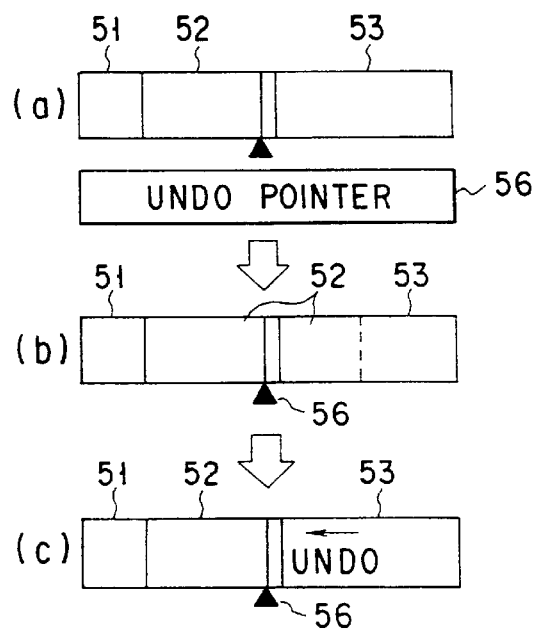

FIGS. 26A and 26B show the operation when an UNDO pointer 56 is used. The UNDO pointer 56 is a rectangular region indicating the UNDO address, and is used for restoring the memory to a state upon setting of the UNDO pointer 56.

At the beginning of writing, the UNDO pointer 56, the used memory 51, and the unused memory 53 are displayed, the start and end addresses of the using memory 52 coincide with the end address of the used memory 51, and the UNDO pointer 56 indicates the end address of the using memory 52 (FIG. 26A and (a) of FIG. 26B).

When the first push button switch 39 is double-clicked during recording of writing information, the operating section 15 outputs operation information to the control code selecting section 40, and the control code selecting section 40 requests the first control code executing section 41 to execute a code for changing the address of the UNDO pointer 56 to the end address of the using memory 52. The first code executing section 41 requests the access control section 14 to change the address ((a) of FIG. 26B).

When the writing operation is continued after the UNDO pointer 56 is set, the end address of the using memory 52 eventually becomes larger than the address of the UNDO pointer 56, and the UNDO pointer 56 is located in the area of the using memory 52 ((b) of FIG. 26B). When writing information input after the UNDO pointer 56 is set is to be invalidated to restore writing information upon setting of the UNDO pointer 56, an UNDO command is executed in a menu mode (to be described later). Upon execution of the UNDO command, the end address of the using memory 52 is changed to the address of the UNDO pointer 56, and the memory state upon setting of the UNDO pointer 56 is restored ((c) of FIG. 26B).

Figure 27A:
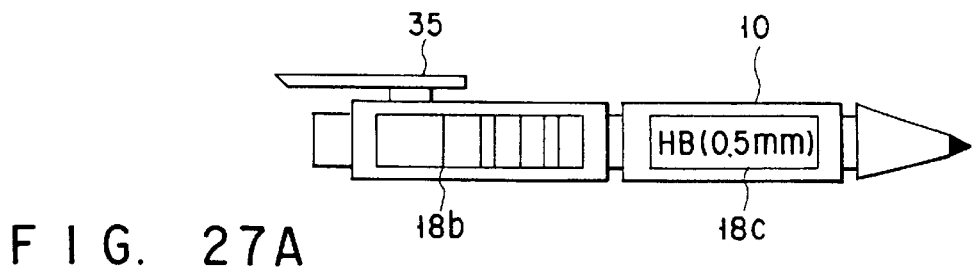
FIGS. 27A and 27B are views showing a menu selecting operation.
Figure 27B:
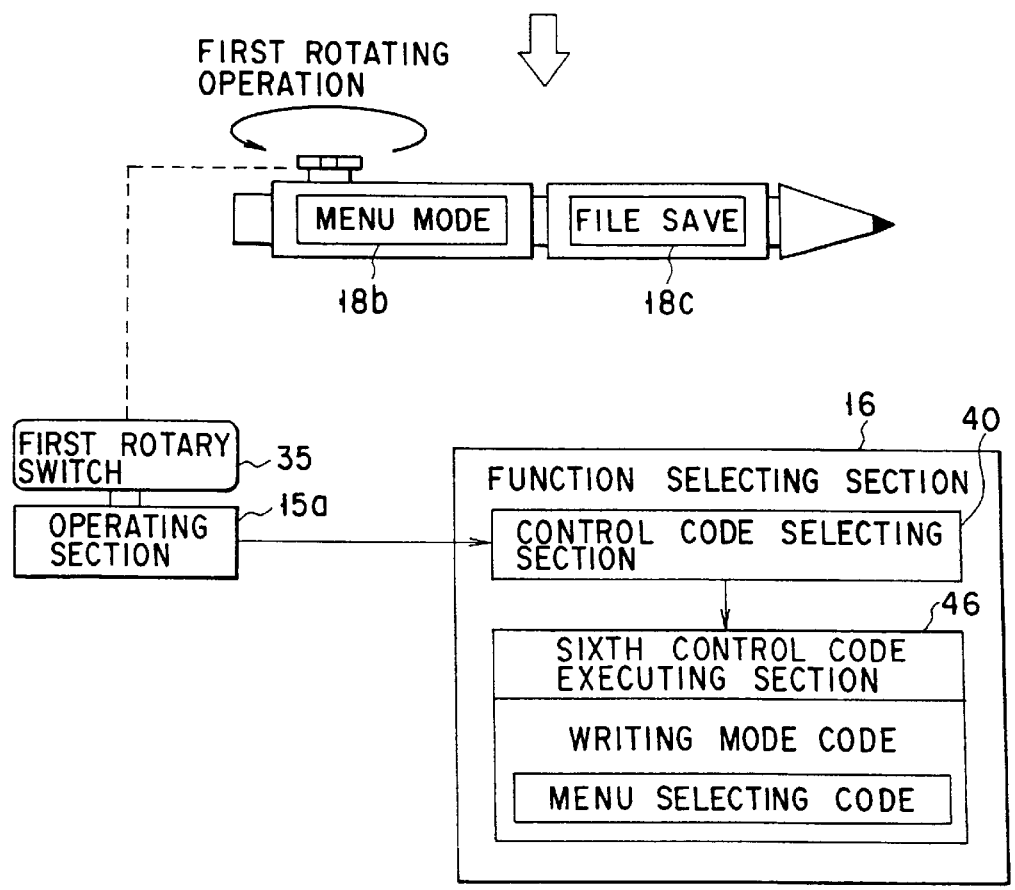

FIGS. 27A and 27B are views showing the menu selecting operation.

When the first rotary switch 35 is rotated through 90-degree in a specific direction (e.g., the clockwise direction), as shown in FIG. 27B, from an initial state shown in FIG. 27A, the operating section 15a outputs operation information to the control code selecting section 40. The control code selecting section 40 requests a sixth control code executing section 46 to execute a code for selecting various menu items, thus setting a menu selecting mode.

Figure 28:
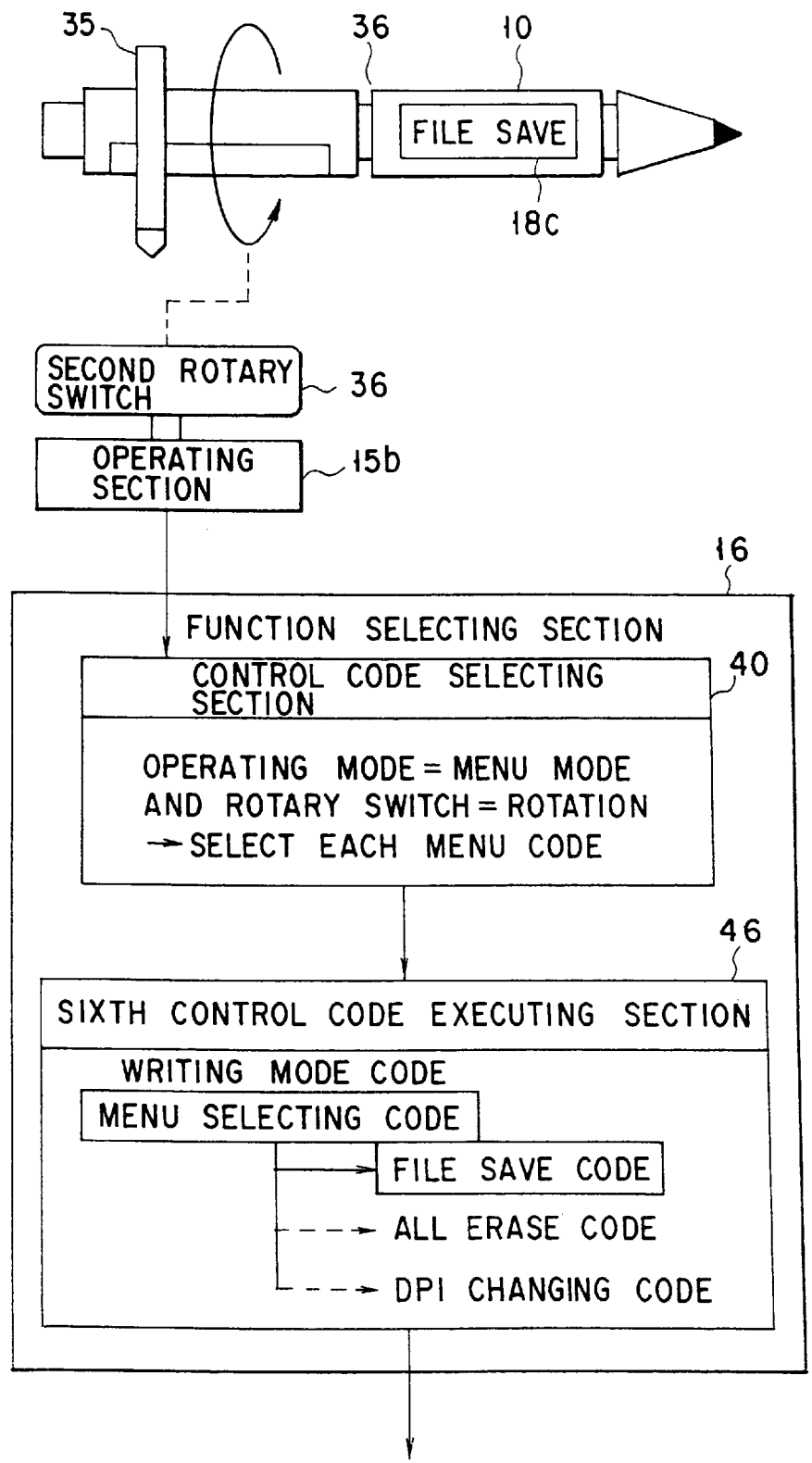
FIG. 28 is a view showing in more detail the menu selecting operation.

FIG. 28 shows the menu selecting operation in more detail.

When the second rotary switch 36 is rotated in the menu selecting mode shown in FIG. 27B, the operating section 15b outputs operation information to the control code selecting section 40. Since the operation mode is the menu selecting mode, the control code selecting section 40 outputs the corresponding information to the menu selecting code which is being executed by the sixth control code executing section 46. The sixth control code executing section 46 outputs a code for displaying a character string corresponding to the menu item, which is currently selected according to the operation information, to the information display section 18 on the basis of the menu selecting code and the operation information. The information display section 18 controls the second display 18c to display a menu corresponding to the received code. In FIG. 28, the sixth control code executing section 46 outputs a code for displaying a character string corresponding to a FILE SAVE function.

As described above, various menu items are displayed on the display by scrolling, as in FIGS. 21A and 21B, and a user can specify a desired menu item (function).

Figure 29A:
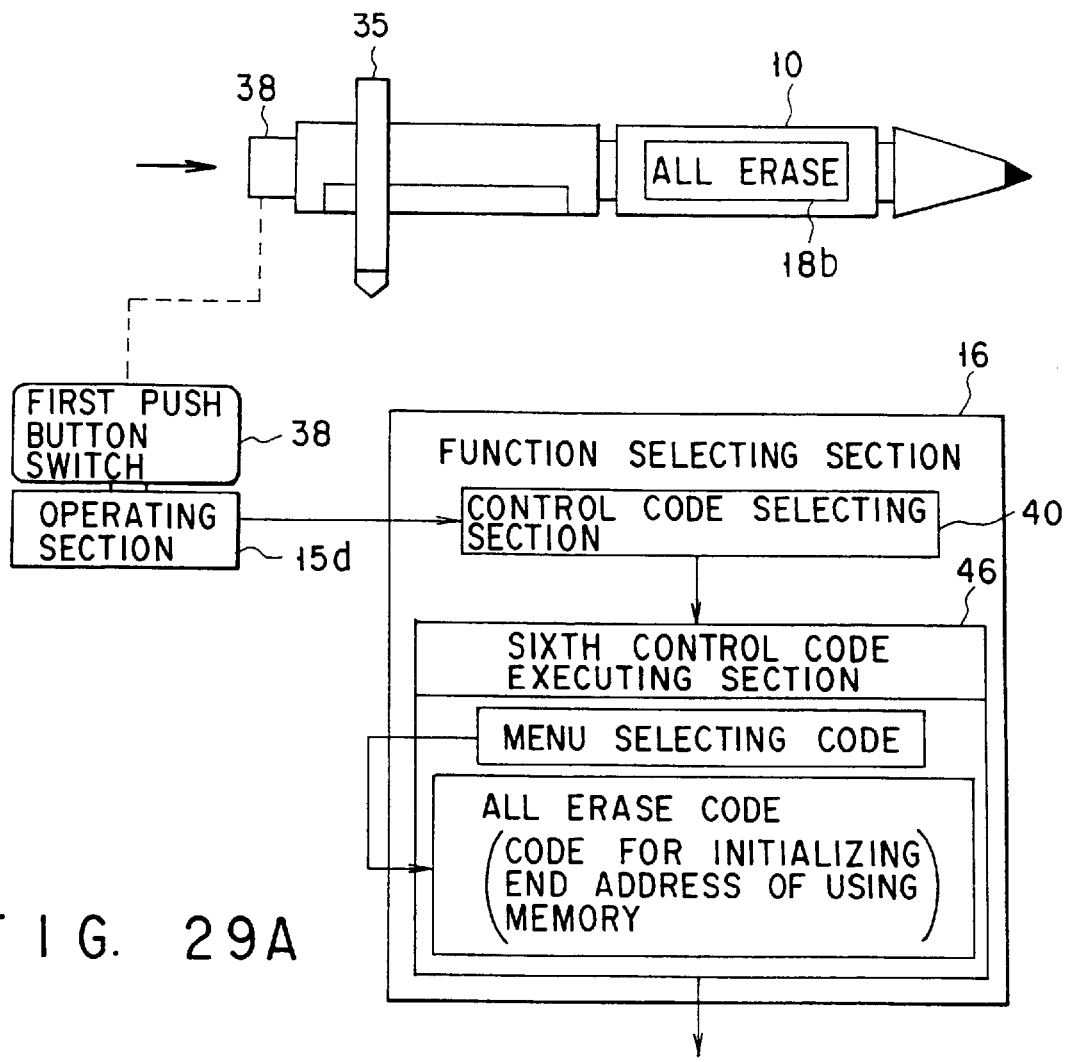
FIGS. 29A and 29B are views showing operations performed when all the contents of a memory in use are erased.
Figure 29B:
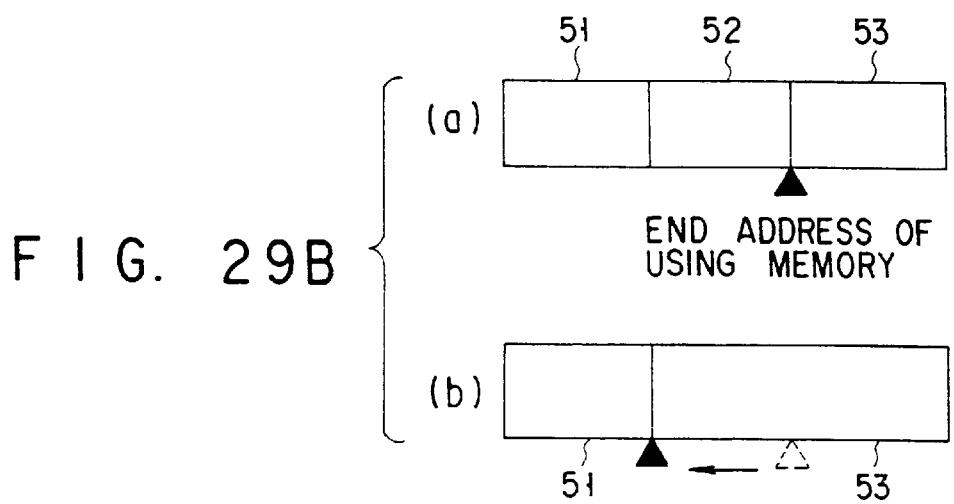

FIGS. 29A and 29B show an operation executed when all the contents of the using memory are to be erased. FIG. 29A shows the control flow, and FIG. 29B shows states before and after the operation.

When the first push button switch 38 is clicked in the menu selecting mode shown in FIG. 27B, the currently displayed menu item is selected and executed. An operating section 15d outputs operation information to the control code selecting section 40. The control code selecting section 40 outputs the operation information to the menu selecting code which is being executed by the sixth control code executing section 46. The sixth control code executing section 46 executes an ALL ERASE code selected by the operation information on the basis of the menu selecting code. The sixth control code executing section 46 requests the access control section 14 to return the end address of the using memory 52 to the start address of the using memory 52 on the basis of the ALL ERASE code, thus invalidating whole writing information which is being written.

FIG. 30 shows an operation based on inclination recognition of the information input device 10. The inclination recognizing section 17 automatically selects a specific function.

An inclination recognizing device is cylindrical, and pairs of switches 68 (first switches 66 and second switches 67) are respectively arranged at upper and lower opposing positions of the cylinder. The cylinder incorporates a conductor 65 which is free to move vertically.

When the pen tip 60 of the information input device 10 faces down, the conductor 65 is moved by gravity to a position where it is clamped between the first switches 66. When the first switches 66 are electrically connected, a circuit corresponding to the first switches 66 in the inclination recognizing section 17 is enabled, and outputs corresponding inclination information to the control code selecting section 40. The control code selecting section 40 selects a writing mode from the inclination information, and requests the second control code executing section 42 to execute a writing mode code.

When the pen tip 60 of the information input device 10 faces up, the conductor 65 is moved by gravity to a position where it is clamped between the second switches 67. When the second switches 67 are electrically connected, a circuit corresponding to the second switches 67 in the inclination recognizing section 17 is enabled, and outputs corresponding inclination information to the control code selecting section 40. The control code selecting section 40 selects an eraser mode from the inclination information, and requests the second control code executing section 42 to execute an eraser mode code.

FIGS. 31A to 31C show an operation for erasing writing information. The information input device 10 comprises information writing sections 11a and 11b in the pen tip 60 and in an end portion opposite to the pen tip 60. The information writing section 11b in the end portion opposite to the pen tip 60 will be especially referred to as an information erasing section hereinafter.

When a writing operation is performed with the information writing section 11b while the pen tip 60 of the information input device 10 faces up in FIG. 31A, the inclination recognizing section 17 automatically selects the eraser mode. When a closed curve is written on a paper sheet with the information erasing section 11b, stroke information of the closed curve is recorded as special codes for an erasing region. When the first push button switch 38 is double-clicked after the closed curve is written, recording of one erasing region is completed. An image on the paper sheet is erased by erasing the image in the closed curve using a normal eraser. FIGS. 31B and 31C show this state. In this case, FIG. 31B shows the erasing state on the memory, and FIG. 31C shows the erasing state on a writing medium.

FIGS. 32 and 33 are views showing the method of storing erasing information, and respectively show the contents of the information storing section 13 as in FIGS. 12 and 13. FIG. 32 shows the types of stored code of a written image, and FIG. 33 shows stored information of the written image. An erasing operation performed by the operation shown in FIG. 31A is attained not by physically erasing recorded writing information but by additionally recording new writing information of a boundary line indicating an erasing region.

When the information input device 10 is set in the eraser mode, the second control code executing section 42 outputs information associated with an operation mode to the access control section 14. The access control section 14 adds a special storage code (−3, −3) to the head of writing information to indicate that subsequent writing information is boundary line information of an erasing region. When the erasing region is written, the same information as normal writing information is recorded. Upon completion of designation of the erasing region, the operating section 15 outputs operation information to the access control section 14 via the function selecting section 16, and the access control section 14 records an end code (−1, −1) in the same manner as storage of writing information.

When recorded writing information is reproduced by the information display section, a written image is reproduced in the order of operations, i.e., an image is written, and is then erased. Finally, a desired written image is reproduced. When an UNDO operation is performed after the erasing operation, since writing information remains, the erased image can be restored by only invalidating writing information of the erasing region.

Figure 34A:
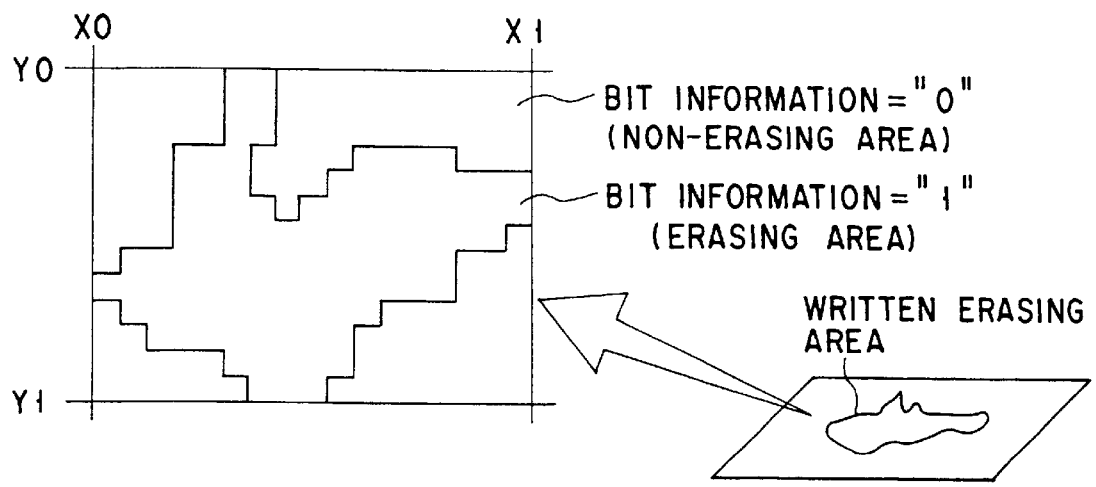
FIGS. 34A and 34B are views showing another method of storing erasing information.
Figure 34B:
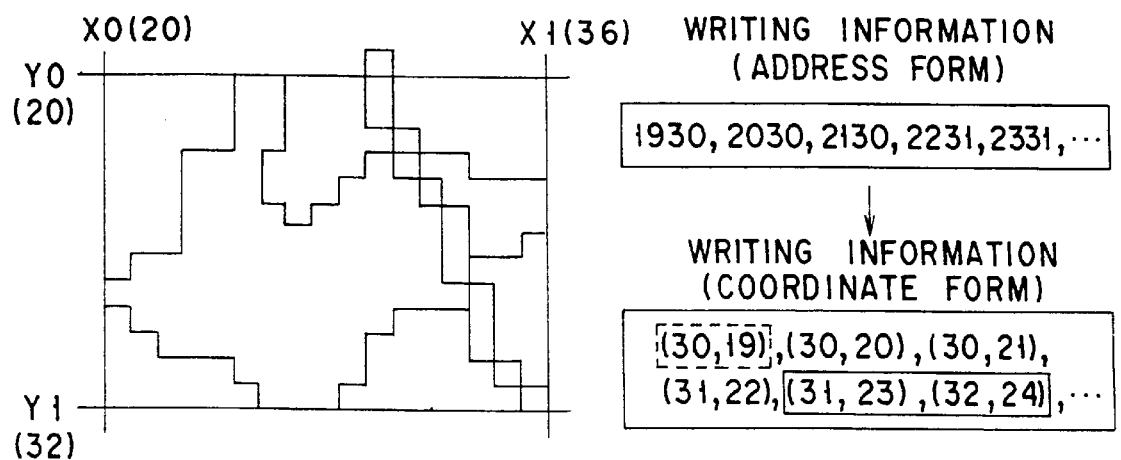

FIGS. 34A and 34B show another method of storing erasing information. When erasing information shown in FIGS. 32 and 33 is frequently written in the memory, the memory is wastefully used. Also, the reproduction speed on the display is lowered. In order to prevent this, the information input device also provides a function of physically erasing writing information to be erased when there is no possibility that an erased image may be restored.

This function is called in, e.g., the following case. When a new UNDO pointer 56 is set, the erasing region is present in the writing information before the UNDO pointer 56. In this case, since writing information corresponding to this erasing region is no longer expected to be subjected to an UNDO operation, the writing information to be erased is physically erased using the writing information of the erasing region. An actual erasing operation is attained in such a manner that an UNDO pointer 56 updating code, which is being executed by the first control code executing section 41, executes a writing information erasing code. The writing information erasing code erases the writing information as follows using writing information of the erasing region.

In a system memory area in the information storing section 13 of the information input device 10, a virtual bitmap area is reserved. When a new UNDO pointer 56 is set, writing information of an erasing region before the UNDO pointer 56 is searched. If one erasing region is found, the writing information erasing code requests the access control section 14 to assign a virtual bitmap area with a size capable of including the erasing area, and to reproduce the erasing region into the virtual bitmap. In this case, the erasing region is reproduced in the virtual bitmap area, so that bit information in the erasing region is 1, and bit information outside the erasing region is 0 (FIG. 34A).

Then, writing information including an erasing portion to be checked is reproduced on the virtual bitmap. When writing information is a point outside the virtual bitmap area, it is skipped without being checked. When writing information to be reproduced is a point in the virtual bitmap, bit information in the virtual bitmap at a point where the writing information is located is referred to. If the bit information is 0, since it indicates a point outside the erasing region, the writing information is not erased; if the bit information is 1, since it indicates a point inside the erasing region, the writing information is erased. By repeating this operation up to writing information immediately before the UNDO pointer 56, writing information in the erasing region is physically erased from the memory. After all the pieces of writing information are erased, writing information representing the erasing region is physically erased from the memory, thus ending the erasing processing (FIG. 34B).

FIGS. 35A to 35C are views showing the first method for assigning ID data to writing information.

In the methods shown in FIGS. 27A to 29B, when a menu item for assigning ID data to writing information is selected, writing information can be recorded as a file having a selected input character as ID data.

When a SAVE MODE is selected in the menu mode, the contents on the second display 18c are cleared, and a cursor is displayed at the left end of the second display 18c (FIG. 35A).

When the second rotary switch 36 is rotated, a character appears at the cursor position, and an English letter to be displayed changes in correspondence with the rotational direction and the rotational amount. When the first push button switch 38 is clicked in a state wherein a required English letter is displayed at the cursor position, the character at the cursor position is determined, and the cursor moves to the right by one character (FIG. 35B). When the first push button switch 38 is double-clicked in a state wherein all the characters are determined, written image information is recorded as a file having the determined character string as ID data (FIG. 35C). For example, the first control code executing section 41 records stored information of a written image shown in FIGS. 12, 32, and 33 as one file in the information storing section 13 via the access control section 14 to have a character string determined in the SAVE MODE as its file name. In this manner, writing information with designated ID data can be searched from a plurality of pieces of writing information stored in the information storing section 13.

In the above-mentioned operation, the first control code executing section 41, which is executing the SAVE MODE code, issues a request to the access control section 14, and the access control section 14 changes the using memory 52 to the used memory 51 and, at the same time, updates the start address of the using memory 52, the UNDO address, and the memory use state informing address to the end address of the using memory 52. As a result, an initial state wherein a newly written image can be recorded is set.

Figure 36:
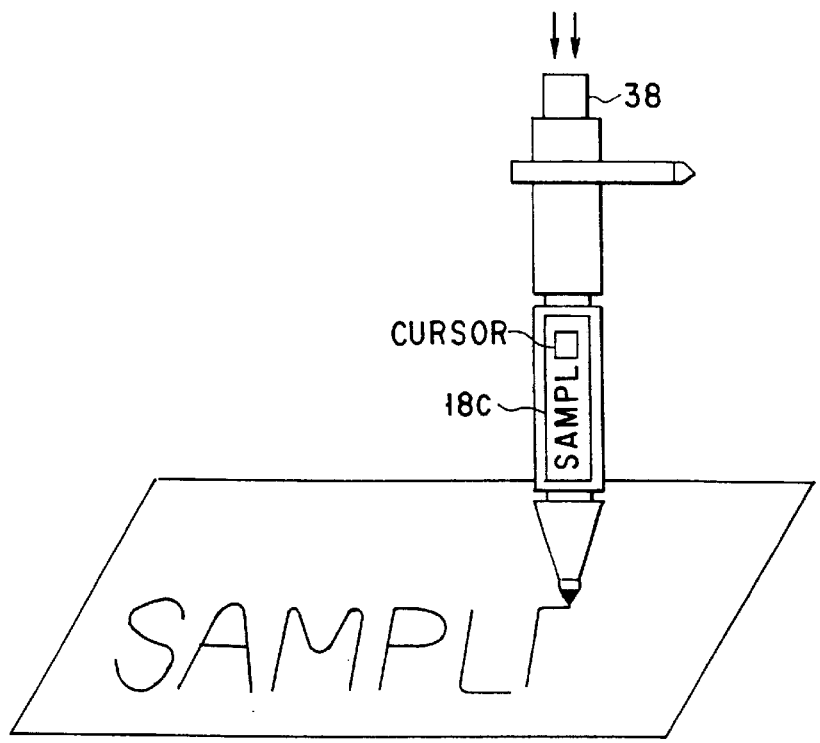
FIGS. 36 and 37 are views showing the second method of assigning ID data to writing information.
Figure 37:
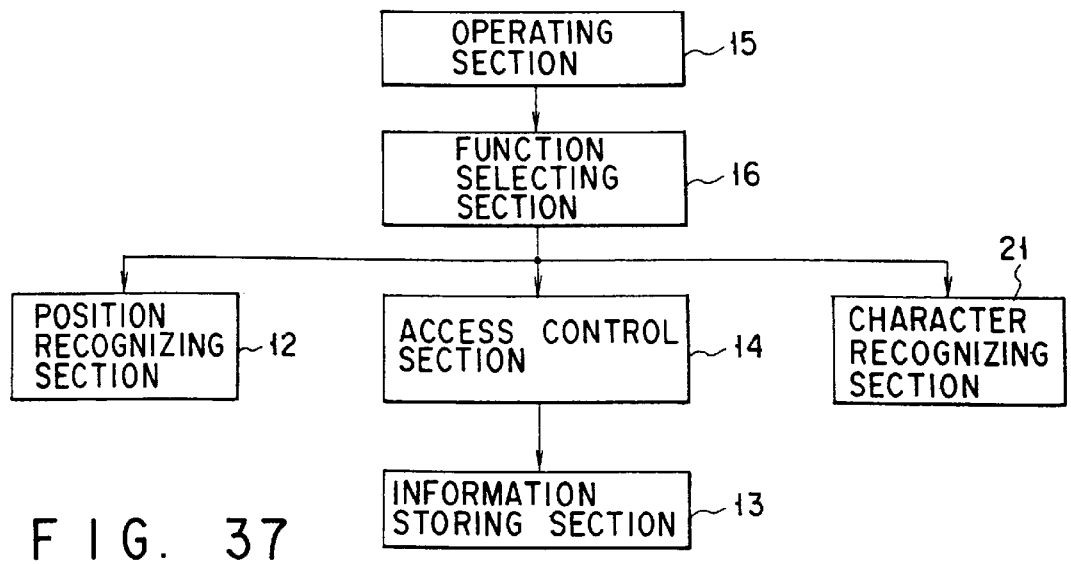

FIGS. 36 and 37 show the second method of assigning ID data to writing information in this embodiment. When a menu item for assigning ID data to writing information is selected in the methods shown in FIGS. 27A to 29B, a hand-written character is recognized, and writing information can be recorded as a file having the recognition result as ID data.

When a SAVE MODE2 is selected in the menu mode, the contents on the second display 18c are cleared, and the cursor is displayed at the left end of the display 18c. When the first character of a file ID is written with the information input device 10, the first control code executing section 41 requests the access control section 14, via a SAVE MODE2 code, to record writing information recognized by the position recognizing section 12 in a specific system memory area.

When the first push button switch 38 is double-clicked after one character is written, the operating section 15d outputs operation information to the control code selecting section 40, and the control code selecting section 40 outputs the received information to the first control code executing section 41. The first control code executing section 41 requests the access control section 14 to output writing information of the character to a character recognizing section 21. The character recognizing section 21 performs character recognition based on the received writing information of the character, and outputs the recognition result to the control code selecting section 40. The control code selecting section 40 outputs the recognition result to the first control code executing section 41. The first control code executing section 41 displays the recognized character, and at the same time, advances the cursor to the right by one character, thus waiting for the next character writing input. When the first push button switch 38 is kept depressed for a predetermined period of time or longer upon completion of the input of all the characters, the first control code executing section 41 records writing information as a file having the recognized input character string as ID data on the basis of output information from the operating section 15 and the time recognizing section 20.

As described above, ID data written on a writing medium can be read later, and writing information with ID data which coincides with the read ID data can be searched from the memory.

In this case, the access control section 14 changes the using memory 52 to the used memory 51, and updates the start address of the using memory 52, the UNDO address, and the memory use state informing address to the end address of the using memory 52. As a result, an initial state wherein a newly written image can be recorded is set.

The first control code executing section 41 in FIGS. 35A to 35C, and FIGS. 36 and 37 has a function associated with information recording, and a function associated with a menu display/menu operation.

Figures 38, 39:
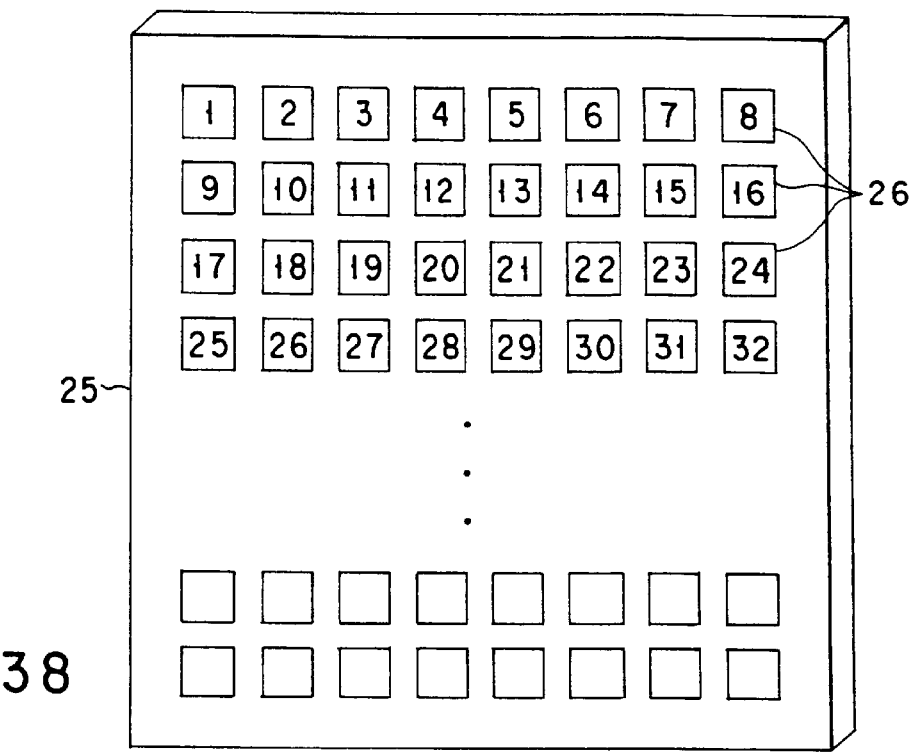
FIG. 38 is a perspective view showing the arrangement of the position information holding device.
FIG. 39 is a view showing a method of using the position information holding device by the information input device.

FIG. 38 shows the arrangement of the position information holding device 25.

The position information holding sections 26 each having unique position information are arranged at the respective positions on the position information holding device 25. When the position information is detected by the information input device 10, the absolute coordinates of the information input device 10 on the position information holding device 25 can be obtained.

FIG. 39 shows a method of using the position information holding device 25 by the information input device 10.

Since the position recognizing section 12 of the information input device 10 converts position information into the absolute coordinates, when the position information holding devices 25 having various sizes are used, position information conversion maps corresponding to these position information holding devices 25 are required.

Thus, a position information conversion map 33 corresponding to the position information holding device 25 having a maximum size (a portion indicated by dot line) which can be used for the information input device 10 is prepared, and position information is assigned to a position information holding device 25 having a small size (a portion indicated by real line), as shown in FIG. 39.

As a result, correct absolute coordinates can be obtained for any of the position information holding devices having various sizes on the basis of the common position information conversion map. For example, position information "14" is converted into, e.g., absolute coordinates (4, 2) by the position information holding device 25 having any size.

As described above, since the position information holding devices having various sizes can be used without modifying the information input device 10, an information input system which has an information input surface having a required size, and high portability can be provided.

Figure 40:
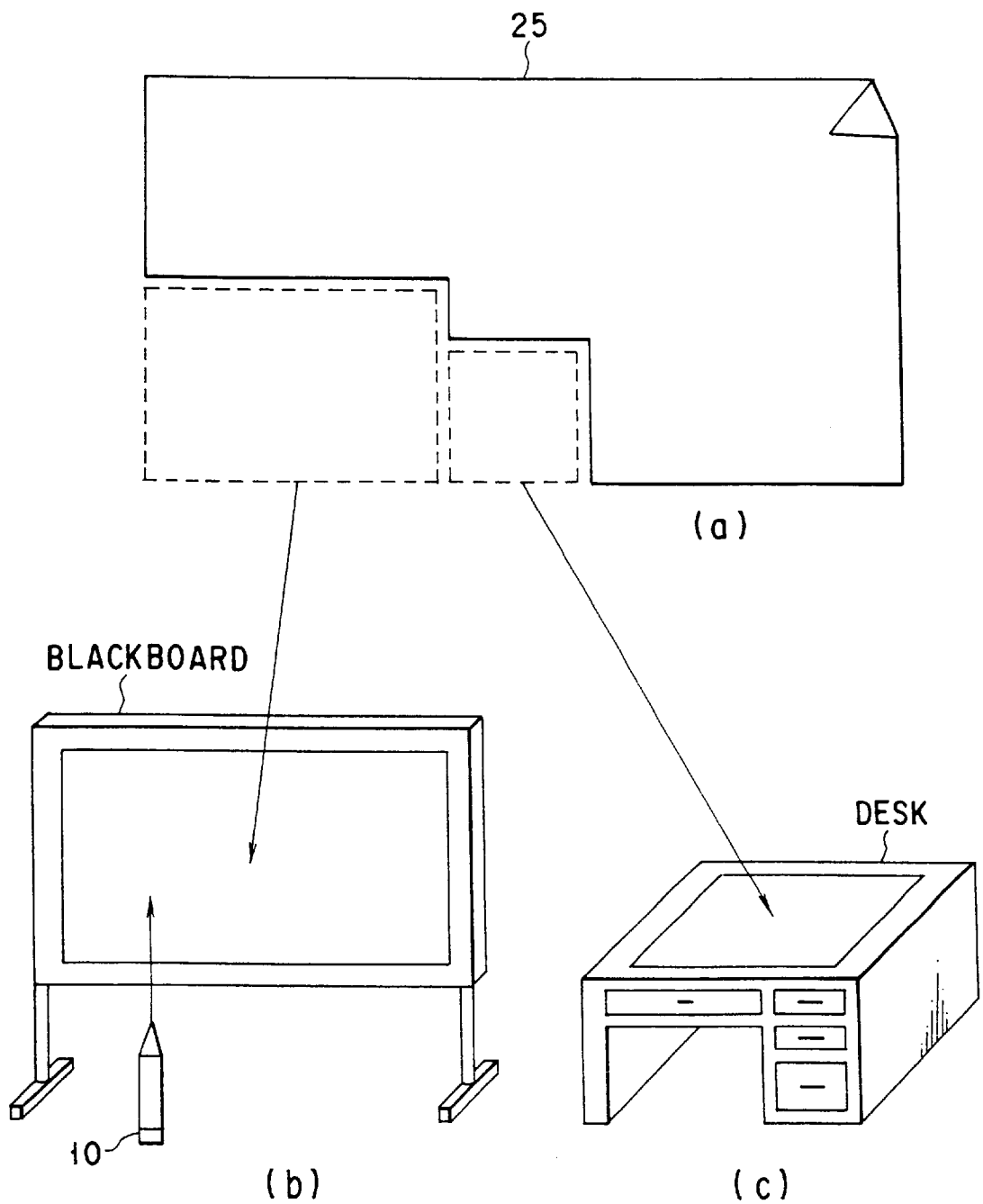
FIG. 40 is a view showing an example of a method of using the position information holding device.

FIG. 40 shows an example of the use method of the position information holding device 25.

Unique position information is held at each position on the position information holding device 25, and when the position information is detected by the information input device 10, the absolute coordinates of the information input device 10 on the position information holding device 25 can be obtained.

The large-area position information holding device 25 which is formed into a sheet-like shape ((a) of FIG. 40; the detailed arrangement thereof will be described later) has high portability since it can be deformed (e.g., may be rolled up). A required portion is cut off from the entire sheet, and is adhered to the surface of a blackboard, desk, or the like, thus constituting the information input system of the present invention ((b) and (c) of FIG. 40). At this time, a correction for setting an origin is performed by the position recognizing section 12, so that writing information can be accurately recorded.

The present invention is not limited to the above arrangement. For example, sheet-like position information holding devices 25 having various sizes from the beginning can be prepared. As a result, an information input system which comprises an information input surface of a required size and can be naturally used can be constituted by performing simple processing of conventional devices having surfaces of various sizes.

FIG. 41 is a view for explaining the driving method of the writing information display device 30. The position recognizing section 12 of the information input device 10 converts stored writing information 13 into a "coordinate code, color code" string using a position information map 62. Each display point of the writing information display device 30 has a function of storing display contents, and an image displayed once is kept displayed.

The information input device 10 outputs a "coordinate code, color code" information string corresponding to writing information to a display control section 63 of the writing information display device 30 simultaneously with a writing operation. The display control section 63 writes information of display points in a display storing section 64.

As a result, since the information input device 10 outputs coordinate information in place of continuously outputting writing information, writing information in the information input device 10 can be displayed on the writing information display sections 30 of various sizes. Since no video memory is used, cost can be reduced.

When the same information as that output to the display in the information input device 10 is output to the writing information display device 30, not only writing information, but also image information representing the operating state of the information input device 10 can be displayed on a separate display section.

FIGS. 42A to 42D show a case wherein a recorded written pattern is different from a written pattern to be displayed, and show a method of reproducing a bold-line written image recorded by the information input device 10 of the present invention using the writing information display device 30. Writing information is recorded as a line of "line width=1" irrespective of the line width attribute, as shown in FIG. 12. For this reason, when an image is displayed on the writing information display section 30, writing information which reflects the line width attribute must be output to the display section, or the writing information display device 30 must perform image reproduction in consideration of the line width attribute. In this case, the position recognizing section 12 converts writing information, whose line width is expanded based on the line width attribute, with reference to recorded writing information, and outputs converted information to the display section, or the display control section 63 of the display section develops writing information to that whose line width is expanded (FIGS. 42A and 42B).

The line width is expanded as follows. That is, when a stroke is present below a straight line which forms an angle of 45-degree with respect to the horizontal direction, the horizontal width is expanded; when a stroke is present above the straight line, the vertical width is expanded (FIGS. 42C and 42D).

Figure 43:
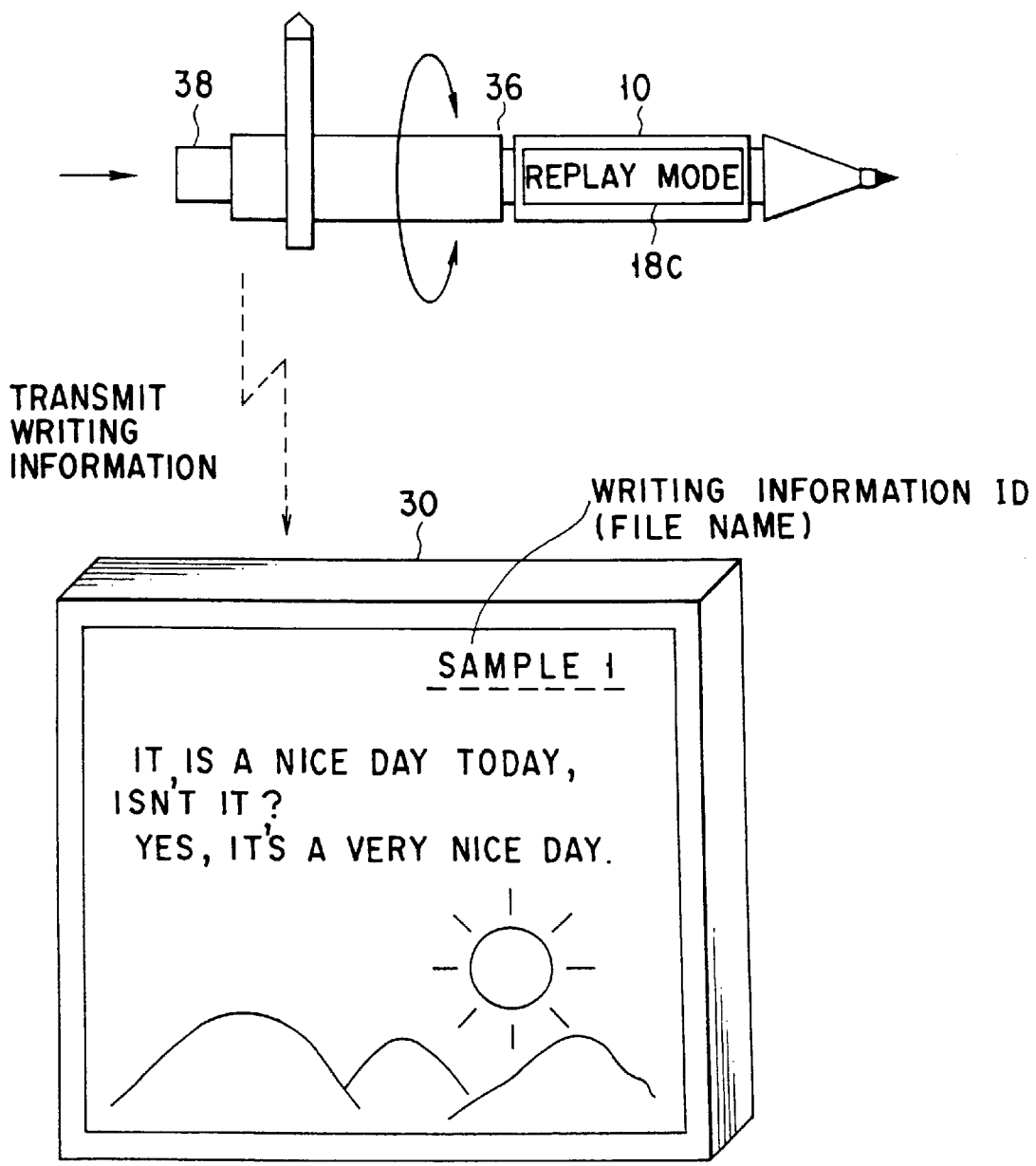
FIG. 43 is a view for explaining an example of a method of reproducing writing information according to the embodiment shown in FIG. 5.

FIG. 43 shows an embodiment associated with reproduction of writing information by the information input device 10 of the present invention. In a menu for reproducing writing information on the writing information display device 30, recorded writing information can be reproduced and transferred to the writing information display device 30 using the second rotary switch 36 and the first push button switch 38 of the information input device 10. More specifically, the following operation is realized when the information input device 10 controls the respective sections of the writing information display device 30, as shown in FIG. 41, in accordance with instructions from the second rotary switch 36 and the first push button switch 38.

When the second rotary switch 36 is rotated, writing information is reproduced at high speed in units of recorded files. In this case, images are reproduced like video reproduction using a jog dial. When reproduced images approach target file information, the first push button switch 38 is clicked to perform frame-scan reproduction. Images can be reproduced in the positive or negative direction depending on the rotational direction of the switch 36. For this reason, even when target file information is gone past during high-speed reproduction, it can be searched again in the reverse direction.

The same reproduction as described above can be performed for one file. More specifically, after writing information of a specific file is selected, high-speed reproduction or frame-scan reproduction can be performed by the above-mentioned method in the order written from a writing start state to a writing end state.

Figure 44C:
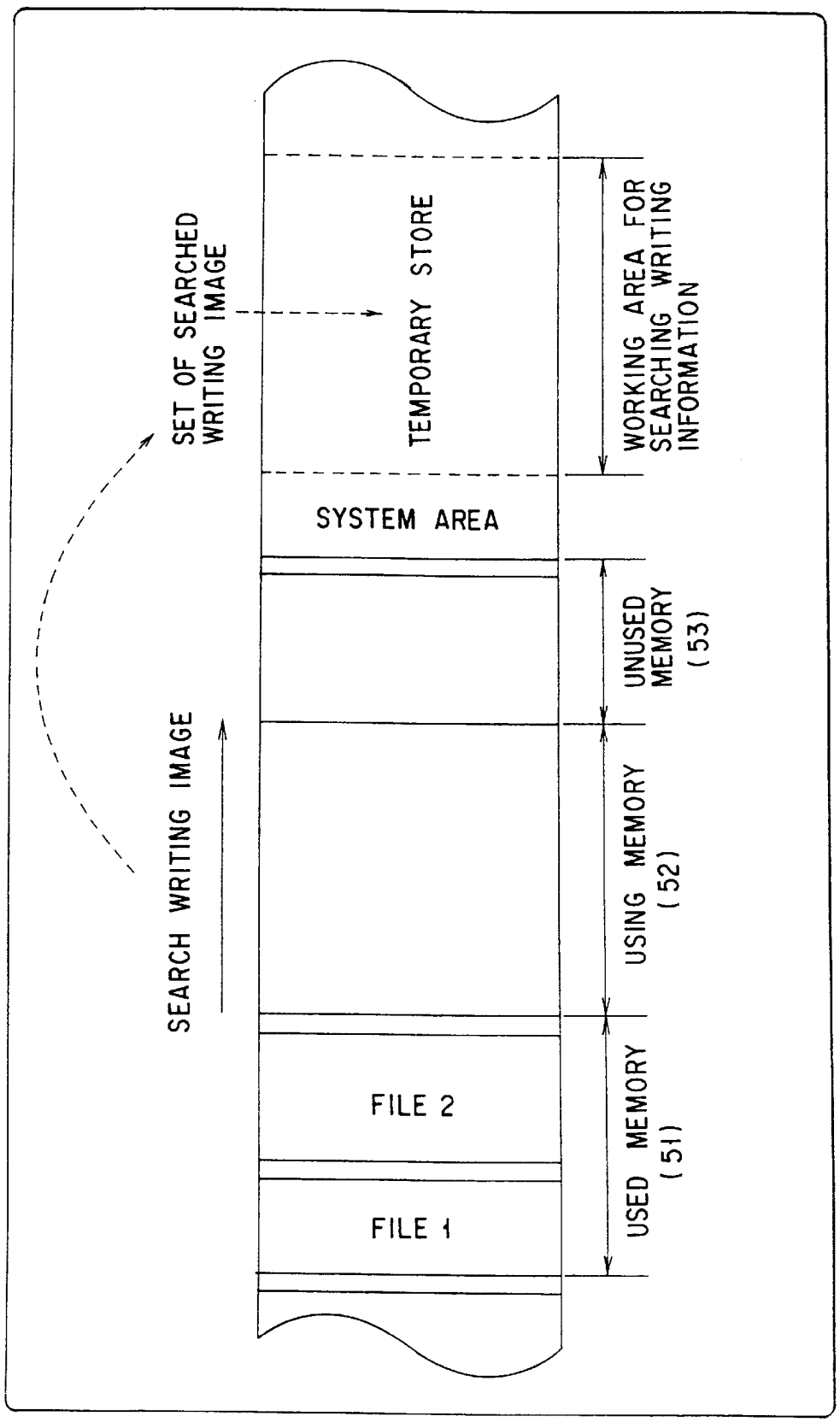

In some cases, a certain writing content in a written image may be designated during writing, and writing information corresponding to the designated writing content may be searched from the information storing section 13. FIGS. 44A to 44C show an example for searching designated writing information from the information storing section 13.

This function is called, for example, when a portion of a written image is to be output to another information input device 10 during writing with the information input device 10. In order to search a portion of a written image from the information storing section 13, the following two methods are available.

The first method is a method shown in FIG. 44A. When Select Mode 1 is selected in the menu mode, a mode for searching a written image in a region enclosed within a closed curve is set. When a closed curve is written on a paper sheet with the pen tip 60, and the first push button switch 38 is double-clicked, the stroke information of the closed curve is recorded as a special code corresponding to a search region.

The second method is a method shown in FIG. 44B. When Select Mode 2 is selected in the menu mode, a mode for searching a written image in a rectangle defined by two points is set. When two points on a diagonal line of a rectangle are designated on a paper sheet using the pen tip 60, and the first push button switch 38 is double-clicked at the respective points, the stroke information of the rectangular region is recorded as a special code corresponding to a search region.

In the system memory of the information storing section 13 of the information input device 10, a virtual bitmap area is reserved. When a virtual bitmap search area is recorded, the access control section 14 develops the virtual bitmap search area. In this case, the virtual bitmap search area is developed on the virtual bitmap area, so that bit information in the virtual bitmap search area is 1, and bit information outside the virtual bitmap area is 0, in the same manner as the erasing region shown in FIG. 34A or 34B.

Furthermore, a working area for searching writing information is reserved on the system memory of the information storing section 13 of the information input device 10, and can temporarily record searched writing information.

Then, writing information stored in the using memory 52 which stores an image which is being currently written is developed in turn on the virtual bitmap area. If the developed writing information corresponds to a point outside the virtual bitmap area, it is skipped without being checked. If the developed writing information corresponds to a point in the virtual bitmap area, bit information of the virtual bitmap area at a point where the writing information is located is referred to. If the bit information is 0, since it indicates a point outside the search region, the writing information is skipped. However, if the bit information is 1, since it indicates a point inside the search region, the writing information is copied to the working area for searching. By repeating this operation up to the last writing information in the using memory 52, writing information in the search region is searched from the information storing section 13.

FIGS. 45 and 46 are views showing information exchange of a written image between a plurality of information input devices 10 using the position information holding device 25.

The position information holding device 25 has two or more connectors which can receive the pen tip 60 of the information input device 10, and these connectors are coupled to each other via a bidirectional communication interface (information exchange I/F section 27).

The pen tip 60 of the information input device 10 is connected to the information exchange section 19 and can exchange information with the information exchange section 19.

When the pen tip 60 of one information input device 10 is inserted into a connector, the information exchange section 19 of the information input device 10 is connected to the information exchange I/F section 27 of the position information holding device 25, and the information input device 10 is connected, via the information exchange I/F section 27, to an information exchange section 19 of another information input device 10 inserted into another connector. The pen tip 60 of the information input device 10 and a connector of the position information holding device 25 can exchange information signals directly by contacting the conductive pen tip 60 and the connector, or via a weak radio communication by bringing the pen tip 60 having a very weak radio function and the connector to be close to each other.

The pen tip 60 of each information input device 10 and each connector of the position information holding device 25 respectively have small projections and recesses which fit with each other, and the pen tip 60 can be inserted in a connector to only at least one specific angle about the axis of the pen. Once the pen tip 60 is inserted in a connector of the position information holding device 25, the pen tip 60 is fixed with respect to the rotational direction about the axis of. the information input device 10.

In a menu for receiving writing information, when the pen tip 60 of the information input device 10 at the receiving side is inserted in a connector of the position information holding device 25, and the third rotary switch 37 is rotated through a predetermined angle or more, the operating section 15c detects this rotation, and outputs information to the function selecting section 16. The function selecting section 16 outputs a reception start command to the information exchange section 19. At the beginning of reception, the information exchange section 19 outputs information associated with the operating state of information reception to the information display section 18, and the display 18a of the information input device 10 displays information indicating that the information input device 10 at the receiving side is ready for reception. Thereafter, the information exchange section 19 is set in an information reception standby state.

The information input device 10 at the output side is set in the menu mode of Select Mode 1 (information transmitting mode) or Select Mode 2 (information receiving mode), and a written image is searched by the method described above with reference to FIG. 34A or 34B. Thereafter, when the pen tip 60 of the information input device 10 is inserted in the connector of the position information holding device 25, information associated with the operating state of information output is output to the information display section 18, and the display 18a of the information input device 10 displays information indicating the information exchange state.

Thereafter, when the third rotary switch 37 is rotated through a predetermined angle or more in a direction about the axis of the pen, the operating section 15c detects the rotation, and outputs information to the function selecting section 16. The function selecting section 16 outputs an information output start command to the information exchange section 19.

At the beginning of the output, the information input device 10 continuously transmits a hand-shake signal for confirming the presence of the information input device 10 at the receiving side for a predetermined period of time. When an information input device 10 in a reception standby state is present, the information exchange section 19 at the receiving side is set in an information reception state upon reception of the hand-shake signal, and at the same time, sends back a hand-shake signal indicating that a reception preparation is ready. Upon reception of the hand-shake signal indicating that the reception preparation is ready, the information exchange section 19 at the output side begins to output information.

During the output, the access control section 14 for managing an information transmission area outputs information associated with the ratio of already output information to the information exchange section 19. The display section 18b of the information input device 10 at the receiving side displays the information indicating the receiving progress state on the basis of the ratio of already output information transmitted via the information exchange section 19 and an amount of the received writing information. User can readily confirm whether the information exchange is performed with no problem by observing the receiving progress state.

FIG. 47 shows the first arrangement of a position recognizing system according to the present invention. FIGS. 47 to 53 show embodiments of the position recognizing system. These systems can be applied to both a case wherein the pen tip 60 comprises writing means onto a paper sheet and a case wherein the pen tip 60 does not comprise such means.

Referring to FIG. 47, dielectric members having unique dielectric constants (which are different from each other depending on positions) and conductive plates 72 which vertically sandwich the dielectric member 71 therebetween are arranged in a matrix at the respective positions of the sheet-like or planar position information holding device 25. The upper conductive plates are exposed to the surface of the position information holding device 25, and the lower conductive plates 72 are connected to a single line. The line is directly connected to a terminal 73 exposed to the surface.

The information input device 10 comprises the position recognizing section 12 having an oscillating circuit 86 and a waveform detecting circuit 87, and the information writing section 11, which are connected in series with each other. These circuits are connected in series with each other. A conductive line 88 extends from the rear end portion of the pen, and is connected to the terminal 73 of the position information holding device 25 when the pen is used. As shown in FIG. 47, when the information writing section 11 contacts one of the conductive plate 72 on the surface, the information input device 10 and the position information holding device 25 form a closed circuit, thus enabling the position recognizing section.

Since a waveform detected by the waveform detecting circuit 87 changes depending on the capacitance of a capacitor which contacts the information writing section 11, the capacitance of the capacitor which contacts the distal end portion is obtained by the waveform detecting circuit 87, and the absolute position of the information writing section 11 (i.e., pen tip 60 of the information input device) can be obtained.

FIG. 48 shows another arrangement of the position information holding device 25 of the present invention. As shown in FIG. 48, unique dielectric members 71 are printed on respective layers by a semiconductor printing technique, and these layers are stacked to obtain a multi-layered structure, thus realizing the position information holding device 25, which has unique dielectric constants at respective dots.

FIG. 49 shows a modification of the first arrangement of the position recognizing system of the present invention. In this case, a writing medium (paper sheet) is present between the information input device and the position information holding device.

Dielectric members 71 having unique dielectric constants and conductive plates 72 arranged below the dielectric members 71 are arranged in a matrix at the respective positions of the position information holding device 25. These conductive plates 72 are connected to a single line, and the line is directly connected to a terminal 73 exposed to the surface.

The information input device 10 comprises the position recognizing section 12 having an oscillating circuit 86 and a waveform detecting circuit 87, and the conductive information writing section 11, which are connected in series with each other. The information writing section 11 has writing means which consists of a conductive material, and projects from the central portion of a conductive plate 72 having the same shape as that of the conductive plate 72 embedded in the position information holding device 25. The conductive line 88 extends from the rear end portion of the pen, and is connected to the terminal 73 of the position information holding device 25 when the pen is used.

When a thin writing medium is placed on the position information holding device 25, and information is written thereon with the information writing section 11, the position recognizing section 12 is enabled by a switch in the operating section 15 of the information writing section 11.

When the conductive plate 72 of the information writing section 11 is placed above a certain capacitor portion on the surface of the position information holding device 25, the information input device 10 and the position information holding device 25 form a closed circuit. Since a waveform detected by the waveform detecting circuit 87 changes depending on the capacitance of the capacitor portion formed by the information writing section 11, the capacitance of the capacitor portion which contacts the information writing section 11 is obtained, and the absolute position of the information writing section 11 on the position information holding device 25 can be obtained. More specifically, when information is written on a paper sheet, the position information of the written information is simultaneously stored in the pen.

FIGS. 50A and 50B show the second arrangement of the position recognizing system according to the present invention.

As shown in FIG. 50A, magnetic members 74 having unique magnetic flux densities (which are different from each other depending on positions) are arranged in a matrix at the respective positions of the position information holding device 25.

The information input device 10 comprises the conductive information writing section 11, and the position recognizing section 12 having a magnetic sensor circuit which is constituted by a magnetic flux density detecting circuit 89 and a magnetoresistance element 90 using an electromagnet.

When a thin writing medium 29 is placed on the position information holding device 25, and information is written thereon with the information writing section 11, the position recognizing section 12 is enabled by the operating section 15 of the information input device 10.

When the magnetoresistance element of the information writing section 11 is placed above a certain magnetic member 74 on the position information holding device 25, the resistance of the magnetoresistance element 90 changes, and a potential detected by a voltage sensor 91 also changes. Thus, the magnetic flux density of the magnetic member 74 at the position of the information writing section 11 is obtained based on the potential difference detected by the voltage sensor 91, and the absolute position of the information writing section 11 on the position information holding device 25 can be recognized.

Figure 51A:
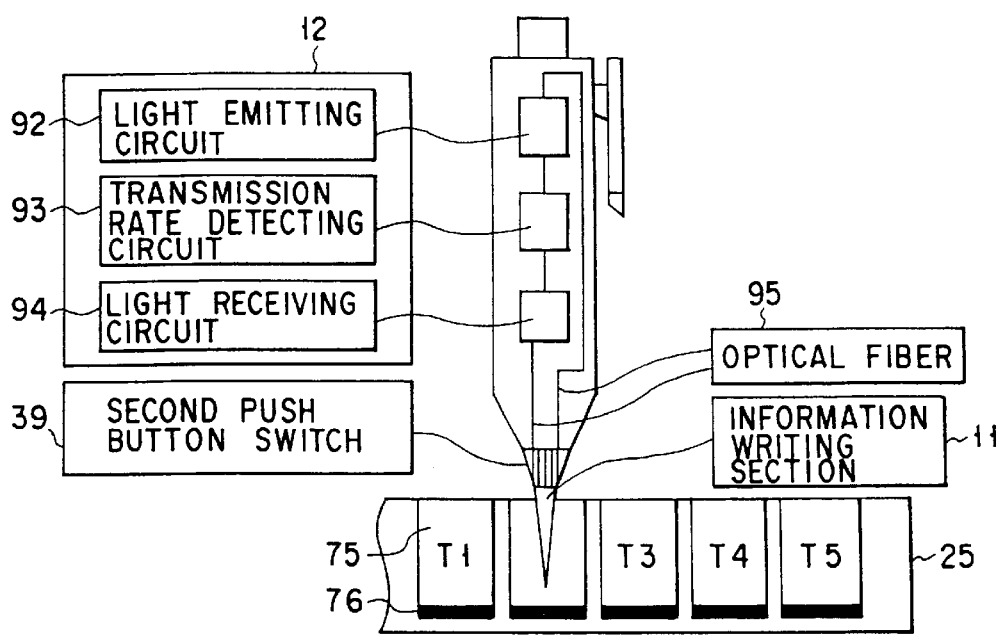
FIGS. 51A and 51B are views showing the third arrangement of a position recognizing system according tot he present invention.
Figure 51B:
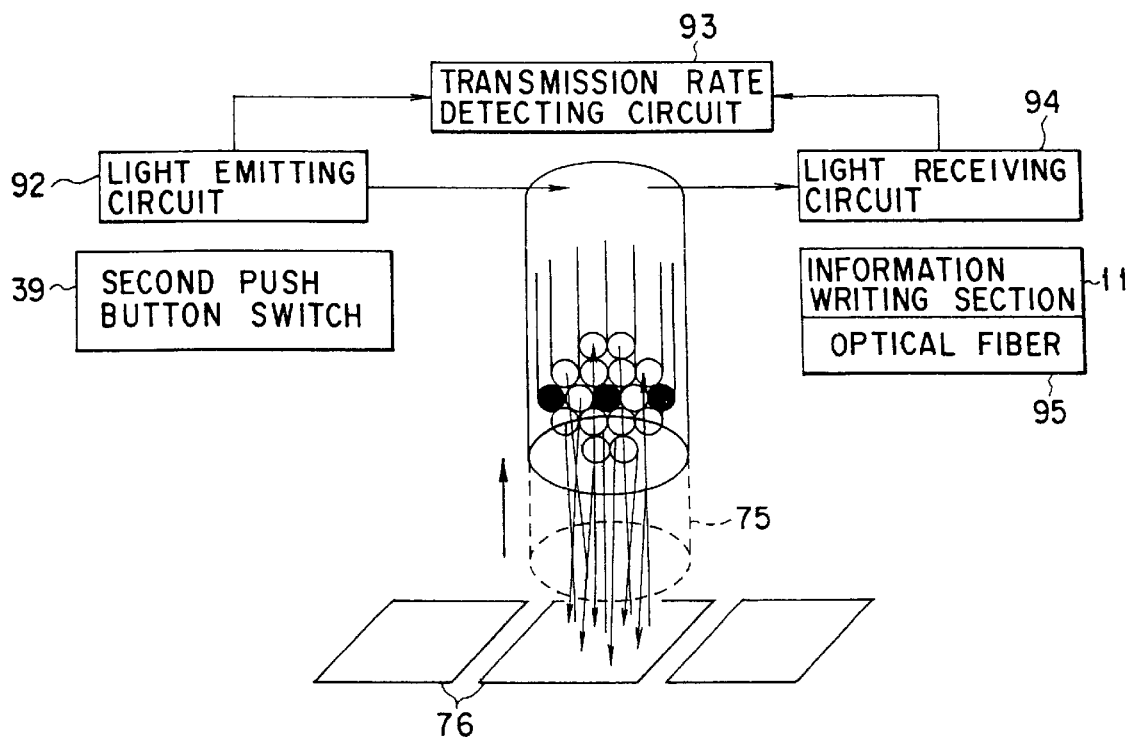

FIGS. 51A and 51B show the third arrangement of the position recognizing system according to the present invention.

As shown in FIG. 51A, penetration members 75 having unique transmittances (which are different from each other depending on positions), and underlying reflection members 76 are arranged in a matrix at the respective positions on the position information holding device 25.

The information input device 10 comprises the information writing section 11, and the position recognizing section 12 which has a light-emitting circuit 92, a light-receiving circuit 94, and a transmittance detecting circuit 93. The information writing section 11 comprises a bundle of a plurality of optical fibers 95, and a writing recognizing switch (the second push button switch 39) surrounds these optical fibers 95. The optical fibers 95 include light-emitting optical fibers 95a and light-receiving optical fibers 95b.

As shown in FIG. 51B, the bundle of optical fibers 95 is normally retracted in the pen tip 60. when the pen tip 60 is pressed against a writing medium, the second push button switch 39 is pushed, and the position recognizing section 12 is enabled. At the same time, the bundle of optical fibers 95 projects from the pen tip 60. Light output from the light-emitting optical fibers 95a is transmitted through a certain penetration member 75 in the position information holding device 25, is reflected by the underlying reflection member 76, and emerges outside the position information holding device 25 again. The reflected light is received by the light-receiving optical fibers 95b, and is transmitted to the light-receiving circuit 94. The transmittance detecting circuit 93 calculates the transmittance of the corresponding penetration member 75 on the basis of the output intensity from the light-emitting circuit 92 and the input intensity to the light-receiving circuit 94. As a result, the absolute position of the information input device 10 on the position information holding device 25 can be recognized.

When the surface of the position information holding device 25 is colored in white by special optical coating, and a writing section using a special ink is embedded in the information writing section 11, a writing operation can be performed using the position information holding device 25 itself as a writing medium 29 (display device) without using paper. When an ink which totally reflects or absorbs light is used as the special ink, a position recognition error depending on a written image can be prevented. Furthermore, writing information can be erased by an erasing section comprising means (e.g., the information reading section 11b shown in FIGS. 31A to 31C) capable of erasing the special ink by the same method as that described above with reference to FIGS. 23A to 23C.

Figure 52A:
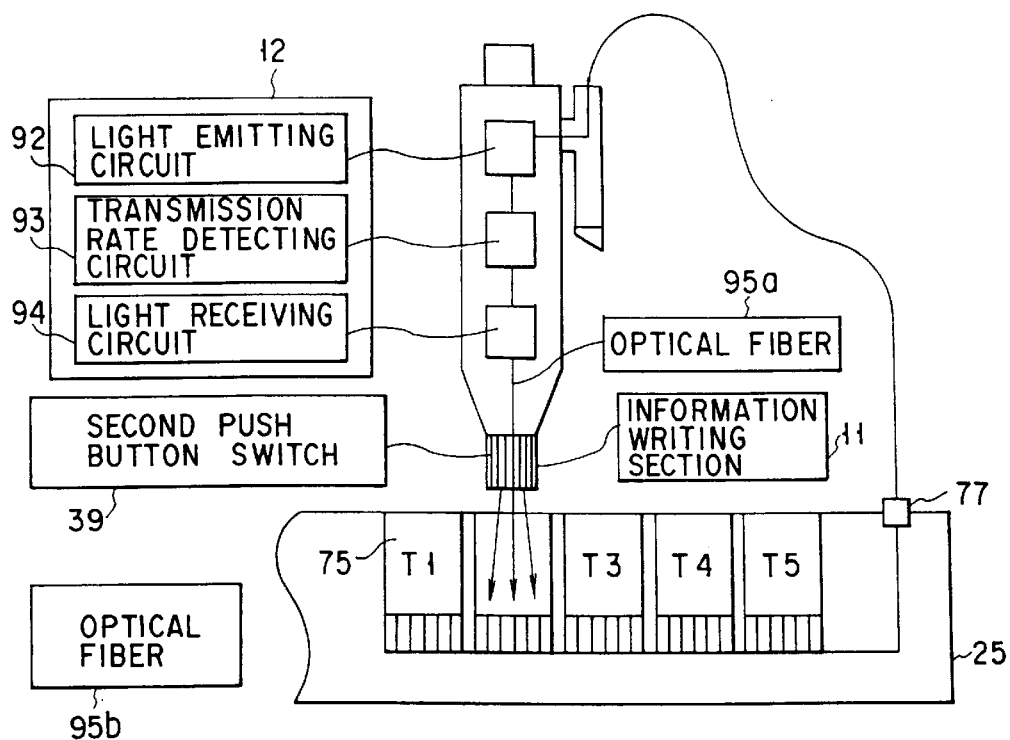
FIGS. 52A and 52B are views showing a modification of the third arrangement of the position recognizing system according to the present invention.
Figure 52B:
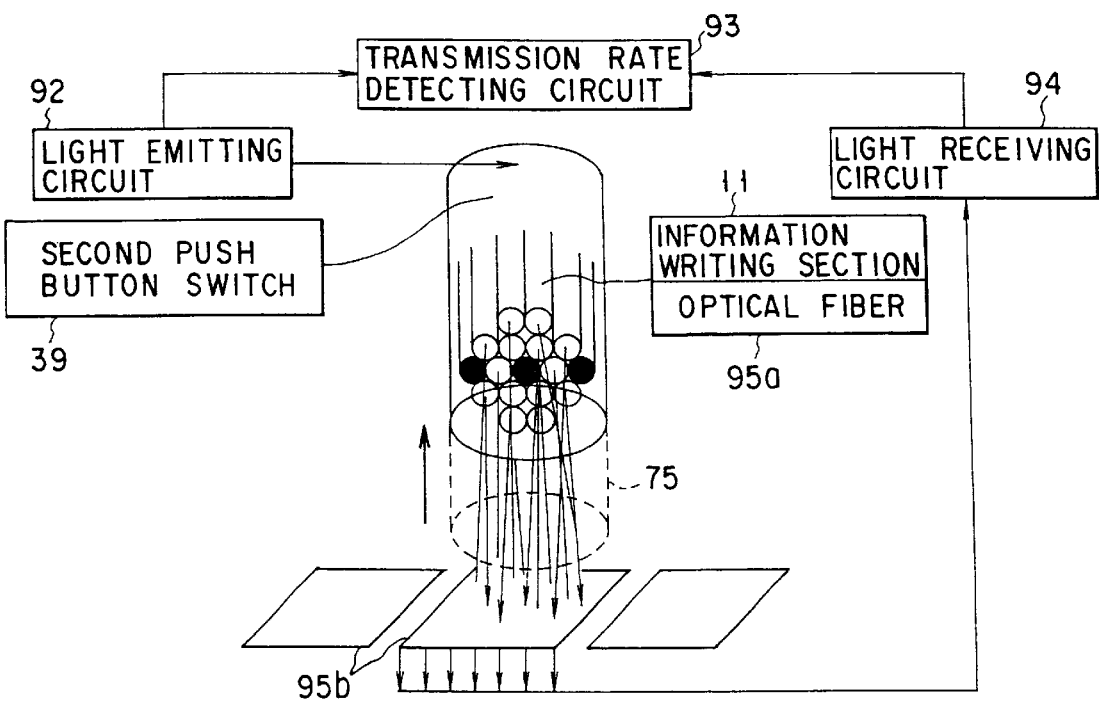

FIGS. 52A and 52B show a modification of the third arrangement of the position recognizing system of the present invention.

As shown in FIG. 52A, penetration members 75 having unique transmittances and serving as the information writing section 11, and underlying light output openings 77 to optical fibers 95b are arranged in a matrix at the respective positions on the position information holding device 25. The optical fibers 95b are connected to a light output opening 77 of the position information holding device 25, and all input light components are output to the light output opening 77.

The information input device 10 comprises the information writing section 11 and the position recognizing section 12 which has a light-emitting circuit 92, a light-receiving circuit 94, and a transmittance detecting circuit 93. The information writing section 11 comprises a bundle of a plurality of optical fibers 95a, and a writing recognizing switch (second push button switch 39) surrounds these optical fibers 95a. The optical fibers 95a are used for emitting light.

As shown in FIG. 52B, the bundle of optical fibers 95a is normally retracted in the pen tip 60. When the pen tip 60 is pressed against a writing medium 29, the second push button switch 39 is pushed, and the position recognizing section 12 is enabled. At the same time, the bundle of optical fibers 95a projects from the pen tip 60. Light emerging from the light-emitting optical fibers 95a is transmitted through the corresponding penetration member 75 in the position information holding device 25, and is output to the light output opening 77 of the position information holding device 25 via the input port of the corresponding optical fiber 95b, below the penetration member 75, of the position information holding device 25. Then, the light is output to the light-receiving circuit 94 of the information input device 10 via an optical fiber 95b connected to the information input device 10. The transmittance detecting circuit 93 detects the transmittance of the corresponding penetration member 75 at the position of the information writing section 11 on the basis of the output intensity from the light-emitting circuit 92 and the input intensity to the light-receiving circuit 94. As a result, the absolute position of the information input device 10 on the position information holding device 25 can be recognized.

When the surface of the position information holding device 25 is colored in white by special optical coating, and a writing section using a special ink is embedded in the information writing section 11, a writing operation can be performed using the position information holding device 25 itself as a writing medium 29 (display device) without using paper. When an ink which totally reflects or absorbs light is used as the special ink, a position recognition error depending on a written image can be prevented. Furthermore, writing information can be erased by an erasing section comprising means (e.g., the information reading section 11b shown in FIGS. 31A to 31C) capable of erasing the special ink by the same method as that described above with reference to FIGS. 23A to 23C.

FIG. 53 shows the fourth arrangement of the position recognizing system of the present invention.

The position information holding device comprises a plurality of position information holding sections 26 each of which has a micro coil 78, memory elements 79 each storing unique position information (which is different depending on positions) and including control circuit. Each micro coil 78 is arranged in the surface of the position information holding device 25, and upon reception of a specific magnetic field, the micro coil enables the corresponding control circuit by a generated inductive electromotive force. When the control circuit is enabled, it controls the corresponding memory element 79 to output position information stored therein onto a data bus 80.

The information input device 10 comprises the position recognizing section 12, the power source section 34, an oscillating circuit 86, and the conductive information writing section 11. A data bus 80a and a power source line 80b extend from the rear end portion of the information input device 10, and when the information input device 10 is used, these lines are connected to terminals of the data bus 80a and the power source line 80b of the position information holding device 25. The information writing section 11 incorporates a micro coil 78. When the information writing section 11 is pressed against the surface on the position information holding device 25, an oscillation current flows through the micro coil 78 by a switch of the pen tip 60, and an oscillating magnetic field is generated in the pen tip 60.

The magnetic field generated in the pen tip 60 influences the micro coil 78 of the position information holding device 25 at the position of the pen tip 60, and the position information in the corresponding memory element 79 is output onto the data bus 80a via the above-mentioned process. The position information is output to the position recognizing section 12 of the information input device 10. With the above-mentioned method, the absolute position of the information input device 10 on the position information holding device 25 can be recognized.

A receiving section of a serial magnetic signal may be connected to the micro coil in the pen tip 60, and an output section which can output position information stored in the corresponding memory element 79 may be connected to the micro coil 78 of the corresponding memory element 79, so that position information can be exchanged without connecting any signal line.

In each of the arrangements shown in FIGS. 47 to 53, when the position information of each position on the position information holding device 25 is expressed by an analog element in a multi-value logic manner, a difference between numerical values of position information is set to be equal to or larger than a detection error, thereby preventing a recognition error of address information. For example, when each address information is expressed by the dielectric constant of a dielectric, the dielectric constants may be set to be 0, 5, 10, . . .

FIG. 54 shows an arrangement adopted when the position of the information writing section of the present invention is digitally recognized.

Unique digital position information is stored at each position on the position information holding device 25, and each position information is held as information expressed by a plurality of bits arranged in a square or rectangular pattern.

The pen tip 60 of the information input device 10 holds a plurality of heads which are arranged in the same pattern as that of bits of each position information. Each head is used for reading one bit information.

When the pen tip 60 is brought into contact with the position information holding device 25, a switch of the pen tip 60 enables the heads, and the plurality of heads read one position information expressed by a plurality of bits. The read position information is output to the position recognizing section 12.

FIGS. 55A to 55C show other arrangements of FIG. 54.

Unique digital position information is held at each position on the position information holding device 25.

Each position information on the position information holding device 25 is stored as digital information expressed by n bits (4 bits in this case) which are arranged in a square pattern, as shown in FIG. 55A. Frame identification information bits (12 bits in this case) are stored in a square pattern to surround the 4-bit digital information. More specifically, in this case, 16 bits correspond to one dot. On the other hand, the information writing section 11 of the information input device 10 comprise a 20×20 matrix of reading heads each of which is smaller than the size of a section for storing 1-bit data on the position information holding device 25. The size of the information writing section 11 as a whole is larger than a portion for storing one position information on the position information holding device 25. The information writing section 11 freely moves on the position information holding device 25 in correspondence with the movement of the pen tip 60.

In this case, when each reading head extends across a boundary between bits "0" and "1" on the position information holding device 25, information cannot often be accurately read. However, since 1-bit information on the position information holding device 25 is detected by a plurality of heads, heads other than those on the boundary can detect correct bit information. Then, image processing is performed for the detected bit information, thereby restoring a plurality of pieces of "0" or "1" information to independent "0" or "1" information.

When the heads of the information writing section 11 are inclined clockwise at about 45× with respect to the storing direction of position information on the position information holding device 25, as indicated by oblique frames, the information writing section 11 detects position information in a state shown in a lower portion of FIG. 55. A bold frame in FIG. 55 represents that 1 bit on the holding device is read by a plurality of heads. However, since the frame identification information bits are arranged to be distinguished from address information, a portion other than the frame identification information bits never forms the same information pattern as the frame identification information bits. The read pattern in FIG. 55 shows that a group of frame information bits are read.

Thus, matching processing of the frame identification information pattern is performed based on information obtained after the above-mentioned restoration processing, and the inclination of the frame identification information is calculated based on the matching state of the frame identification information. As a result, the direction of the position information detection section can also be obtained.

In this manner, even when the information writing section 11 is moved to have an arbitrary path and inclination with respect to the position information holding device 25, each position information can be accurately identified.

FIGS. 56A to 56D show still another arrangement of FIG. 54.

Unique digital position information is held at each position on the position information holding device 25.

The number of bits required for expressing position information increases in proportion to a square of the numbers of vertical and horizontal dots on the position information holding device 25. For this reason, it is important to decrease the number of bits required for expressing position information as much as possible. In the following description, a method of decreasing the number of bits required for expressing position information will be exemplified. More specifically, the number of bits required for expressing each position information when position information on the position information holding device 25 having a 5×5 dot resolution is expressed by an integer will be described below.

FIG. 56A shows a case wherein each position information is expressed by an integer. In this case, required position information values are 1 to 25, and 5 bits are required per position information.

FIG. 56B shows a case wherein each position information is expressed by two-dimensional coordinates. In this case, required position information values are only 1 to 5. However, since two position information values are required to express each position, 3×2=6 bits are required per position information. In other words, when each position information is expressed by two-dimensional integer coordinates, the number of bits equal to or larger than that required when each position information is expressed by an integer is required.

FIG. 56C shows a method of obtaining the current absolute position based on a set of two pieces of position information, i.e., position information of the current position and position information at the immediately preceding timing. When the information input device is moved from a position of position information="7" to a position of position information="8", the absolute position is obtained using a table or a mapping function for converting (7, 9) to coordinates (2, 3).

For this reason, when the information input device can be moved from the position of position information="7" (coordinates (2, 2) in eight directions, position information sets, which may be generated, are eight sets, i.e., (7, 1), (7, 2), (7, 3), (7, 8), (7, 13), (7, 12), (7, 11), and (7, 6). In order to uniquely obtain the absolute position from each of these position information sets, position information values are arranged in a pattern which guarantees that these position information sets do not appear when the information input device is moved to any other positions. In order to satisfy this requirement, at least integers "1" to "14" can be arranged in a specific pattern.

This is because, on a 5×5 plate, the total number of combinations of two adjacent dots in the vertical, horizontal, and oblique directions is 80, and the number of combinations generated by extracting two values from values "1" to "14" is 91.

More specifically, with this method, one position information can be expressed by 5 bits. This method is particularly suitable since the position recognizing system of the present invention is achieved under the assumption that the pen tip 60 frequently moves. Furthermore, a position information set may include three pieces of position information of the current position, a position at the immediately preceding timing, and a position at a timing immediately before the immediately preceding timing.

When the position information holding device 25 has a 1,000×1,000 (vertical×horizontal) dot resolution, the methods shown in FIGS. 56A and 56B respectively require 20 bits and 24 bits to express one position information. However, the method shown in FIG. 56C requires only 10 bits. As the resolution of the position holding device 25 increases, a reduction in the number of bits required for expressing one position information increases with this latter method.

FIG. 56D shows a method of obtaining the current absolute position by simultaneously detecting position information at two adjacent positions in the horizontal direction. When a position information set=(1, 5) is detected, the absolute position is obtained using a table or a mapping function for converting (1, 5) to coordinates (2, 3).

In order to uniquely obtain the absolute position from each of these position information sets, position information values are arranged in a pattern which guarantees that these position information sets do not appear at any other positions. If position information sets (1, 5) and (5, 1) can be distinguished from each other, at least integers "1" to "5" can be arranged in a specific pattern.

This is because, on a 5×5 plate, the total number of combinations of two adjacent dots in the horizontal direction is 20, and the number of permutations generated by extracting two values from values "1" to "5" is 20.

More specifically, this method requires only 3 bits per position information. This method is suitable for a case wherein a plurality of information writing sections 11 are present, and can simultaneously detect a plurality of pieces of position information on the position information holding device 25. As the resolution of the position holding device 25 increases, a reduction in the number of bits required for expressing one position information increases with this method as well.

This method is effective when it is combined with the method shown in FIG. 54 or 55. When 40×40 heads are used, and four pieces of position information are simultaneously detected, at least position information values "1" to "4" can be arranged in a specific pattern. In this case, the number of bits required for expressing one position information can be 3 bits.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A position recognizing system comprising:
    a planar position information holding device including position information holding means for holding a plurality of position information corresponding to plural positions such that the position information at each of the plural positions is different from the position information at all other positions of the plural positions, wherein the position information is stored using a unique magnetic flux density; and
    an information input device including:
        means for detecting the position information, held by said planar position information holding device, specified by a pen tip of said information input device;
        means for obtaining an absolute position of said pen tip on said planar position information holding device according to the detected position information; and
        means for storing the obtained absolute position as a trace information of said pen tip.

2. The position recognizing system according to claim 1, wherein a relationship between adjacent position information is arranged to have a unique arrangement.

3. The position recognizing system according to claim 1, wherein said pen tip obtains the absolute position by detecting a moving direction of said pen tip on said planar position information holding device.

4. The position recognizing system according to claim 1, wherein said pen tip has the same size as said position information.

* * * * *